(12) United States Patent
Indeck et al.

(10) Patent No.: US 9,396,222 B2
(45) Date of Patent: *Jul. 19, 2016

(54) METHOD AND SYSTEM FOR HIGH PERFORMANCE INTEGRATION, PROCESSING AND SEARCHING OF STRUCTURED AND UNSTRUCTURED DATA USING COPROCESSORS

(71) Applicant: IP Reservoir, LLC, St. Louis, MO (US)

(72) Inventors: Ronald S. Indeck, St. Louis, MO (US); David Mark Indeck, Highlands Ranch, CO (US)

(73) Assignee: IP RESERVOIR, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,255

(22) Filed: Nov. 3, 2014

(65) Prior Publication Data

US 2015/0052148 A1 Feb. 19, 2015

Related U.S. Application Data

(63) Continuation of application No. 13/442,442, filed on Apr. 9, 2012, now Pat. No. 8,880,501, which is a continuation of application No. 12/640,891, filed on Dec. 17, 2009, now Pat. No. 8,156,101, which is a
(Continued)

(51) Int. Cl.
*G06F 17/30* (2006.01)

(52) U.S. Cl.
CPC .... *G06F 17/30321* (2013.01); *G06F 17/30595* (2013.01); *G06F 17/30619* (2013.01); *Y10S 707/99935* (2013.01)

(58) Field of Classification Search
USPC .......................................................... 707/741
See application file for complete search history.

(56) References Cited

U.S. PATENT DOCUMENTS

| 2,046,381 A | 7/1936 | Hicks et al. |
| 3,082,402 A | 3/1963 | Scantlin |
| 3,296,597 A | 1/1967 | Scantlin et al. |

(Continued)

FOREIGN PATENT DOCUMENTS

| EP | 0573991 | 12/1993 |
| EP | 0880088 | 11/1996 |

(Continued)

OTHER PUBLICATIONS

Krishnamurthy et al., "Biosequence Similarity Search on the Mercury System", Proceedings of the 15th IEEE International Conference on Application-Specific Systems, Architectures, and Processors (ASAP04), Sep. 2004, pp. 365-375.

(Continued)

*Primary Examiner* — Debbie Le
(74) *Attorney, Agent, or Firm* — Thompson Coburn LLP

(57) ABSTRACT

Disclosed herein is a method and system for integrating an enterprise's structured and unstructured data to provide users and enterprise applications with efficient and intelligent access to that data. In accordance with exemplary embodiments, the generation of metadata indexes about unstructured data can be hardware-accelerated by processing streaming unstructured data through a reconfigurable logic device to generate the metadata about the unstructured data for the index.

39 Claims, 32 Drawing Sheets

Related U.S. Application Data continuation of application No. 11/938,709, filed on Nov. 12, 2007, now Pat. No. 7,660,793.

(60) Provisional application No. 60/865,629, filed on Nov. 13, 2006.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,044,334 A | 8/1977 | Bachman et al. |
| 4,081,607 A | 3/1978 | Vitols et al. |
| 4,298,898 A | 11/1981 | Cardot |
| 4,314,356 A | 2/1982 | Scarbrough |
| 4,341,925 A | 7/1982 | Frosch et al. |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,823,306 A | 4/1989 | Barbic et al. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,140,644 A | 8/1992 | Kawaguchi et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,371,794 A | 12/1994 | Diffie et al. |
| 5,375,055 A | 12/1994 | Togher et al. |
| 5,381,480 A | 1/1995 | Butter et al. |
| 5,388,259 A | 2/1995 | Fleischman et al. |
| 5,396,253 A | 3/1995 | Chia |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,535,384 A | 7/1996 | Kasahara |
| 5,544,352 A | 8/1996 | Egger |
| 5,546,578 A | 8/1996 | Takada et al. |
| 5,651,125 A | 7/1997 | Witt et al. |
| 5,701,464 A | 12/1997 | Aucsmith |
| 5,704,060 A | 12/1997 | Del Monte |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,832,212 A | 11/1998 | Cragun et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,950,006 A | 9/1999 | Crater et al. |
| 5,950,196 A | 9/1999 | Pyreddy et al. |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,016,483 A | 1/2000 | Rickard et al. |
| 6,023,760 A | 2/2000 | Karttunen |
| 6,028,939 A | 2/2000 | Yin |
| 6,044,375 A | 3/2000 | Shmueli et al. |
| 6,044,407 A | 3/2000 | Jones et al. |
| 6,058,391 A | 5/2000 | Gardner |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,890 A | 11/2000 | Kawana et al. |
| 6,147,976 A | 11/2000 | Shand et al. |
| 6,169,969 B1 | 1/2001 | Cohen |
| 6,173,270 B1 | 1/2001 | Cristofich et al. |
| 6,175,874 B1 | 1/2001 | Imai et al. |
| 6,185,531 B1 | 2/2001 | Schwartz et al. |
| 6,226,676 B1 | 5/2001 | Crump et al. |
| 6,236,980 B1 | 5/2001 | Reese |
| 6,272,616 B1 | 8/2001 | Fernando et al. |
| 6,278,982 B1 | 8/2001 | Korhammer et al. |
| 6,279,113 B1 | 8/2001 | Vaidya |
| 6,304,858 B1 | 10/2001 | Mosler et al. |
| 6,317,728 B1 | 11/2001 | Kane |
| 6,317,795 B1 | 11/2001 | Malkin et al. |
| 6,324,286 B1 | 11/2001 | Lai et al. |
| 6,336,150 B1 | 1/2002 | Ellis et al. |
| 6,370,645 B1 | 4/2002 | Lee et al. |
| 6,377,942 B1 | 4/2002 | Hinsley et al. |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,430,272 B1 | 8/2002 | Maruyama et al. |
| 6,442,545 B1 | 8/2002 | Feldman et al. |
| 6,463,474 B1 | 10/2002 | Fuh et al. |
| 6,484,209 B1 | 11/2002 | Momirov |
| 6,499,107 B1 | 12/2002 | Gleichauf et al. |
| 6,535,868 B1 | 3/2003 | Galeazzi et al. |
| 6,564,263 B1 | 5/2003 | Bergman et al. |
| 6,578,147 B1 | 6/2003 | Shanklin et al. |

(56) References Cited

U.S. PATENT DOCUMENTS

| | | | |
|---|---|---|---|
| 6,594,643 B1 | 7/2003 | Freeny, Jr. |
| 6,633,868 B1 | 10/2003 | Min et al. |
| 6,658,377 B1 | 12/2003 | Anward et al. |
| 6,658,423 B1 | 12/2003 | Pugh et al. |
| 6,710,702 B1 | 3/2004 | Averbuch et al. |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,170 B2 | 8/2004 | Pennock et al. |
| 6,772,345 B1 | 8/2004 | Shetty |
| 6,782,394 B1 | 8/2004 | Landeck et al. |
| 6,785,677 B1 | 8/2004 | Fritchman |
| 6,804,667 B1 | 10/2004 | Martin |
| 6,807,156 B1 | 10/2004 | Veres et al. |
| 6,839,686 B1 | 1/2005 | Galant |
| 6,850,906 B1 | 2/2005 | Chadha et al. |
| 6,877,044 B2 | 4/2005 | Lo et al. |
| 6,882,747 B2 | 4/2005 | Thawonmas et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,971,017 B2 | 11/2005 | Stringer et al. |
| 6,978,223 B2 | 12/2005 | Milliken |
| 6,980,976 B2 | 12/2005 | Alpha et al. |
| 6,981,054 B1 | 12/2005 | Krishna |
| 7,006,627 B2 | 2/2006 | Hanounik |
| 7,016,910 B2 | 3/2006 | Egilsson et al. |
| 7,016,914 B2 | 3/2006 | Nayak |
| 7,019,674 B2 | 3/2006 | Cadambi et al. |
| 7,024,408 B2 | 4/2006 | Dehlinger et al. |
| 7,028,250 B2 | 4/2006 | Ukrainczyk et al. |
| 7,046,848 B1 | 5/2006 | Olcott |
| 7,051,037 B1 | 5/2006 | Thomas et al. |
| 7,054,854 B1 | 5/2006 | Hattori et al. |
| 7,055,039 B2 | 5/2006 | Chavanne et al. |
| 7,058,735 B2 | 6/2006 | Spencer |
| 7,065,475 B1 | 6/2006 | Brundobler |
| 7,082,427 B1 | 7/2006 | Seibel et al. |
| 7,089,188 B2 | 8/2006 | Logan et al. |
| 7,092,956 B2 | 8/2006 | Ruediger |
| 7,093,023 B2 | 8/2006 | Lockwood et al. |
| 7,096,179 B2 | 8/2006 | Zhu et al. |
| 7,106,905 B2 | 9/2006 | Simske |
| 7,113,954 B2 | 9/2006 | Vogel |
| 7,117,437 B2 | 10/2006 | Chen et al. |
| 7,120,079 B2 | 10/2006 | McCollum et al. |
| 7,120,699 B2 | 10/2006 | Stork et al. |
| 7,124,140 B2 | 10/2006 | Barton |
| 7,127,424 B2 | 10/2006 | Kemp, II et al. |
| 7,127,510 B2 | 10/2006 | Yoda et al. |
| 7,139,743 B2 | 11/2006 | Indeck et al. |
| 7,149,715 B2 | 12/2006 | Browne et al. |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,212,998 B1 | 5/2007 | Muller et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,356,498 B2 | 4/2008 | Kaminsky et al. |
| 7,372,875 B2 | 5/2008 | Hadzic et al. |
| 7,376,755 B2 | 5/2008 | Pandya |
| 7,406,444 B2 | 7/2008 | Eng et al. |
| 7,408,932 B2 | 8/2008 | Kounavis et al. |
| 7,411,957 B2 | 8/2008 | Stacy et al. |
| 7,415,723 B2 | 8/2008 | Pandya |
| 7,444,515 B2 | 10/2008 | Dharmapurikar et al. |
| 7,454,418 B1 | 11/2008 | Wang |
| 7,457,834 B2 | 11/2008 | Jung et al. |
| 7,461,064 B2 | 12/2008 | Fontoura et al. |
| 7,467,155 B2 | 12/2008 | McCool et al. |
| 7,480,253 B1 | 1/2009 | Allan |
| 7,487,264 B2 | 2/2009 | Pandya |
| 7,536,462 B2 | 5/2009 | Pandya |
| 7,539,845 B1 | 5/2009 | Wentzlaff et al. |
| 7,565,525 B2 | 7/2009 | Vorbach et al. |
| 7,580,719 B2 | 8/2009 | Karmarkar |
| 7,606,968 B2 | 10/2009 | Branscome et al. |
| 7,627,693 B2 | 12/2009 | Pandya |
| 7,631,107 B2 | 12/2009 | Pandya |
| 7,636,703 B2 | 12/2009 | Taylor |
| 7,660,793 B2 | 2/2010 | Indeck et al. |
| 7,668,849 B1 | 2/2010 | Narancic et al. |
| 7,685,121 B2 | 3/2010 | Brown et al. |
| 7,685,254 B2 | 3/2010 | Pandya |
| 7,761,459 B1 | 7/2010 | Zhang et al. |
| 7,788,293 B2 | 8/2010 | Pasztor et al. |
| 7,805,392 B1 | 9/2010 | Steele et al. |
| 7,827,190 B2 | 11/2010 | Pandya |
| 7,831,606 B2 | 11/2010 | Pandya |
| 7,831,607 B2 | 11/2010 | Pandya |
| 7,870,217 B2 | 1/2011 | Pandya |
| 7,890,692 B2 | 2/2011 | Pandya |
| 7,899,976 B2 | 3/2011 | Pandya |
| 7,899,977 B2 | 3/2011 | Pandya |
| 7,899,978 B2 | 3/2011 | Pandya |
| 7,908,259 B2 | 3/2011 | Branscome et al. |
| 7,912,808 B2 | 3/2011 | Pandya |
| 7,917,299 B2 | 3/2011 | Buhler et al. |
| 7,921,046 B2 | 4/2011 | Parsons et al. |
| 7,930,314 B2 * | 4/2011 | Gupta ............ G06F 17/30389 707/737 |
| 7,944,920 B2 | 5/2011 | Pandya |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,996,348 B2 | 8/2011 | Pandya |
| 8,005,966 B2 | 8/2011 | Pandya |
| 8,030,888 B2 | 10/2011 | Pandya et al. |
| 8,032,440 B1 | 10/2011 | Hait |
| 8,051,022 B2 | 11/2011 | Pandya |
| 8,055,601 B2 | 11/2011 | Pandya |
| 8,140,416 B2 | 3/2012 | Borkovec et al. |
| 8,156,101 B2 | 4/2012 | Indeck et al. |
| 8,181,239 B2 | 5/2012 | Pandya |
| 8,200,599 B2 | 6/2012 | Pandya |
| 8,224,800 B2 | 7/2012 | Branscome et al. |
| 8,229,918 B2 | 7/2012 | Branscome et al. |
| 8,234,267 B2 | 7/2012 | Branscome et al. |
| 8,244,718 B2 | 8/2012 | Chamdani et al. |
| 8,260,754 B2 | 9/2012 | Tatebe et al. |
| 8,260,764 B1 * | 9/2012 | Gruber ............ G06F 17/30398 707/708 |
| 8,274,682 B2 | 9/2012 | Parkinson |
| 8,281,026 B2 * | 10/2012 | Lankford ................ H04L 45/00 709/203 |
| 8,326,819 B2 | 12/2012 | Indeck et al. |
| 8,374,986 B2 | 2/2013 | Indeck et al. |
| 8,402,022 B2 | 3/2013 | Frank et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,601,086 B2 | 12/2013 | Pandya |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,660,925 B2 | 2/2014 | Borkovec et al. |
| 8,737,606 B2 | 5/2014 | Taylor et al. |
| 8,751,452 B2 | 6/2014 | Chamberlain et al. |
| 8,762,249 B2 | 6/2014 | Taylor et al. |

(56) References Cited

U.S. PATENT DOCUMENTS

| | | |
|---|---|---|
| 8,768,805 B2 | 7/2014 | Taylor et al. |
| 8,768,888 B2 | 7/2014 | Chamberlain et al. |
| 8,879,727 B2 | 11/2014 | Taylor et al. |
| 8,880,501 B2 | 11/2014 | Indeck et al. |
| 8,983,063 B1 | 3/2015 | Taylor et al. |
| 9,020,928 B2 | 4/2015 | Indeck et al. |
| 9,047,243 B2 | 6/2015 | Taylor et al. |
| 9,176,775 B2 | 11/2015 | Chamberlain et al. |
| 2001/0014093 A1 | 8/2001 | Yoda et al. |
| 2001/0056547 A1 | 12/2001 | Dixon |
| 2002/0004820 A1* | 1/2002 | Baldwin ............... H04L 12/585 709/206 |
| 2002/0031125 A1 | 3/2002 | Sato |
| 2002/0049841 A1 | 4/2002 | Johnson et al. |
| 2002/0069370 A1 | 6/2002 | Mack |
| 2002/0091826 A1 | 7/2002 | Comeau et al. |
| 2002/0095512 A1 | 7/2002 | Rana et al. |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0162025 A1 | 10/2002 | Sutton et al. |
| 2002/0166063 A1 | 11/2002 | Lachman et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023876 A1 | 1/2003 | Bardsley et al. |
| 2003/0037037 A1 | 2/2003 | Adams et al. |
| 2003/0043805 A1 | 3/2003 | Graham et al. |
| 2003/0051043 A1 | 3/2003 | Wyschogrod et al. |
| 2003/0065607 A1 | 4/2003 | Satchwell |
| 2003/0065943 A1 | 4/2003 | Geis et al. |
| 2003/0074582 A1 | 4/2003 | Patel et al. |
| 2003/0078865 A1 | 4/2003 | Lee |
| 2003/0093343 A1 | 5/2003 | Huttenlocher et al. |
| 2003/0099254 A1 | 5/2003 | Richter |
| 2003/0110229 A1 | 6/2003 | Kulig et al. |
| 2003/0154284 A1 | 8/2003 | Bernardin et al. |
| 2003/0154368 A1 | 8/2003 | Stevens et al. |
| 2003/0177253 A1 | 9/2003 | Schuehler et al. |
| 2003/0198345 A1 | 10/2003 | Van Buer |
| 2003/0208430 A1 | 11/2003 | Gershon |
| 2003/0221013 A1 | 11/2003 | Lockwood et al. |
| 2004/0000928 A1 | 1/2004 | Cheng et al. |
| 2004/0010612 A1 | 1/2004 | Pandya |
| 2004/0028047 A1 | 2/2004 | Hou et al. |
| 2004/0047466 A1 | 3/2004 | Feldman et al. |
| 2004/0049596 A1 | 3/2004 | Schuehler et al. |
| 2004/0054924 A1 | 3/2004 | Chuah et al. |
| 2004/0162826 A1 | 8/2004 | Wyschogrod et al. |
| 2004/0170070 A1 | 9/2004 | Rapp et al. |
| 2004/0177340 A1 | 9/2004 | Hsu et al. |
| 2004/0199452 A1 | 10/2004 | Johnston et al. |
| 2004/0205149 A1 | 10/2004 | Dillon et al. |
| 2005/0005145 A1 | 1/2005 | Teixeira |
| 2005/0027634 A1 | 2/2005 | Gershon |
| 2005/0044344 A1 | 2/2005 | Stevens |
| 2005/0086520 A1 | 4/2005 | Dharmapurikar et al. |
| 2005/0108518 A1 | 5/2005 | Pandya |
| 2005/0171943 A1 | 8/2005 | Ichino et al. |
| 2005/0175010 A1 | 8/2005 | Wilson et al. |
| 2005/0187974 A1 | 8/2005 | Gong |
| 2005/0195832 A1 | 9/2005 | Dharmapurikar et al. |
| 2005/0240510 A1 | 10/2005 | Schweickert et al. |
| 2006/0026090 A1 | 2/2006 | Balabon |
| 2006/0031263 A1 | 2/2006 | Arrouye et al. |
| 2006/0036693 A1 | 2/2006 | Hulten et al. |
| 2006/0047636 A1* | 3/2006 | Mohania ............ G06F 17/30286 |
| 2006/0053295 A1 | 3/2006 | Madhusudan et al. |
| 2006/0101005 A1 | 5/2006 | Yang et al. |
| 2006/0129745 A1 | 6/2006 | Thiel et al. |
| 2006/0136570 A1 | 6/2006 | Pandya |
| 2006/0215691 A1 | 9/2006 | Kobayashi et al. |
| 2006/0242123 A1 | 10/2006 | Williams, Jr. |
| 2006/0259407 A1 | 11/2006 | Rosenthal et al. |
| 2006/0259417 A1 | 11/2006 | Marynowski et al. |
| 2006/0269148 A1 | 11/2006 | Farber et al. |
| 2006/0294059 A1 | 12/2006 | Chamberlain et al. |
| 2007/0011175 A1 | 1/2007 | Langseth et al. |
| 2007/0011183 A1 | 1/2007 | Langseth et al. |
| 2007/0061231 A1 | 3/2007 | Kim-E |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112748 A1 | 5/2007 | Angell et al. |
| 2007/0112837 A1 | 5/2007 | Houh et al. |
| 2007/0118500 A1 | 5/2007 | Indeck et al. |
| 2007/0121950 A1 | 5/2007 | Okaue |
| 2007/0130140 A1 | 6/2007 | Cytron et al. |
| 2007/0156574 A1 | 7/2007 | Marynowski et al. |
| 2007/0156669 A1 | 7/2007 | Marchisio et al. |
| 2007/0174841 A1 | 7/2007 | Chamberlain et al. |
| 2007/0179935 A1 | 8/2007 | Lee et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0260814 A1 | 11/2007 | Branscome et al. |
| 2007/0277036 A1 | 11/2007 | Chamberlain et al. |
| 2007/0294157 A1 | 12/2007 | Singla et al. |
| 2007/0294162 A1 | 12/2007 | Borkovec |
| 2008/0005062 A1 | 1/2008 | Gupta et al. |
| 2008/0021874 A1 | 1/2008 | Dahl et al. |
| 2008/0077582 A1 | 3/2008 | Reed |
| 2008/0077793 A1 | 3/2008 | Tan et al. |
| 2008/0082502 A1 | 4/2008 | Gupta |
| 2008/0084573 A1 | 4/2008 | Horowitz et al. |
| 2008/0086274 A1 | 4/2008 | Chamberlain et al. |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0175239 A1 | 7/2008 | Sistanizadeh et al. |
| 2008/0183688 A1 | 7/2008 | Chamdani et al. |
| 2008/0189251 A1 | 8/2008 | Branscome et al. |
| 2008/0189252 A1 | 8/2008 | Branscome et al. |
| 2008/0240424 A1 | 10/2008 | Park |
| 2008/0243675 A1 | 10/2008 | Parsons et al. |
| 2008/0253395 A1 | 10/2008 | Pandya |
| 2009/0037514 A1 | 2/2009 | Lankford et al. |
| 2010/0082895 A1 | 4/2010 | Branscome et al. |
| 2010/0094858 A1 | 4/2010 | Indeck et al. |
| 2010/0174770 A1 | 7/2010 | Pandya |
| 2010/0198920 A1 | 8/2010 | Wong et al. |
| 2011/0040776 A1 | 2/2011 | Najm et al. |
| 2011/0145130 A1 | 6/2011 | Glodjo et al. |
| 2011/0167083 A1 | 7/2011 | Branscome et al. |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0218987 A1 | 9/2011 | Branscome et al. |
| 2011/0231446 A1 | 9/2011 | Buhler et al. |
| 2011/0252008 A1 | 10/2011 | Chamberlain et al. |
| 2011/0291615 A1 | 12/2011 | Pandya et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0117610 A1 | 5/2012 | Pandya |
| 2012/0130922 A1 | 5/2012 | Indeck et al. |
| 2012/0179590 A1 | 7/2012 | Borkovec et al. |
| 2012/0215801 A1 | 8/2012 | Indeck et al. |
| 2013/0018835 A1 | 1/2013 | Pandya |
| 2013/0086096 A1 | 4/2013 | Indeck et al. |
| 2013/0148802 A1 | 6/2013 | Taylor et al. |
| 2013/0151458 A1 | 6/2013 | Indeck et al. |

(56) References Cited

U.S. PATENT DOCUMENTS

| | | |
|---|---|---|
| 2013/0159449 A1 | 6/2013 | Taylor et al. |
| 2013/0262287 A1 | 10/2013 | Parsons et al. |
| 2013/0290163 A1 | 10/2013 | Parsons et al. |
| 2014/0025656 A1 | 1/2014 | Indeck et al. |
| 2014/0040109 A1 | 2/2014 | Parsons et al. |
| 2014/0067830 A1 | 3/2014 | Buhler et al. |
| 2014/0089163 A1 | 3/2014 | Parsons et al. |
| 2014/0164215 A1 | 6/2014 | Parsons et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0181133 A1 | 6/2014 | Parsons et al. |
| 2015/0023501 A1 | 1/2015 | Taylor et al. |
| 2015/0055776 A1 | 2/2015 | Taylor et al. |

FOREIGN PATENT DOCUMENTS

| | | |
|---|---|---|
| EP | 0851358 A | 7/1998 |
| EP | 0887723 | 12/1998 |
| EP | 0911738 A | 4/1999 |
| EP | 0989754 A2 | 3/2000 |
| EP | 1469371 A2 | 10/2004 |
| JP | 57-137978 A | 8/1982 |
| JP | 58-102378 A | 6/1983 |
| JP | 61-107596 A | 5/1986 |
| JP | 63-143668 A | 6/1988 |
| JP | 63-167951 | 12/1988 |
| JP | H03156677 A | 7/1991 |
| JP | 04-205174 A | 7/1992 |
| JP | 05-101102 A | 4/1993 |
| JP | 05-217289 A | 8/1993 |
| JP | 09-054797 A | 2/1997 |
| JP | 9-269930 | 10/1997 |
| JP | 11-259559 A | 9/1999 |
| JP | 11282912 | 10/1999 |
| JP | 2000-076270 A | 3/2000 |
| JP | 2000285134 A | 10/2000 |
| JP | 2001283000 A | 10/2001 |
| JP | 2002269343 A | 9/2002 |
| JP | 2003-036360 A | 2/2003 |
| JP | 2003256660 A | 9/2003 |
| JP | 2005242997 A | 9/2005 |
| JP | 2005527042 A | 9/2005 |
| JP | 2006059203 A | 3/2006 |
| JP | 4180644 B1 | 11/2008 |
| WO | 9010910 | 9/1990 |
| WO | 9409443 A1 | 4/1994 |
| WO | 9737735 | 10/1997 |
| WO | 98/52130 A1 | 11/1998 |
| WO | 9905814 | 2/1999 |
| WO | 9955052 | 10/1999 |
| WO | 0122425 A | 3/2001 |
| WO | 0135216 A2 | 5/2001 |
| WO | 0139577 | 6/2001 |
| WO | 0161913 | 8/2001 |
| WO | 0172106 A2 | 10/2001 |
| WO | 0180082 A2 | 10/2001 |
| WO | 0180558 | 10/2001 |
| WO | 0190890 A1 | 11/2001 |
| WO | 02061525 | 8/2002 |
| WO | 02082271 | 10/2002 |
| WO | 03100650 | 4/2003 |
| WO | 03036845 | 5/2003 |
| WO | 03100662 | 12/2003 |
| WO | 03104943 A2 | 12/2003 |
| WO | 2004014065 A2 | 2/2004 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |
| WO | 2005017708 A | 2/2005 |
| WO | 2005026925 | 3/2005 |
| WO | 2005048134 A | 5/2005 |
| WO | 2005081855 A2 | 9/2005 |
| WO | 2005114339 A2 | 12/2005 |
| WO | 2006023948 | 3/2006 |
| WO | 2004/042569 A3 | 4/2006 |
| WO | 2006060571 A2 | 6/2006 |
| WO | 2006096324 | 9/2006 |
| WO | 2007064685 | 6/2007 |
| WO | 2007/074903 A1 | 7/2007 |
| WO | 2007079095 A2 | 7/2007 |
| WO | 2007087507 | 8/2007 |
| WO | 2007/127336 A2 | 11/2007 |
| WO | 2008022036 | 2/2008 |
| WO | 2008063973 | 5/2008 |
| WO | 2008063974 | 5/2008 |
| WO | 2008073824 A1 | 6/2008 |
| WO | 2013090363 A2 | 6/2013 |
| WO | 2013/148693 A1 | 10/2013 |

OTHER PUBLICATIONS

Kulig et al., "System and Method for Controlling Transmission of Data Packets Over an Information Network", pending U.S. Patent Application.

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Lancaster, "Design and Evaluation of a BLAST Ungapped Extension Accelerator, Master's Thesis, May 2006", Thesis (http://cse.seas.wustl.edu/Research/File Download.asp?489), 2006, Pages: Cover pp. 1-4; iii-x; pp. 1-65, Washington University in St. Louis.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

(56) References Cited

OTHER PUBLICATIONS

Lockwood, "Simulation of the Hello World Application for the Field-Programmable Port Extender (FPX)", Washington University, Applied Research Lab, Spring 2001 Gigabits Kits Workshop.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Navarro, "A Guided Tour to Approximate String Matching", ACM Computing Surveys, vol. 33, No. 1, Mar. 2001, pp. 31-88.

Necker et al., "TCP-Stream Reassembly and State Tracking in Hardware", School of Electrical and Computer Engineering, Georgia Institute of Technology, Atlanta, GA.

Notice of Allowance for U.S. Appl. No. 11/938,709 dated Aug. 27, 2009.

Nunez et al., "The X-MatchLITE FPGA-Based Data Compressor", Euromicro Conference 1999, Proceedings, Italy, Sep. 8-10, 1999, pp. 126-132, Los Alamitos, CA.

Office Action for JP Application 2009-536535 dated Apr. 23, 2013.
Office Action for JP Application 2009-536535 dated Nov. 12, 2013.
Office Action for JP Application 2009-536536 dated Apr. 2, 2013.
Office Action for JP Application 2013-160166 dated Jul. 15, 2014.
Office Action for U.S. Appl. No. 11/938,709 dated Jan. 13, 2009.
Office Action for U.S. Appl. No. 11/938,709 dated Jul. 14, 2008.
Office Action for U.S. Appl. No. 11/938,732 dated Dec. 9, 2011.
Office Action for U.S. Appl. No. 11/938,732 dated Feb. 25, 2009.
Office Action for U.S. Appl. No. 11/938,732 dated Sep. 8, 2008.
Office Action for U.S. Appl. No. 11/938,732 dated Sep. 8, 2009.

Prakash et al., "OC-3072 Packet Classification Using BDDs and Pipelined SRAMs", Department of Electrical and Computer Engineering, The University of Texas at Austin.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Prosecution History for U.S. Appl. No. 11/938,709, now U.S. Pat. No. 7,660,793, filed Nov. 12, 2007.

Prosecution History for U.S. Appl. No. 11/938,732, now U.S. Pat. No. 8,326,819, filed Nov. 12, 2007.

Prosecution History for U.S. Appl. No. 12/640,891, now U.S. Pat. No. 8,156,101, filed Dec. 17, 2009.

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ratha et al., "Convolution on Splash 2", Proceedings of IEEE Symposium on FPGAS for Custom Computing Machines, Apr. 19, 1995, pp. 204-213, Los Alamitos, California.

Ratha et al., "FPGA-based coprocessor for text string extraction", IEEE, Sep. 11-13, 2000, pp. 217-221.

Roberts, "Internet Still Growing Dramatically Says Internet Founder", Press Release, Caspian Networks, Inc.—Virtual Pressroom.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Edgar, "MUSCLE: Multiple Sequence Alignment with High Accuracy and High Throughput", Nucleic Acids Research, 2004, vol. 32, No. 5, pp. 1792-1797.

Eick et al., "Hardware Accelerated Algorithms for Semantic Processing of Document Streams", IEEE Aerospace Conference, 2006, pp. 1-14, Piscataway, NJ, USA.

Extended European Search Report for EP Application 07845064.0 dated May 6, 2013.

Extended European Search Report for EP Application 07845066.5 dated May 21, 2013.

Feldmann, "BLT: Bi-Layer Tracing of HTTP and TCP/IP", AT&T Labs-Research, Florham Park, NJ, USA.

FIPS 197, "Advanced Encryption Standard", National Institute of Standards and Technology (2001).

FIPS Pub. 46-3. Data Encryption Standard (DES). Revised version of 46-2. Reaffirmed Oct. 25, 1999.

Franklin et al., "An Architecture for Fast Processing of Large Unstructured Data Sets." Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Gavrila et al., "Multi-feature Hierarchical Template Matching Using Distance Transforms", IEEE, Aug. 16-20, 1998, vol. 1, pp. 439-444.

Gokhale et al., "Reconfigurable Computing: Accelerating Computation with Field-Programmable Gate Arrays", Springer, 2005, pp. 1-36.

Gokhale et al., "Reconfigurable Computing: Accelerating Computation with Field-Programmable Gate Arrays", Springer, 2005, pp. 1-54, 92-96.

Guerdoux-Jamet et al., "Systolic Filter for Fast DNA Similarity Search", IEEE, 1995, pp. 145-156.

Gunther et al., "Assessing Document Relevance with Run-Time Reconfigurable Machines", IEEE Symposium on FPGAs for Custom Computing Machines, 1996, pp. 10-17, Proceedings, Napa Valley, CA.

Gupta et al., "High-Speed Implementations of Rule-Based Systems," ACM Transactions on Computer Systems, May 1989, pp. 119-146, vol. 7, Issue 2.

Gupta et al., "Packet Classification on Multiple Fields", Computer Systems Laboratory, Stanford University, Stanford, CA.

Gupta et al., "PMM: A Parallel Architecture for Production Systems," Proceedings of the IEEE, Apr. 1992, pp. 693-696, vol. 2.

Gurtov, "Effect of Delays on TCP Performance", Cellular Systems Development, Sonera Corporation, online at http://cs.helsinki.fi/u/gurtov/papers/pwc01.pdf.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive MISD Architecture for Pattern Matching", IEEE Transactions on Very Large Scale Integration, vol. 12, No. 7, pp. 727-734, Jul. 2004.

Hauck et al., "Software Technologies for Reconfigurable Systems", Northwestern University, Dept. of ECE, Technical Report, 1996.

(56) References Cited

OTHER PUBLICATIONS

Hayes, "Computer Architecture and Organization", Second Edition, 1988, pp. 448-459, McGraw-Hill, Inc.
Herbordt et al., "Single Pass, BLAST-Like, Approximate String Matching on FPGAs", 14th Annual IEEE Symposium on Field-Programmable Custom Computing Machines (FCCM'06), Apr. 2006, pp. 1-10, IEEE.
Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.
Hoinville, et al. "Spatial Noise Phenomena of Longitudinal Magnetic Recording Media", IEEE Transactions on Magnetics, vol. 28, No. 6, Nov. 1992.
Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.
Howe, Data Analysis for Database Design Third Edition, 2001, 335 pages, Butterworth-Heinemann.
Hutchings et al., "Assisting Network Intrusion Detection with Reconfigurable Hardware", FCCM 2002: 10th Annual IEEE Symposium on Field-Programmable Custom Computing Machines, 2002.
International Search Report for PCT/US2001/011255 dated Jul. 10, 2003.
International Search Report for PCT/US2002/033286 dated Jan. 22, 2003.
International Search Report for PCT/US2003/015638 dated May 6, 2004.
International Search Report for PCT/US2004/016021 dated Aug. 18, 2005.
International Search Report for PCT/US2004/016398 dated Apr. 12, 2005.
International Search Report for PCT/US2005/030046; Sep. 25, 2006.
International Search Report for PCT/US2006/006105 dated Oct. 31, 2006.
International Search Report for PCT/US2006/045653 dated Jul. 8, 2008.
International Search Report for PCT/US2007/060835 dated Jul. 9, 2007.
International Search Report for PCT/US2007/075723 dated Jul. 25, 2008.
International Search Report for PCT/US2007/084464 dated Oct. 2, 2008.
International Search Report for PCT/US2007/084466 dated Jul. 23, 2008.
International Search Report for PCT/US2008/065955 dated Aug. 22, 2008.
International Search Report for PCT/US2008/066929 dated Aug. 29, 2008.
Invitation to Pay Additional Fees and Annex to Form PCT/ISA/206 Communication Relating to the Results of the Partial International Search for International Application PCT/US2003/015638 dated Feb. 3, 2004.
Jacobson et al., "RFC 1072: TCP Extensions for Long-Delay Paths", Oct. 1988.
Jacobson et al., "tcpdump—dump traffic on a network", Jun. 30, 1997, online at www.cse.cuhk.edu.hk/~cslui/CEG4430/tcpdump.ps.gz.
Jeanmougin et al., "Multiple Sequence Alignment with Clustal X", TIBS, 1998, vol. 23, pp. 403-405.
Johnson et al., "Pattern Matching in Reconfigurable Logic for Packet Classification", College of Computing, Georgia Institute of Technology, Atlanta, GA.
Jones et al., "A Probabilistic Model of Information Retrieval: Development and Status", Information Processing and Management, Aug. 1998, 76 pages.
Keutzer et al., "A Survey of Programmable Platforms—Network Proc", University of California—Berkeley, pp. 1-29.
Roy, "A bounded search algorithm for segmented channel routing for FPGA's and associated channel architecture issues", IEEE, Nov. 11, 1993, pp. 1695-1705, vol. 12.
Schmerken, "With Hyperfeed Litigation Pending, Exegy Launches Low-Latency Ticker Plant", in Wall Street & Technology Blog, Mar. 20, 2007, pp. 1-2.
Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.
Schuehler et al., "Architecture for a Hardware Based, TCP/IP Content Scanning System", IEEE Micro, 24(1):62-69, Jan.-Feb. 2004, USA.
Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.
Shah, "Understanding Network Processors", Version 1.0, University of California—Berkeley, Sep. 4, 2001.
Shalunov et al., "Bulk TCP Use and Performance on Internet 2", ACM SIGCOMM Internet Measurement Workshop, 2001.
Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.
Sidhu et al., "Fast Regular Expression Matching Using FPGAs", IEEE Symposium on Field Programmable Custom Computing Machines (FCCM 2001), Apr. 2001.
Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.
Singh et al., "The EarlyBird System for Real-Time Detection on Unknown Worms", Technical report CS2003-0761, Aug. 2003.
Sourdis and Pnevmatikatos, "Fast, Large-Scale String Match for a 10Gbps FPGA-based Network Intrusion Detection System", 13th International Conference on Field Programmable Logic and Applications, 2003.
Steinbach et al., "A Comparison of Document Clustering Techniques", KDD Workshop on Text Mining, 2000.
Sugawara et al., "Over 10Gbps String Matching Mechanism for Multi-Stream Packet Scanning Systems", Field Programmable Logic and Application Lecture Notes in Computer Science, 2004, pp. 484-493, vol. 3203.
Tan et al., "A High Throughput String Matching Architecture for Intrusion Detection and Prevention", ISCA 2005: 32nd Annual International Symposium on Computer Architecture, pp. 112-122, 2005.
Tau et al., "A First Generation DPGA Implementation", Third Canadian Workshop of Field-Programmable Devices, May 1995, pp. 138-143.
Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.
Taylor et al., "Generalized RAD Module Interface Specification of the Field Programmable Port Extender (FPX) Version 2", Washington University, Department of Computer Science, Technical Report, Jul. 5, 2001, pp. 1-10.
Taylor et al., "Modular Design Techniques for the FPX", Field Programmable Port Extender: Jan. 2002 Gigabit Workshop Tutorial, Washington University, St. Louis, MO, Jan. 3-4, 2002.
Taylor et al., "Scalable Packet Classification using Distributed Crossproducting of Field Labels", Proceedings of IEEE Infocom, Mar. 2005, pp. 1-12, vol. 20, No. 1.
Taylor, "Models, Algorithms, and Architectures for Scalable Packet Classification", doctoral thesis, Department of Computer Science and Engineering, Washington University, St. Louis, MO, Aug. 2004, pp. 1-201.
Thompson et al., "The CLUSTAL_X Windows Interface: Flexible Strategies for Multiple Sequence Alignment Aided by Quality Analysis Tools", Nucleic ikcids Research, 1997, vol. 25, No. 24, pp. 4876-4882.

(56) References Cited

OTHER PUBLICATIONS

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

Web-Pop (Professional Options Package) (www.pmpublishing.com).

West et al., "An FPGA-Based Search Engine for Unstructured Database", Proc. of 2nd Workshop on Application Specific Processors, Dec. 2003, San Diego, CA.

Wooster et al., "HTTPDUMP Network HTTP Packet Snooper", Apr. 25, 1996.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yan et al., "Enhancing Collaborative Spam Detection with Bloom Filters", 2006, IEEE, pp. 414-425.

Ziv et al., "A Universal Algorithm for Sequential Data Compression", IEEE Trans. Inform. Theory, IT-23(3): 337-343 (1997).

"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.

"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload Plus™ Agere System Interface", Agere Systems Product Brief, Jun. 2001, downloaded from Internet, Jan. 2002, pp. 1-6.

"RFC793: Transmission Control Protocol, Darpa Internet Program, Protocol Specification", Sep. 1981.

"Technology Overview", Data Search Systems Incorporated, downloaded from the http://www.datasearchsystems.com/tech.htm on Apr. 19, 2004.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Altschul et al., "Basic Local Alignment Search Tool", J. Mol. Biol., Oct. 5, 1990, 215, pp. 403-410.

Amer-Yahia et al., "XQuery 1.0 and XPath 2.0 Full-Text 1.0", W3C Working Draft, http://www.w3.org/TR/query-full-text/, May 18, 2007—parts 1-4.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Anonymous, "Method for Allocating Computer Disk Space to a File of Known Size", IBM Technical Disclosure Bulletin, vol. 27, No. 10B, Mar. 1, 1985, New York.

Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.

Artan et al., "Multi-packet Signature Detection using Prefix Bloom Filters", 2005, IEEE, pp. 1811-1816.

Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.

Baer, "Computer Systems Architecture", 1980, pp. 262-265; Computer Science Press, Potomac, Maryland.

Baeza-Yates et al., "New and Faster Filters for Multiple Approximate String Matching", Random Structures and Algorithms (RSA), Jan. 2002, pp. 23-49, vol. 20, No. 1.

Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.

Baker et al., "Time and Area Efficient Pattern Matching on FPGAs", ACM, Feb. 22-24, 2004, pp. 223-232.

Barone-Adesi et al., "Efficient Analytic Approximation of American Option Values", Journal of Finance, vol. 42, No. 2 (Jun. 1987), pp. 301-320.

Batory, "Modeling the Storage Architectures of Commercial Database Systems", ACM Transactions on Database Systems, Dec. 1985, pp. 463-528, vol. 10, issue 4.

Behrens et al., "BLASTN Redundancy Filter in Reprogrammable Hardware," Final Project Submission, Fall 2003, Department of Computer Science and Engineering, Washington University.

Berk "JLex. A lexical analyzer generator for Java™", downloaded from http://www.cs.princeton.edu/~appel/modern/java/Jlex/ in Jan. 2002, pp. 1-18.

Bianchi et al., "Improved Queueing Analysis of Shared Buffer Switching Networks", ACM, Aug. 1993, pp. 482-490.

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.

Cavnar et al., "N-Gram-Based Text Categorization", Proceedings of SDAIR-94, 3rd Annual Symposium on Document Analysis and Information Retrieval, Las Vegas, pp. 161-175, 1994.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Chamberlain et al., "The Mercury System: Embedding Computation Into Disk Drives", 7th High Performance Embedded Computing Workshop, Sep. 2003, Boston, MA.

Chamberlain et al., "The Mercury System: Exploiting Truly Fast Hardware for Data Search", Proc. of Workshop on Storage Network Architecture and Parallel I/Os, Sep. 2003, New Orleans, LA.

Chaney et al., "Design of a Gigabit ATM Switch", Washington University, St. Louis.

Chenna et al., "Multiple Sequence Alignment with the Clustal Series of Programs", Nucleic Acids Research, 2003, vol. 31, No. 13, pp. 3497-3500.

Cho et al., "Deep Packet Filter with Dedicated Logic and Read Only Memories", 12th Annual IEEE Symposium on Field-Programmable Custom Computing Machines, Apr. 2004.

Cho, "A Fast Regular Expression Indexing Engine", Proc. of 18th Int'l Conv. on Data Engineering, 2001, pp. 1-12.

Chodowiec et al., "Fast Implementations of Secret-Key Block Ciphers Using Mixed Inter- and Outer-Round Pipelining", Proceedings of International Symposium on FPGAs, pp. 94-102 (Feb. 2001).

(56) References Cited

OTHER PUBLICATIONS

Choi et al., "Design of a Flexible Open Platform for High Performance Active Networks", Allerton Conference, 1999, Champaign, IL.

Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept. of ECE, 1999, presented by Yi-Gang Tai.

Cong et al., "An Optional Technology Mapping Algorithm for Delay Optimization in Lookup-Table Based FPGA Designs", IEEE, 1992, pp. 48-53.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Dharmapurikar et al., "Deep Packet Inspection Using Parallel Bloom Filters," IEEE Micro, Jan.-Feb. 2004, vol. 24, Issue: 1, pp. 52-61.

Dharmapurikar et al., "Deep Packet Inspection Using Parallel Bloom Filters," Symposium on High Performance Interconnects (Hotl), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Dharmapurikar, "Fast and Scalable Pattern Matching for Content Filtering", ACM, ANCS 05, 2005, pp. 183-192.

Ebeling et al., "RaPiD—Reconfigurable Pipelined Datapath", University of Washington, Dept. of Computer Science and Engineering, Sep. 23, 1996, Seattle, WA.

Office Action for JP Application 2009-536535 dated Oct. 28, 2014.
Office Action for JP Application 2013-160166 dated Mar. 31, 2015.

* cited by examiner

METHOD AND SYSTEM FOR HIGH PERFORMANCE INTEGRATION, PROCESSING AND SEARCHING OF STRUCTURED AND UNSTRUCTURED DATA USING COPROCESSORS

CROSS-REFERENCE AND PRIORITY CLAIM TO RELATED PATENT APPLICATIONS

This patent application is a continuation of U.S. patent application Ser. No. 13/442,442, filed Apr. 9, 2012, now U.S. Pat. No. 8,880,501, which is a continuation of U.S. patent application Ser. No. 12/640,891, filed Dec. 17, 2009, now U.S. Pat. No. 8,156,101, which is a continuation of U.S. patent application Ser. No. 11/938,709, filed Nov. 12, 2007, now U.S. Pat. No. 7,660,793, which claims priority to U.S. provisional patent application 60/865,629 filed Nov. 13, 2006, the entire disclosures of each of which are incorporated herein by reference.

This patent application is related to U.S. patent application Ser. No. 11/938,732, filed Nov. 12, 2007, entitled "Method and System for High Performance Data Metatagging and Data Indexing Using Coprocessors", and published as U.S. Patent Application Publication 2008/0114725 A1, the entire disclosure of which is incorporated herein by reference.

This patent application is also related to U.S. patent application Ser. No. 13/686,338, filed Nov. 27, 2012, which is a continuation of the above-referenced '732 patent application.

FIELD OF THE INVENTION

The present invention is generally directed toward the field of database acceleration, particularly enterprise data warehouse acceleration, including areas such as enterprise data searching, document warehousing, text mining, text analytics, information access and enabling actionable intelligence.

TERMINOLOGY

The following paragraphs provide several definitions for various terms used herein. These paragraphs also provide background information relating to these terms.

GPP: As used herein, the term "general-purpose processor" (or GPP) refers to a hardware device having a fixed form and whose functionality is variable, wherein this variable functionality is defined by fetching instructions and executing those instructions (for example, an Intel Xeon processor or an AMD Opteron processor), of which a conventional central processing unit (CPU) is a common example.

Reconfigurable Logic: As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture.

Software: As used herein, the term "software" refers to data processing functionality that is deployed on a GPP or other processing devices, wherein software cannot be used to change or define the form of the device on which it is loaded.

Firmware: As used herein, the term "firmware" refers to data processing functionality that is deployed on reconfigurable logic or other processing devices, wherein firmware may be used to change or define the form of the device on which it is loaded.

Coprocessor: As used herein, the term "coprocessor" refers to a computational engine designed to operate in conjunction with other components in a computational system having a main processor (wherein the main processor itself may comprise multiple processors such as in a multi-core processor architecture). Typically, a coprocessor is optimized to perform a specific set of tasks and is used to offload tasks from a main processor (which is typically a GPP) in order to optimize system performance. The scope of tasks performed by a coprocessor may be fixed or variable, depending on the architecture of coprocessor. Examples of fixed coprocessor architectures include Graphics Processor Units which perform a broad spectrum of tasks and floating point numeric coprocessors which perform a relatively narrow set of tasks. Examples of reconfigurable coprocessor architectures include reconfigurable logic devices such as Field Programmable Gate Arrays (FPGAs) which may be reconfigured to implement a wide variety of fixed or programmable computational engines. The functionality of a coprocessor may be defined via software and/or firmware.

Hardware Acceleration: As used herein, the term "hardware acceleration" refers to the use of software and/or firmware implemented on a coprocessor for offloading one or more processing tasks from a main processor to decrease processing latency for those tasks relative to the main processor.

Enterprise: As used herein, the term "enterprise" refers to any business organization or governmental entity that stores and/or processes data (referred to as "enterprise data") as part of its ongoing operations.

Database: As used herein, the term "database" refers to a persistent data store with indexing capabilities to expedite query processing. Various database management system (DBMS) implementations might be categorized as relational (RDBMS), object-oriented (OODBMS), hierarchical, etc.; however, the dominant architecture in today's industry is a relational, row-column, structured query language (SQL)-capable database. An ANSI-standard SQL database engine is a mature software architecture that can retrieve structured data in response to a query, usually in an efficient manner.

Structured Data: As used herein, the term "structured data" refers to data that has been normalized and persisted to a relational database. Normalization is the data design process of putting data into a tabular, row-column format and abstracting duplicate data into separate tables. Structured data in relational columns is capable of being indexed with B-tree indexes, significantly speeding access to the data in these columns. In SQL terms, structured columns have size limits. These columns may have constraints and referential integrity applied to them in order to ensure consistent data quality. Examples of common structured SQL datatypes are: INT(eger), NUMBER, CHAR(acter), VARCHAR, DATE, TIMESTAMP. The processing of structured data is what known relational database technology is well-suited for. Very importantly, the present invention leverages these capabilities to do what relational databases do best: quickly access structured data using indexed lookups.

Unstructured Data: As used herein, the term "unstructured data" refers to data that falls outside the scope of the definition above for structured data. Thus, the term unstructured data encompasses files, documents or objects with free form text or embedded values included therein. This data includes the complete set of bytes, often including binary-format data, that was used by the application that generated it. Examples of unstructured data include word processing documents (e.g., Microsoft Word documents in their native format), Adobe Acrobat documents, emails, image files, video files, audio files, and other files in their native formats relative to the software application that created them. In SQL terms, unstructured columns have very large, if not unlimited size. Common examples of unstructured SQL datatypes are: BLOB, TEXT, XML, RAW, and IMAGE. Unstructured objects may also be stored outside the database, for example in operating system files. Access to these external objects from within the database engine uses links in the metadata in the database table to the storage location.

There are a number of reasons why XML is will not normally be categorized as "structured" as that term is used herein:
  XML may have large or unlimited sized values
  XML often does not have strongly enforced datatyping
  XML has a flexible schema
  XML values in elements and attributes is often not as rigidly conformed and carefully cleansed as traditional "structured" database columns Although the concept of "semi-structured" data with flexible schemas is emerging, particularly for XML, for present purposes everything that is not has not been normalized and persisted to a relational database will be considered unstructured data. As such, a column that is of the XML datatype would thus fall under this present definition of "unstructured data". XML data is a prime candidate for hardware-accelerated searching and integration as outlined in for the present invention.

Metadata: As used herein, the term "metadata" in the context of data objects and documents refers to data that describes or characterizes a data object or document. Examples of object and document metadata include but are not limited to file type, byte size, date created, date last modified, author, title, information about the document's/object's data source (optionally including the name and version number of the program used to generate the document), information about whether the data matches other data, subject coverage, classification information (e.g. information about its concepts, person/place/entity names that are found within the document/data object, word counts, etc.), position information relating to data within a document/object, or other content-derived information about documents/objects.

Bus: As used herein, the term "bus" refers to a logical bus which encompasses any physical interconnect for which devices and locations are accessed by an address. Examples of buses that could be used in the practice of the present invention include, but are not limited to the PCI family of buses (e.g., PCI-X and PCI-Express) and Hyper-Transport buses.

Pipelining: As used herein, the terms "pipeline", "pipelined sequence", or "chain" refer to an arrangement of application modules wherein the output of one application module is connected to the input of the next application module in the sequence. This pipelining arrangement allows each application module to independently operate on any data it receives during a given clock cycle and then pass its output to the next downstream application module in the sequence during another clock cycle.

Full-Text Search: As used herein, the term "full-text search" refers to scanning through the entire body of a document or object, considering every word or byte. This processing may allow for approximations, tokenization based on tagging for a flexible schema, wild-carding, or complex matching.

SQL-Enabled Client Application: As used herein, the term "SQL-enabled" in the context of a client application refers to a client application that is capable of accessing a relational SQL-based database server. The ANSI-standard SQL language has enabled a large number of advanced software client applications to evolve that all are capable of accessing a relational SQL-based database server. Examples of these SQL-enabled client applications include: Business Intelligence (BI) Reporting Tools, Extract Transfer Load (ETL) Tools, enterprise software applications (ERP, CRM, SAP), middleware, plus any of a large number of custom-built applications in a variety of programming languages.

Business Intelligence Reporting Tool: As used herein, the term "business intelligence reporting tool" (or "BI reporting tool") refers to a software application that provides user-friendly graphical interfaces (GUIs) for formulating search queries into relational databases and generating and presenting reports. A BI reporting tool translates a user-specified graphically-prepared query into a standardized database query such as a SQL command. The so-formulated SQL command is then delivered to an RDBMS to effectuate retrieval of the desired data.

Text Analytics and Text Mining: As used herein, the terms "text analytics" and "text mining" refer to algorithms that operate on document objects using complex language concepts such as semantics. Examples of text analytic/text mining processing include: named entity recognition, content extraction, document classification, document summarization, natural language processing, statistical pattern learning, and relevance ranking.

BACKGROUND OF THE INVENTION

Enterprises continue to store and manage their data in a variety of disparate manners. One manner by which enterprises store their data is within relational databases using relational database management systems (RDBMSs). The tabular, normalized data stored in such RDBMSs is commonly referred to as structured data. For example, an enterprise may format, cleanse, conform, and store its sales records and customer information as structured data within an RDBMS. A variety of well-known tools have been developed in the art for intelligently accessing such structured data, typically based on standardized data languages such as the Structured Query Language (SQL).

However, it is commonly estimated that such tabular structured data represents only a tiny fraction of the totality of an enterprise's stored data. The remainder of the stored data is typically comprised of unstructured data whose storage is usually spread out amongst a variety of different file systems and storage means within the enterprise. An explosion of unstructured objects and documents has left many enterprises with a serious case of "information overload". Intelligent and unified access to all of this structured and unstructured data has posed a difficult challenge. Contributing to this difficulty is the fact that, with many enterprises, storage of an enterprise's unstructured data is managed separately from the databases, often by different organizational units. A huge challenge that many organizations face is to efficiently and effectively integrate their structured data in relational databases with the rest of this relatively unorganized mass of other unstructured data including blobs. Structured data can provide answers to relatively straight-forward questions like "what?", "where?", "when?", "who?"; by using text analytics, unstructured data can answer more complex questions like "why?".

FIG. 1 illustrates this problem. With many enterprises, there is very little organization as to where all of the documents are located amongst a number of different servers spread throughout the enterprise. For example, the storage space 102 within which an enterprise stores its data may be spread amongst separate components such as a Document Management System A 104, a Network File Server B 106, and an Application Server C 108. To gain access and locate desired documents within this storage space, a user 100 will likely be forced to use different tools to access each of the different components (e.g., using a custom application to access system 104, using a software product such as Windows Explorer to access server 106, and using a custom Application Programming Interface (API) to access server C). To conduct a search for data on the Internet 110, still another tool would likely be used (e.g., a web search tool such as Google). With such a jumble of document locations and access means, the user must not only be knowledgeable as to where within the storage space 102 the documents of interest are located but also proficient in working with a number of different tools for accessing the disparate components 104, 106 and 108. Further still, through enterprise search capabilities like the one depicted in FIG. 1, the user does not have the ability to directly access and correlate his or her searches with other enterprise data that is stored in relational databases.

When a user's search includes some form of full-text search, the software that supports such full-text querying will often take a relatively long time to complete, particularly when the query requires scanning the entire bodies of many large documents. This slowness is due, in part, to inherent constraints on the performance of general purpose processors (GPPs) when executing traditional software. Current indexing techniques have important limitations to yielding "findability". Although indexing can be somewhat helpful in locating relevant documents, the task of searching for mis-spellings, alternate spelling variations, regular expressions, or searching for a large number of terms are problems not easily or quickly solved with current indexing solutions, and the time to create an effective index often becomes intractable. To state it differently, in order to build an effective index to help find something, it must be known beforehand what one is trying to find. One example of a shortcoming in conventional systems is that there is no easy or standard way to search for mis-spellings. These problems are compounded in situations where the data are dynamic or constantly changing.

Thus, with respect to an enterprise search environment such as that shown in FIG. 1, the inventors believe:
1) There is very little organization as to where all of the various documents are located amongst a number of servers in many different departments throughout the organization.
2) Search is dependent on the user knowing whether to look for documents. Multiple search interfaces are required.
3) The user does not have direct access to correlate other enterprise data in relational databases.
4) Queries may take quite a long time to process, especially where full-text search is required on many large documents.

With respect to structured data, SQL has enjoyed widespread deployment within industry because of its ability to provide a standardized, consistent programming interface to many relational databases. However, the inventors herein recognize that current attempts to standardize the integration of SQL for structured data with full-text search capabilities (or other processing capabilities such as text analytics and text mining) on unstructured data have shown a need for improvement. The implementations of these attempts often evidence performance bottlenecks. Several efforts have arisen to extend standard SQL to integrate structured, tabular data and various forms of unstructured data. For example, SQL/XML for relational access to semi-structured XML data, SQL/MM for unstructured multimedia data, SQL/MED for unstructured external data, and XQuery 1.0 and XPath 2.0 Full-Text 1.0 for searching XML data using regular expressions, wildcards, stemming, thesaurus and boolean operations. The inventors herein believe that these SQL extensions' abilities to deal with unstructured data largely represent an inconsistent and mixed jumble of dialects, which has hindered their widespread adoption in the IT industry. In the inventors' opinion, it is likely that serious performance issues have often slowed up these standardization efforts.

The widespread adoption of SQL has also lead to the development of a number of business intelligence (BI) reporting tools. The inventors believe that reporting tools' functionality for supporting unstructured text analysis is relatively limited and that a need exists in the art for improvements in this area. Most of these software tools have relatively modest abilities to perform full-text searches on unstructured data and other advanced text mining and analytics. The inventors reiterate their belief that the tools' performances have not been particularly efficient.

SUMMARY OF THE INVENTION

Accordingly, the inventors believe that there is a significant need in the art for a system that provides faster and more unified access to unstructured data. Moreover, the inventors herein further believe that there is a need in the art for a better manner by which structured and unstructured data are coordinated and integrated with each other to support intelligent access of unstructured data.

Toward these ends, the inventors disclose a new method and system configured to leverage hardware acceleration of the more complex unstructured data analysis during query processing in a manner that is tightly integrated with traditional standards-based query processing of structured data. In doing so, the present invention preferably harnesses the underlying hardware-accelerated technology disclosed in the following patents and patent applications: U.S. Pat. No. 6,711,558 entitled "Associated Database Scanning and Information Retrieval", U.S. Pat. No. 7,139,743 entitled "Associative Database Scanning and Information Retrieval using FPGA Devices", U.S. Patent Application Publication 2006/0294059 entitled "Intelligent Data Storage and Processing Using FPGA Devices", U.S. Patent Application Publication 2007/0067108 entitled "Method and Apparatus for Performing Biosequence Similarity Searching", U.S. Patent Application Publication 2008/0086274 entitled "Method and Apparatus for Protein Sequence Alignment Using FPGA Devices" (published from U.S. Application Ser. No. 11/836,947, filed Aug. 10, 2007), U.S. Patent Application Publication 2007/0130140 entitled "Method and Device for High Performance Regular Expression Pattern Matching", U.S. Patent Application Publication 2007/0260602 entitled "Method and Apparatus for Approximate Pattern Matching" (published from U.S. patent application Ser. No. 11/381,214, filed May 2, 2006), U.S. Patent Application Publication 2007/0174841 entitled "Firmware Socket Module for FPGA-Based Pipeline Processing", and U.S. Patent Application Publication 2007/0237327 entitled "Method and System for High Throughput Blockwise Independent Encryption/Decryption"), the entire disclosures of each of which are incorporated herein by reference.

This hardware acceleration is applied toward those portions of query handling that are well-suited to hardware acceleration (e.g., full-text search operations performed on unstructured data). To intelligently limit which unstructured data should be applied to the hardware-accelerated data processing operation (and thereby speed the overall response time), a system that embodies the present invention may also employ indexed queries of structured data stored in a database. Preferably, these queries are formulated as standardized indexed database queries, such as SQL commands directed toward RDBMSs. In this manner, users can formulate queries targeted toward both structured and unstructured data in a familiar way. An API in accordance with a preferred embodiment of the invention can be employed to effectively bifurcate query processing into a structured data portion and a hardware-accelerated unstructured data portion.

The hardware-accelerated data processing operation is preferably carried out by computer resources other than a GPP (preferably a coprocessor such as a reconfigurable logic device on which firmware is deployed), as described in the above-referenced and incorporated patents and patent applications. By utilizing a coprocessor for this purpose, significant acceleration in query processing is attained relative to conventional solutions that perform full-text searching of unstructured data using traditional software executed by GPPs, thereby freeing the system's GPP(s) to perform other system tasks.

The structured and indexed data that aids the query handling process preferably comprises at least in part the object's (e.g.

document's) metadata. This metadata, which is preferably stored in structured relational tables within an RDBMS, can be queried using standardized queries such as SQL commands to identify which subsets of unstructured data should be streamed through the coprocessor. In effect, according to one aspect, the present invention essentially SQL-enables the data processing capabilities of the coprocessor.

Preferably, the unstructured data that has been indexed with metadata is stored within high-performance disk space within an appliance that employs the coprocessor on which the data processing functionality for the unstructured data is deployed. In this manner, the unstructured data can be streamed through the coprocessor without network bandwidth constraints. The unstructured data can also be stored in some location that is accessible to appliance 200 via a high speed network.

The inventors herein further disclose that the generation of metadata from unstructured objects can also be hardware accelerated using a coprocessor (preferably using a coprocessor in the form of a reconfigurable logic device with appropriate firmware deployed thereon). Unstructured objects for which metadata is to be generated can be streamed through the appropriately-configured coprocessor to thereby expedite the generation of metadata that is used to index that unstructured data. Following this metadata generation, the entire bodies of these unstructured objects are preferably ingested into the disk space of the appliance.

The metadata is also preferably stored in an RDBMS internal to the appliance, but it should be noted that structured data stored in other relational databases external to the appliance can also be accessed as part of the query processing functionality of a preferred embodiment of the present invention.

The inventors envision that, in addition to the generalized data search described below, the present invention can be applied toward a myriad of applications. For example, in health care case management, various disparate data sources such as clinical research databases, patient record databases, databases of insurance and regulatory filings, and regulations databases can be integrated through the appliance described herein, thereby enhancing the abilities of health care organizations with respect to enhancing diagnoses, reducing misdiagnoses, ensuring adequate treatment, promoting quality of service, increasing utilization of available resources, reducing fraud, controlling costs and other goals.

In the scientific field, disparate data sources such as scientific and clinical literature, medical treatment records and reports, chemical compound databases, pharmaceutical databases, medical symptom databases and the like can be integrated using the appliance described herein. In this manner, the desirable goals include extracting relationships among biomedical and chemical entities, genetic markers—e.g., proteins and genes, base sequences—and symptoms—patterns such as "A inhibits B", "A activates B", and "A is associated with B". Entity extraction in the context can refer to recognition of gene, protein, chemical, symptom and syndrome names and signatures from biomedical and chemical texts based on domain dictionaries.

In the intelligence and counter-terrorism field, disparate data sources such as news and investigative reports, communications intercepts, documents, and case files (all in a variety of languages) can be integrated through the appliance described herein. The targets and patterns that can be detected through integrated and intelligent access to this data includes organizational associations and networks, behavioral/attack patterns, threat assessment, strategy development, tactical evaluation, and event prediction.

In the law enforcement field, similar data sources to the intelligence/counter-terrorism field can be integrated, along with crime and court reports, legal documents, as well as geographic and demographic data using the appliance described herein. Goals of such integration would include detection of crime patterns (temporal, geospatial, interpersonal, and/or organizational) as well as support of criminal investigations and prosecutions.

In the securities fraud detection field, disparate data sources such as financial and news reports, corporate filings and documents, and trading and other transactional records can all be integrated using the appliance described herein, thereby enhancing the ability to detect such activities as insider trading, reporting irregularities, money laundering, illegal transactions, and pricing anomalies.

In the field of customer relationship management (CRM), disparate data sources such as customer email and letters, call center notes and transcripts, as well as other customer data maintained in existing CRM systems can all be integrated using the appliance described herein. Through such integration, one can potentially identify product and service quality issues, and assist in product design and management.

In the reputation management field, disparate data sources can include news reports, web pages, and market analyses can be integrated using the appliance described herein to perform text mining and pattern detection operations that reveal the state of an enterprise's relations with the public.

Similarly, the appliance described herein can be used as a social network analysis tool that analyzes email and other communications, corporate documents, and news reports to determine the connectedness of individuals and organizations.

Other areas that are believed to be ripe for the deployment of the appliance described herein include operations management, competitive intelligence, legal discovery (e.g., where a plaintiff in a law suit requests all data maintained or under the control of the defendant that relates to "John Smith"), content rights management, regulatory compliance, and others.

Furthermore, the invention described herein can be used to significantly accelerate metadata generation operations that are performed on data, including automated generation of content-derived metadata.

These and other features and advantages of the present invention will be apparent to those having ordinary skill in the art upon review of the following description and drawings.

DETAILED DESCRIPTION OF THE PREFERRED EMBODIMENT

Figure 1:
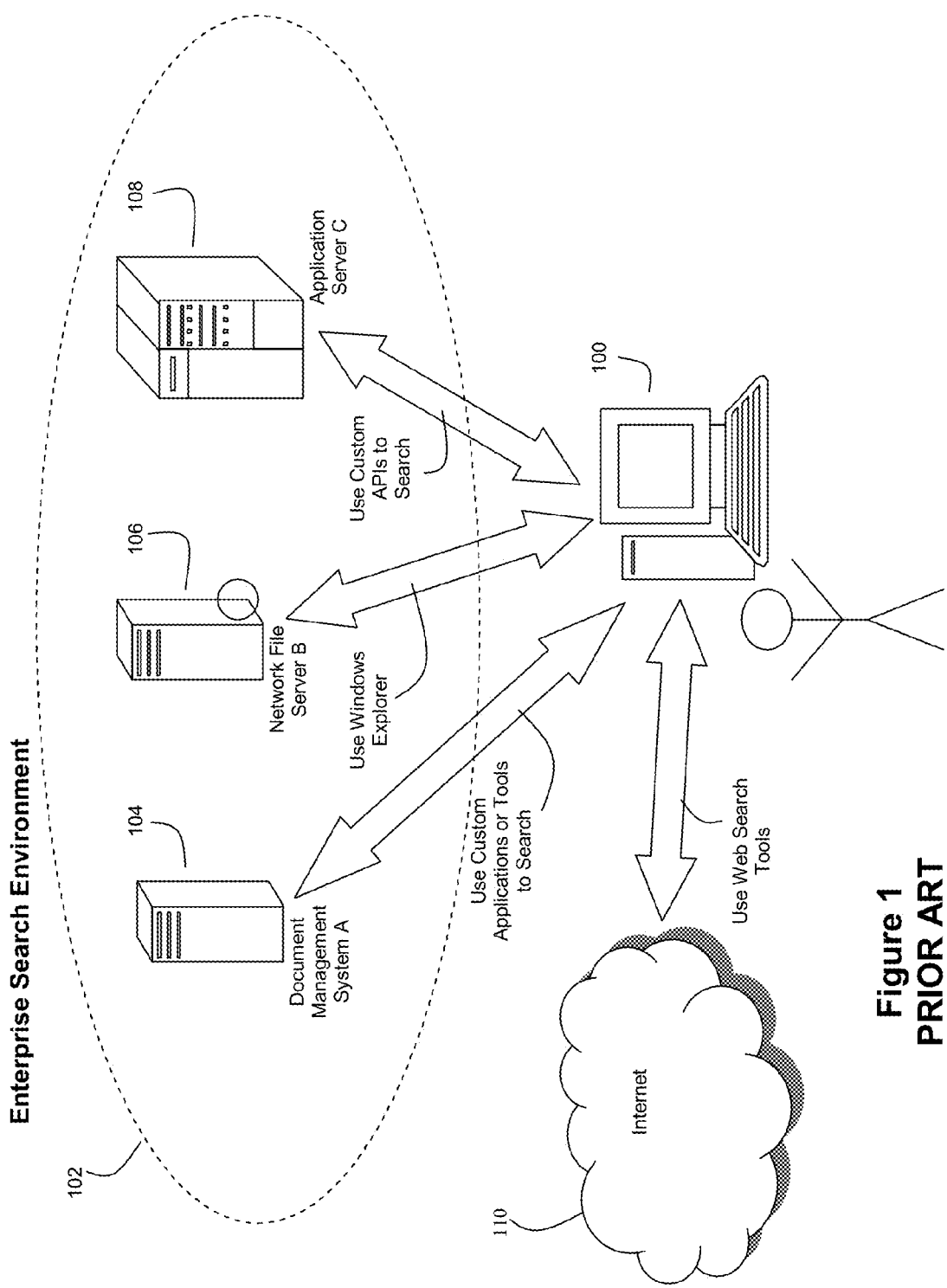
FIG. 1 illustrates a conventional manner by which enterprises provide users with access to their data.
Figure 2:
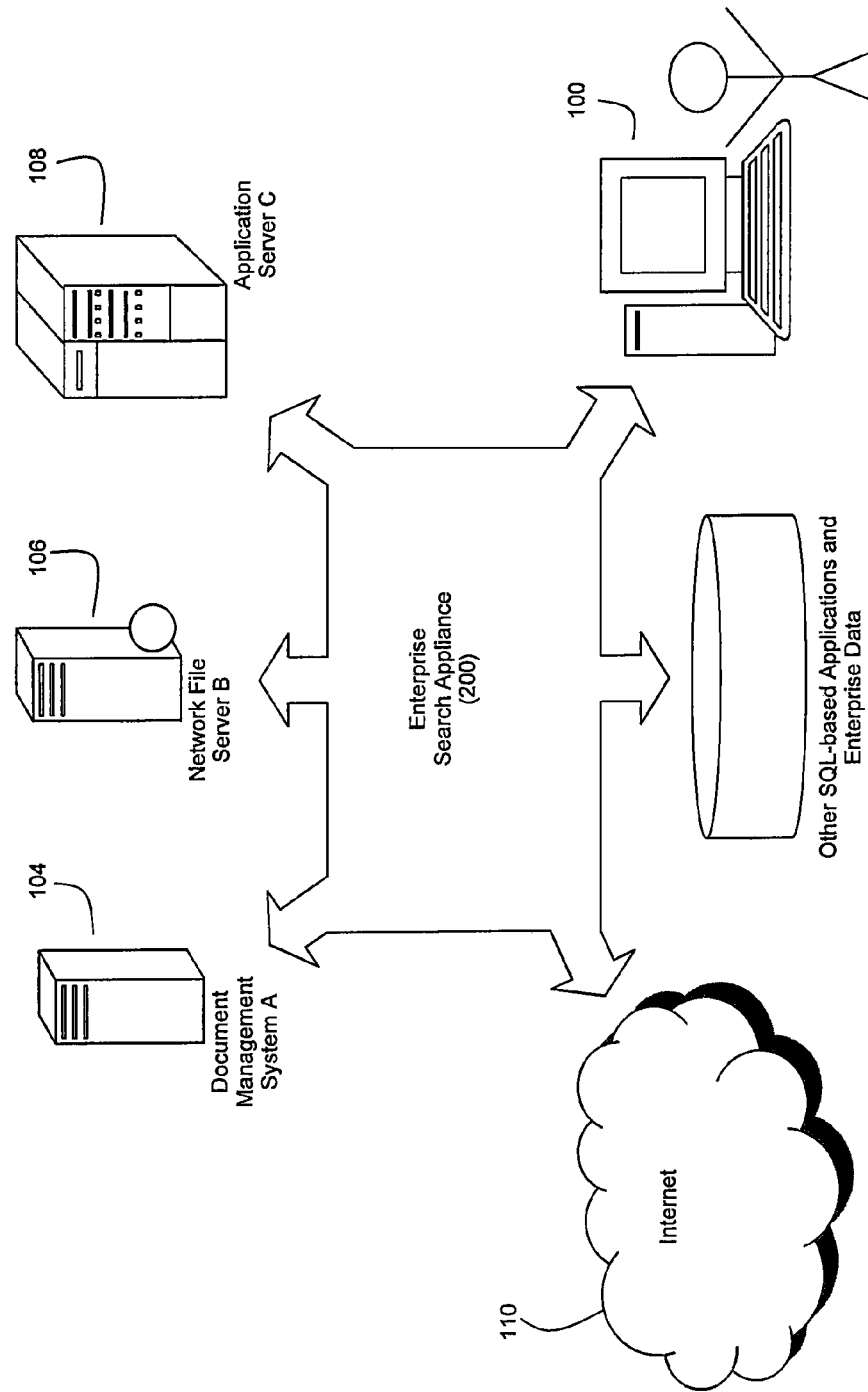
FIG. 2 illustrates an exemplary embodiment of the present invention.

FIG. 2 depicts an overview of a preferred embodiment of the present invention, wherein an enterprise appliance 200 is configured to provide a user of user computer 100 with intelligent and unified access to structured data (such as that stored by relational database 210) and unstructured data (such as that stored and accessible through components 104, 106 and 108 or through the Internet 110). While an embodiment of appliance 200 can be referred to as a search appliance, it should be noted that data analysis functionalities other than or in addition to searching can be supported by appliance 200, as explained herein.

Figure 4:
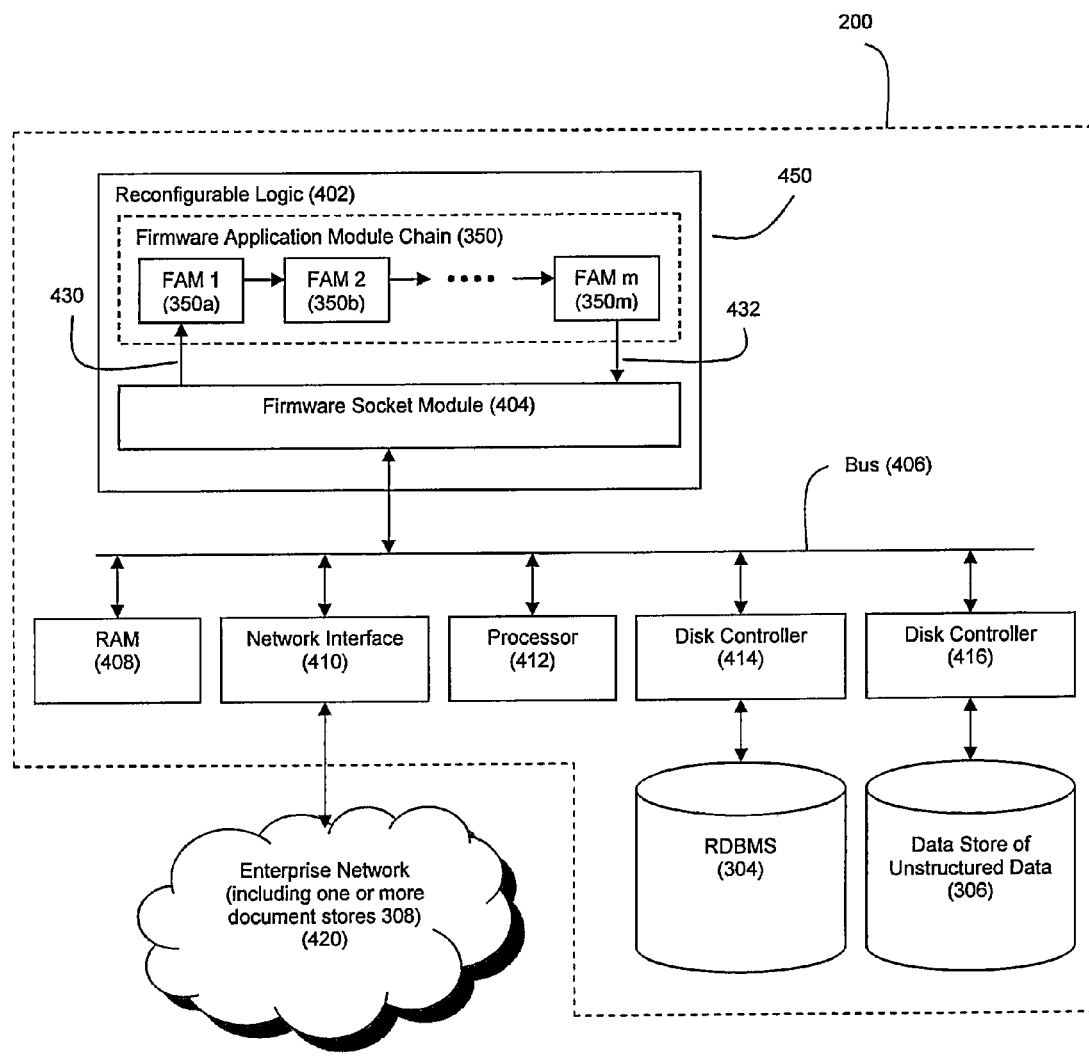
FIG. 4 illustrates an exemplary search appliance in accordance with an embodiment of the present invention.
Figure 18A:
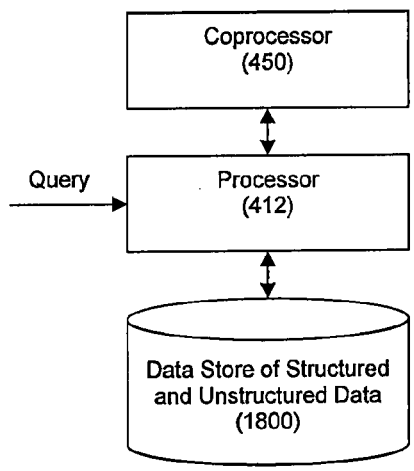
FIGS. 18(a) and (b) illustrate an exemplary embodiment wherein the structured data and the unstructured data are stored in a common data store.

Preferably, search appliance 200 employs a hardware-accelerated data processing capability as well as a query handling API for handling queries directed at least partially toward structured data. FIG. 4 depicts a preferred embodiment for the appliance 200. Within appliance 200, a coprocessor 450 is positioned to receive data that streams off either or both a disk subsystem defined by disk controllers 414 and 416 and by data stores 304 and 306 (either directly or indirectly by way of system memory such as RAM 408) and a network 420 (via network interface 410). Data store 304 comprises an RDBMS in which structured relational data is stored, while data store 306 comprises a file system in which unstructured data is stored. It should be noted, however, that unstructured data may optionally also be stored in an unstructured data column within RDBMS 304, as described below in connection with FIGS. 18(a) and (b). Network 420 preferably comprises an enterprise network (whether LAN or WAN), in which various disparate document stores 308 (e.g., components 104, 106 and/or 108) are located. While data store 304 is characterized as a data store for structured data, it should be noted that data store 304 may optionally contain unstructured data blobs which can also be subjected to ingest and query processing.

In a preferred embodiment, the coprocessor 450 comprises a reconfigurable logic device 402. Preferably, data streams into the reconfigurable logic device 402 by way of system bus 406, although other design architectures are possible (see FIG. 7(b)). Preferably, the reconfigurable logic device 402 is a field programmable gate array (FPGA), although this need not be the case. System bus 406 can also interconnect the reconfigurable logic device 402 with the appliance's processor 412 as well as the appliance's RAM 408. In a preferred embodiment, system bus 406 may be a PCI-X or PCI-Express bus, although this need not be the case.

The data store 306 can be any data storage device/system, but is preferably some form of a mass storage medium. For example, the data store 306 can be a magnetic storage device such as an array of disks. However, it should be noted that other types of storage media are suitable for use in the practice of the invention.

The computer system defined by processor 412 and RAM 408 can be any commodity computer system as would be understood by those having ordinary skill in the art. For example, the computer system may be an Intel Xeon system or an AMD Opteron system. Thus, processor 412, which serves as the central or main processor for appliance 200, preferably comprises a GPP.

The reconfigurable logic device 402 has firmware modules deployed thereon that define its functionality. The firmware socket module 404 handles the data movement requirements (both command data and target data) into and out of the reconfigurable logic device, thereby providing a consistent application interface to the firmware application module (FAM) chain 350 that is also deployed on the reconfigurable logic device. The FAMs 350i of the FAM chain 350 are configured to perform specified data processing operations on any data that streams through the chain 350 from the firmware socket module 404. Preferred examples of FAMs that can be deployed on reconfigurable logic in accordance with a preferred embodiment of the present invention are described below.

The specific data processing operation that is performed by a FAM is controlled/parameterized by the command data that FAM receives from the firmware socket module 404. This command data can be FAM-specific, and upon receipt of the command, the FAM will arrange itself to carry out the data processing operation controlled by the received command. For example, within a FAM that is configured to perform an exact match operation, the FAM's exact match operation can be parameterized to define the key(s) that the exact match operation will be run against. In this way, a FAM that is configured to perform an exact match operation can be readily re-arranged to perform a different exact match operation by simply loading new parameters for one or more different keys in that FAM.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. Not only will the FAM operate at hardware speeds (thereby providing a high throughput of target data through the FAM), but the FAMs can also be flexibly reprogrammed to change the parameters of their data processing operations.

The FAM chain 350 preferably comprises a plurality of firmware application modules (FAMs) 350a, 350b, ... that are arranged in a pipelined sequence. However, it should be noted that within the firmware pipeline, one or more parallel paths of FAMs 350i can be employed. For example, the firmware chain may comprise three FAMs arranged in a first pipelined path (e.g., FAMs 350a, 350b, 350c) and four FAMs arranged in a second pipelined path (e.g., FAMs 350d, 350e, 350f, and 350g), wherein the first and second pipelined paths are parallel with each other. Furthermore, the firmware pipeline can have one or more paths branch off from an existing pipeline path. A practitioner of the present invention can design an appropriate arrangement of FAMs for FAM chain 350 based on the processing needs of a given application.

A communication path 430 connects the firmware socket module 404 with the input of the first one of the pipelined FAMs 350a. The input of the first FAM 350a serves as the entry point into the FAM chain 350. A communication path 432 connects the output of the final one of the pipelined FAMs 350m with the firmware socket module 404. The output of the final FAM 350m serves as the exit point from the FAM chain 350. Both communication path 430 and communication path 432 are preferably multi-bit paths.

The nature of the software and hardware/software interfaces used by appliance 200, particularly in connection with data flow into and out of the firmware socket module are described in greater detail in the above-referenced and incorporated U.S. Patent Application Publication 2007/0174841.

Figure 7A:
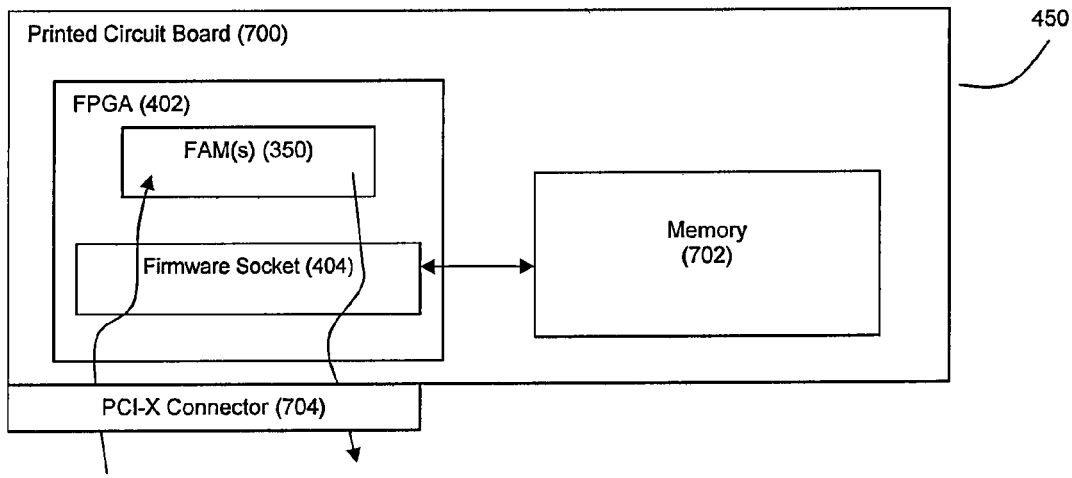
FIGS. 7(a) and (b) illustrate exemplary printed circuit boards for use in the search appliance of FIG. 4.

FIG. 7(a) depicts a printed circuit board or card 700 that can be connected to the bus 406 of a commodity computer system for use as a coprocessor 450 in appliance 200. In the example of FIG. 7(a), the printed circuit board includes an FPGA 402 (such as a Xilinx Virtex II FPGA) that is in communication with a memory device 702 and a PCI-X bus connector 704. A preferred memory device 702 comprises SRAM and DRAM memory. A preferred bus connector 704 is a standard card edge connector.

Figure 7B:
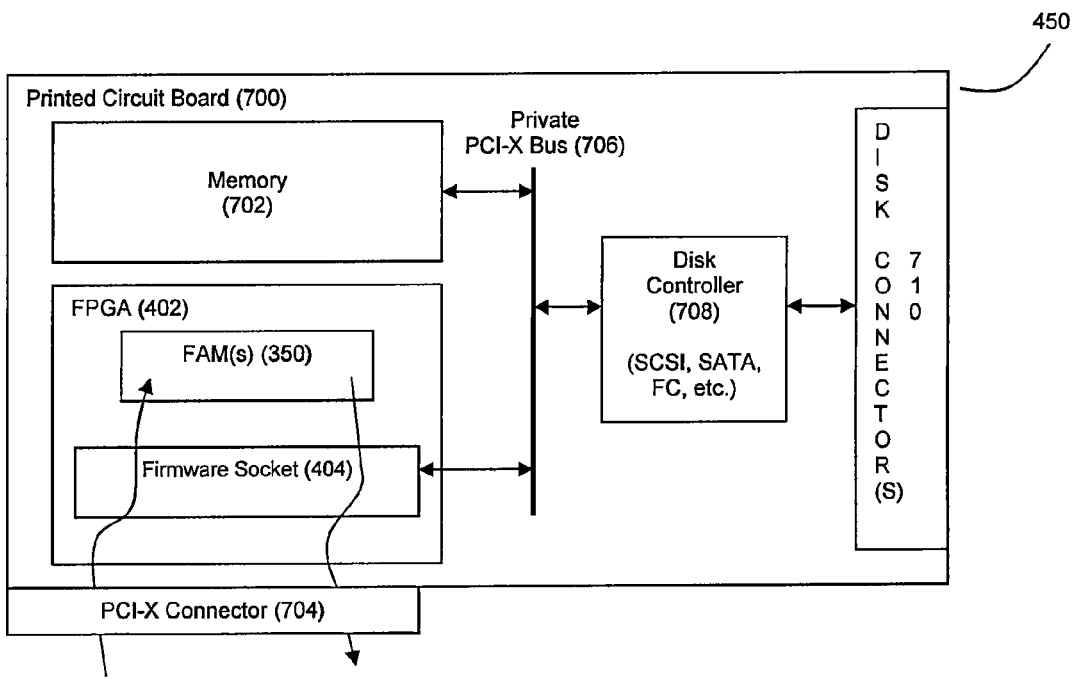

FIG. 7(b) depicts an alternate configuration for a printed circuit board/card 700. In the example of FIG. 7(b), a bus 706 (such as a PCI-X bus), one or more disk controllers 708, and a disk connector 710 are also installed on the printed circuit board 700. Any commodity disk interface technology can be supported, as is understood in the art. In this configuration, the firmware socket 404 also serves as a PCI-X to PCI-X (or PCI-e to PCI-e) bridge to provide the processor 412 with normal access to the disk(s) connected via the private PCI-X or PCI-e bus 706. It should be noted that a network interface can be used in addition to or in place of the disk controller and disk connector shown in FIG. 3(b).

Figure 8:
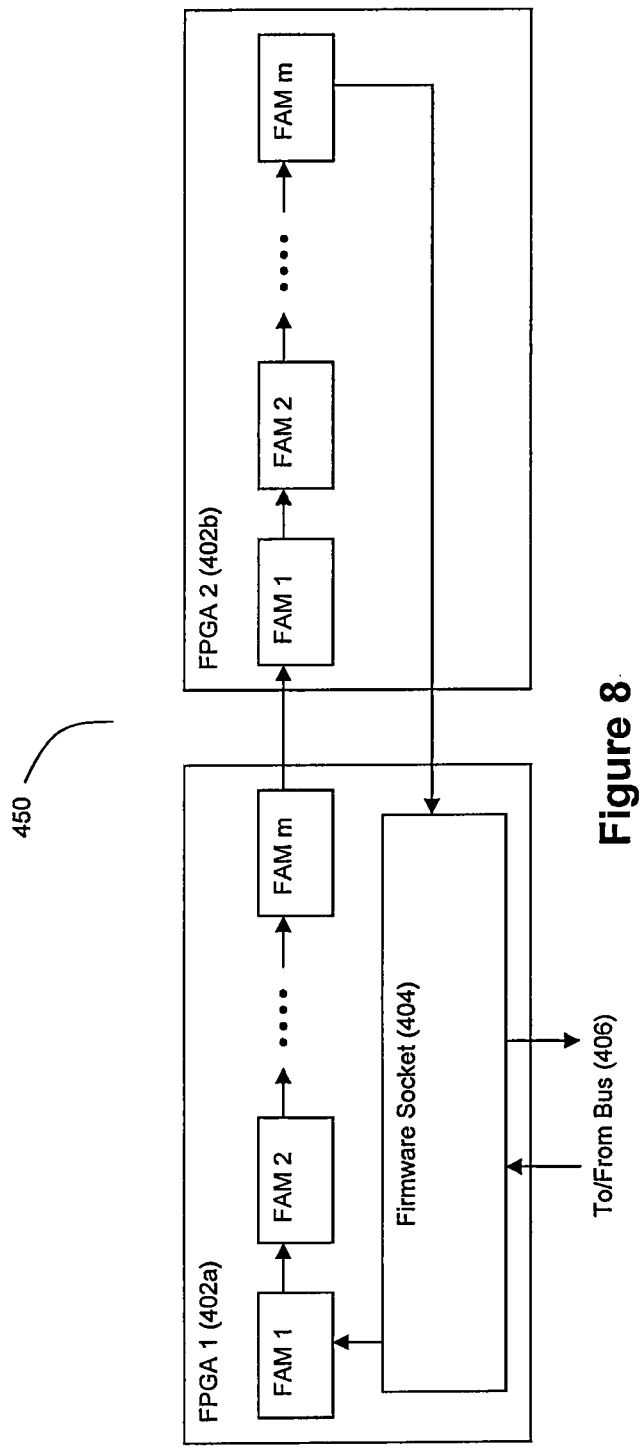
FIG. 8 illustrates an example of how a firmware pipeline can be deployed across multiple reconfigurable logic devices.

It is worth noting that in either the configuration of FIG. 7(a) or 7(b), the firmware socket 404 can make memory 702 accessible to the PCI-X bus, which thereby makes memory 702 available for use by an OS kernel as the buffers for transfers from the disk controller and/or network interface controller to the FAMs. It is also worth noting that while a single FPGA 402 is shown on the printed circuit boards of FIGS. 7(a) and (b), it should be understood that multiple FPGAs can be supported by either including more than one FPGA on the printed circuit board 700 or by installing more than one printed circuit board 700 in the appliance 200. FIG. 8 depicts an example where numerous FAMs in a single pipeline are deployed across multiple FPGAs.

In the exemplary embodiments discussed herein, the term "documents" will be used to describe the unstructured data that is processed through the inventive system. However, it should be noted that the usage of the term "documents" is meant to be only exemplary as other forms unstructured data can also be processed using the inventive system and method.

An optional configuration that may enhance performance of appliance 200 is the ability to bring a large number (possibly all) of an enterprise's documents into its on-board data store 306. Furthermore, it is preferred that in doing so, the appliance 200 build metadata about each document that it ingests. This document metadata comprises structured data that can then be stored in a relational database system such as in on-board RDBMS 304.

Figure 3:
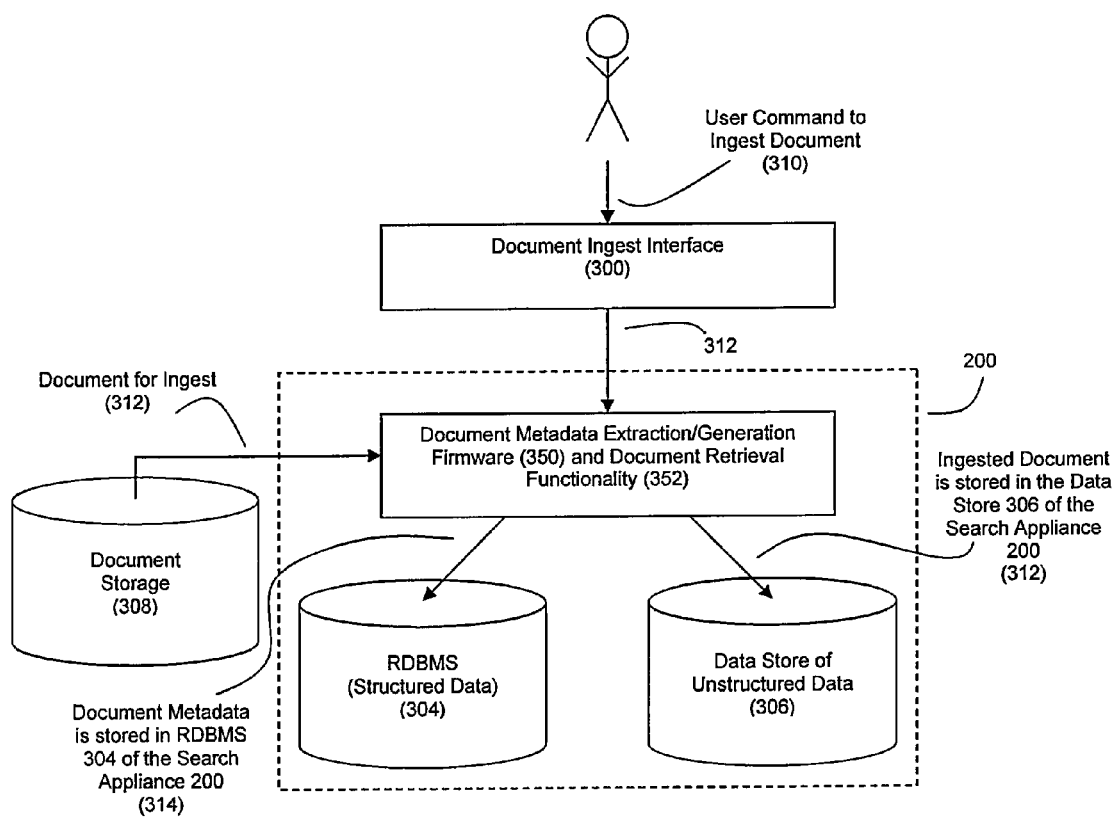
FIG. 3 illustrates an exemplary overview of a document ingest pre-processing operation in accordance with an embodiment of the present invention.

FIG. 3 depicts an overview of document ingest pre-processing in accordance with one aspect of the preferred embodiment. Preferably, through some form of document ingest GUI 300 displayed on user computer 100, the user is able to specify which document(s) should be ingested into data store 306. Optionally, the user can also key in various forms of metadata about the document(s) to be ingested; however this need not be the case as the coprocessor 450 (preferably a reconfigurable logic device 402 with firmware 350 deployed thereon) can be arranged to perform the desired metadata generation operations automatically. In response to an appropriate user command through GUI 300, one or more documents 312 stored in a data store 308 accessible through the enterprise network 420, but external to the appliance 200, is delivered to the appliance 200. Various adapters can be employed in document retrieval functionality 352 employed by the appliance 200 to provide access to documents stored on common file systems such as NTFS, FAT, CIFS, various flavors of Unix file systems, as well as Web access over HTTP.

FAMs resident in firmware pipeline 350 are preferably arranged to perform a document metadata generation operation on the documents it receives. Examples of document metadata generation techniques that could be employed in firmware 350 include but are not limited to part-of-speech tagging, information and entity extraction, document classification, document clustering, and text summarization. Functionally, these operations can be viewed as a series of "transformations" on a data stream of one or more documents. One illustrative example of a document classification operation that can be performed on documents includes language classification. With language classification, the document can be applied to a statistical n-gram algorithm that is configured to identify the language that the text within the document most closely matches. Other document classification operations can employ hidden Markov models (HMMs) to learn some type of classification for the document. Further still, regular expression pattern matching can be employed by the firmware 350 to further develop classification information about a document. As an example, a document classifier that can be used may be a flag that identifies whether the document in question contains a credit card number; in such cases, firmware 350 can include FAMs that implement a regular expression pattern matching operation, wherein this regular expression pattern matching operation is keyed around determining whether a document streamed therethrough includes a data pattern that looks like a credit card number. Based on the results of this operation, the credit card indicator metadata can be set to positive or negative.

It is believed that conventional approaches to metadata generation operations have built these operations into software executed by a main processor such as processor 412, which as explained above, exhibits performance shortcomings. The inventors believe that by offloading these metadata generation operations to a coprocessor 450, significant acceleration can be achieved. Additional details regarding the use of coprocessors to perform metadata generation operations can be found in the above-referenced and incorporated U.S. patent application Ser. No. 11/938,732 entitled "Method and System for High Performance Data Metatagging and Data Indexing Using Coprocessors".

The document metadata 314 that is produced by the operation of firmware 350 can then be stored in RDBMS 304, wherein the RDBMS engine operates to generate and maintain an index of this document metadata that can later be queried using standardized database queries to identify which documents within data store 306 should be processed through the coprocessor 450 at hardware speeds during query processing. After the received document 312 has been processed by firmware 350, document 312 can then be ingested into the appliance by storing it in the data store 306 of unstructured data. The acts of metadata generation and document ingestion preferably operate virtually concurrently in near-real time. It should be noted that the document metadata 314 can optionally be stored in a structured database external to the appliance 200.

Figure 5:
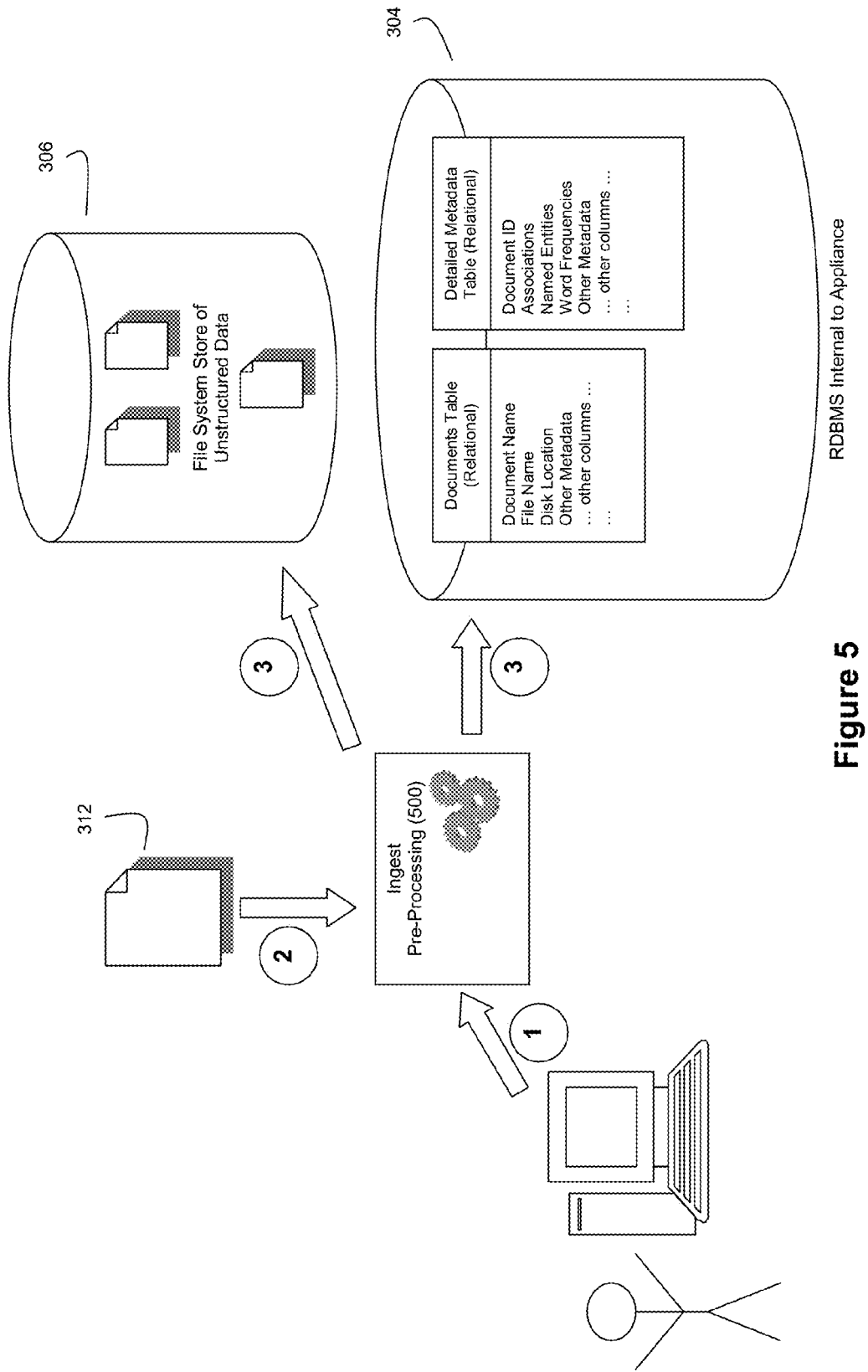
FIG. 5 illustrates an exemplary logical view of a document ingest pre-processing operation in accordance with an embodiment of the present invention.
Figure 6:
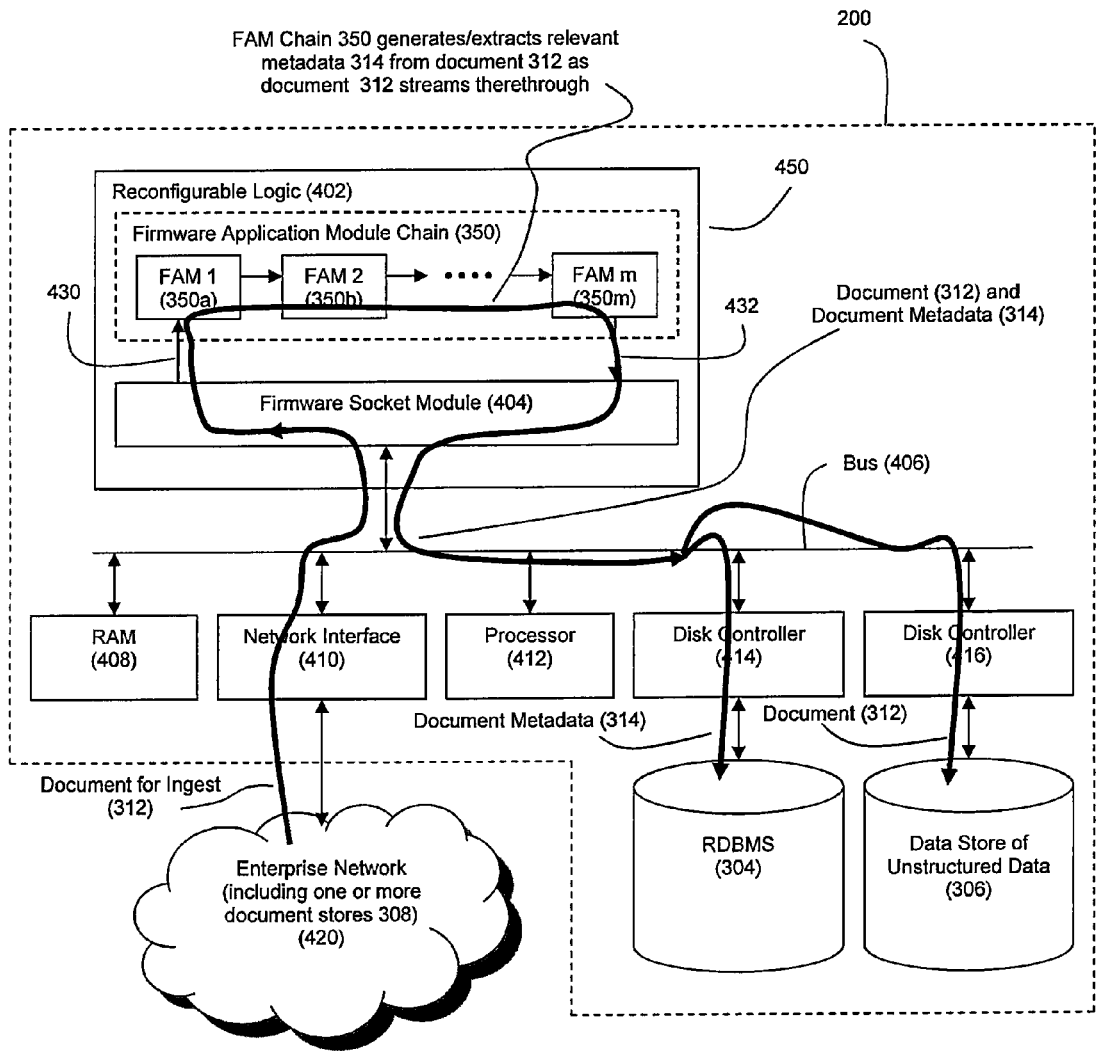
FIG. 6 illustrates an exemplary data flow within the search appliance of FIG. 4 for a document ingest pre-processing operation in accordance with an embodiment of the present invention.

FIG. 5 depicts this document ingest pre-processing as a logical flow. At step 1, the user interacts with GUI 300 to identify a new document 312 for ingestion into appliance 200. This can include the user configuring a new document data source. Furthermore, this configuration can include fields to extract, classification hierarchies, or named entities. GUI 300 may optionally be configured to allow the user to specify what metadata is to be generated from document 312. Next, at step 2, the document 312 is retrieved from its original source location (either an enterprise document store 308, the Internet or some other network that is accessible to the enterprise network 420). Then, firmware 350 performs its document metadata generation operation 500 on document 312 to produce document metadata 314. At step 3, the document 312 is then stored in the file system of data store 306 (see the upper branch of the flow labeled "3" in FIG. 5), and the document metadata (including its location in the file system of data store 306) is saved into relational tables of the RDBMS 304 (see the lower branch of the flow labeled "3" in FIG. 5). As shown in FIG. 5, a document, in its native format, can be brought into high-performance storage on a file system within the appliance for the upper portion of step 3. Furthermore, the lower portion of step 3 in FIG. 5 shows how the document metadata from the pre-processing can be saved in the relational tables in a database inside the appliance. This step can leverage FPGA processing, and it adds little or no latency. FIG. 6 illustrates this data flow superimposed over appliance 200.

In this manner, appliance 200 can now use the document metadata 314 indexed by RDBMS 304 to aid decisions as to which documents should be subjected to a query-specified data processing operation (e.g., a full-text searching operation) via coprocessor 450. Furthermore, because standardized RDBMS technology has been leveraged within appliance 200, standardized database queries that are well-known to a number of users can be used to decide which documents are to be subjected to the coprocessor-based data processing operation when processing a given query 904.

It is generally preferred that the relational database 304 use indexing methodologies such as B-tree indexes to optimize queries of the document metadata 314. Also, because of the richness of the indexes that can be generated via the hardware-accelerated metadata generation. Sophisticated full-text searching operations, including proximity searching (i.e., finding instances where Word X is separated from Word Y by less than Z word positions), can be efficiently accomplished by leveraging the power of the indexes.

Furthermore, when an enterprise adopts appliance 200 to aid its enterprise data handling operations, the document ingest pre-processing can be applied not only prospectively to newly-created documents but also retroactively to all or a significant subset of the enterprise's already existing documents. Thus, when installing the appliance 200, an enterprise may want to ingest all or a significant subset of its documents through the appliance as specified in connection with FIGS. 3, 5 and 6 to enable effective and efficient document searching. However, it should be noted that the documents subjected to the ingest pre-processing described in connection with FIGS. 3, 5 and 6 need not be limited to documents external to appliance 200. The pre-processing can also be applied to documents within data store 306 that had not previously been subjected to the metadata generation operation or to documents in need of new metadata generation operations.

It should also be noted that the storage 308 from which documents are ingested into appliance 200 for pre-processing can be any data store accessible through the enterprise network (e.g., enterprise data stores within enterprise network 420 and data stores that are external to the enterprise network but nevertheless accessible thereto). For example, the documents that are ingested into appliance 200 can be Internet content such as web pages.

Once document metadata 314 for a significant number of documents 312 has been stored in RDBMS 304, the appliance 200 is now ready to handle user-specified queries. An API within appliance 200 is preferably configured to enable the appliance to process standardized database queries against the document metadata 314 in RDBMS 304 and then use the result set of the query to determine which documents should be delivered to coprocessor 450 for a query-specified data processing operation.

Figure 9:
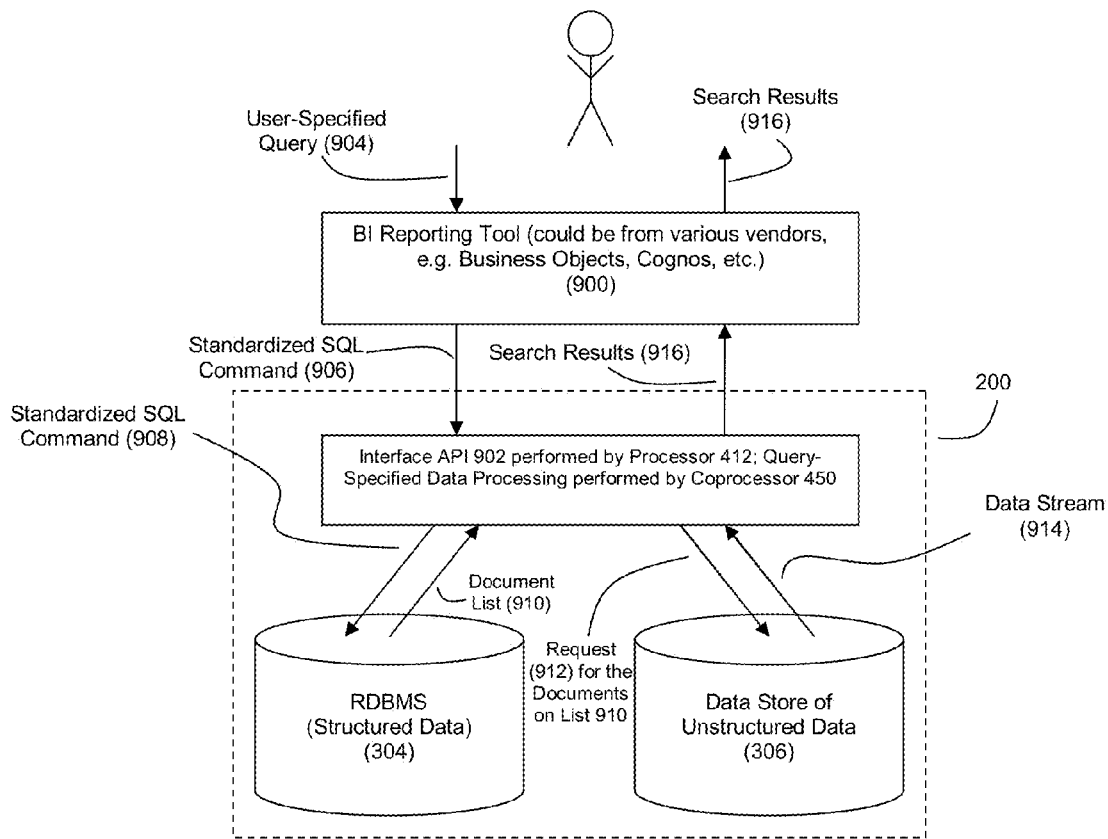
FIG. 9 illustrates an exemplary overview of a query processing operation in accordance with an embodiment of the present invention.
Figure 10A:
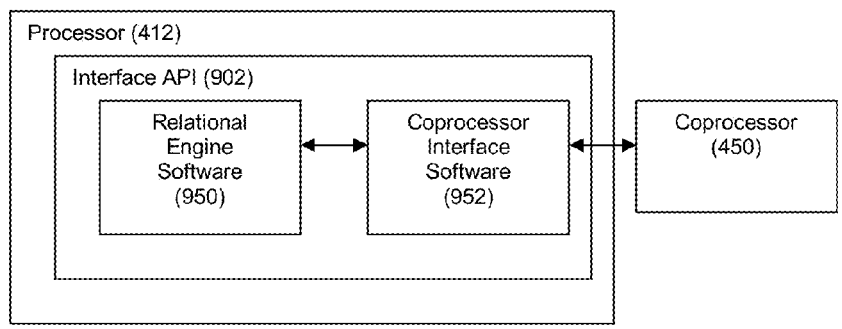
FIG. 10(a) is a diagram illustrating an exemplary relationship between the processor and coprocessor with respect to how interactions with a relational database are performed.
Figure 16:
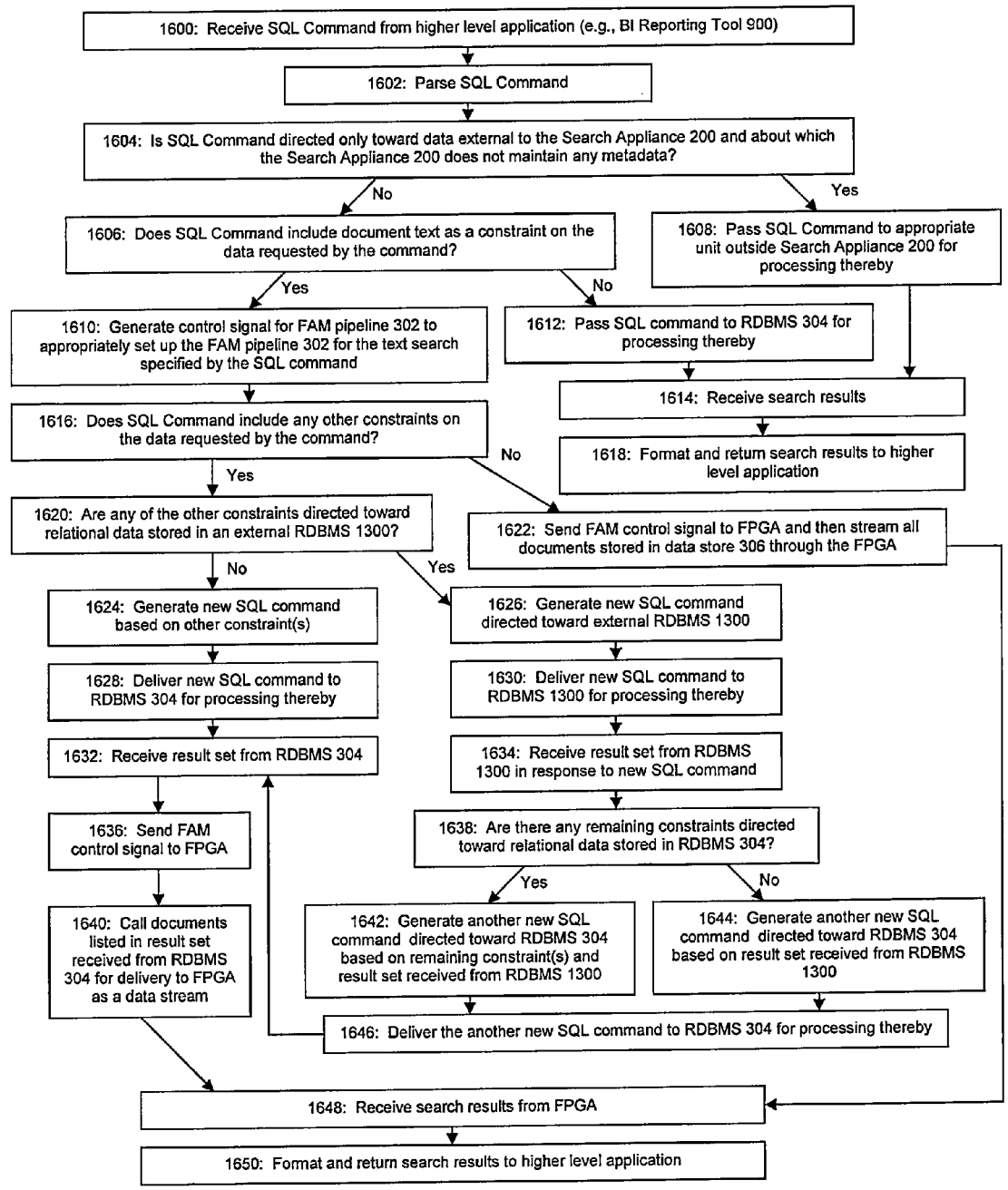
FIG. 16 illustrates an exemplary processing flow for an API executed by the search appliance to process queries.

FIG. 9 depicts an exemplary overview of how such queries can be processed. A conventional BI reporting tool 900 can be accessed by user on his/her desktop, and through this tool 900, the user can enter a desired query 904 using whatever syntax is already familiar to him/her as part of his/her training in the use of the reporting tool 900. Reporting tool 900 then operates to produce a standardized database query (such as a SQL command 906) from the user-specified query 904. Search appliance 200 is positioned to receive this standardized database query 906. The appliance 200 can receive such queries directly from the BI reporting tool 900 (should the BI reporting tool 900 be connected to bus 406) or indirectly from the BI reporting tool 900 through network interface 410. An API 902 executed by the search appliance 200 then operates to appropriately apply the SQL command 906 against the RDBMS 304 and data store 306. Preferably, the operations of the API 902 are carried out by processor 412 of the appliance. However, it should be noted that at least portions of the API functionality can optionally be deployed via the coprocessor 450. Preferably, this API 902 conforms to existing ANSI SQL standards and extensions (e.g., SQL/XML, SQL/MED, SQL/MM or XML/Full-Text) where possible. Where SQL standards and extensions do not support the desired functionality, external functions can be devised for the API (which could be categorized as "external procedures" in database terminology). FIG. 10(a) illustrates a preferred embodiment for API 902. FIG. 16 discussed hereinafter describes an alternate embodiment of API 902.

Thus, a preferred embodiment of the present invention operates to provide SQL-enabled client applications with the ability to access the hardware-accelerated functionality of coprocessor 450 via SQL commands. Thus, not only can the appliance 200 be integrated with a SQL-enabled client application such as a BI reporting tool 900, but the appliance 200 can also or alternatively be integrated with other SQL-enabled applications. For example, the appliance 200 can be integrated with any or all of the following SQL-enabled applications: various enterprise software applications (such as ERP, CRM, SAP, etc.), middleware programs, client programs, custom-built programs written in any of a large number of programming languages (e.g., using ODBC or JDBC connectivity), and another SQL database that is linked to database 304.

Within the appliance 200 itself, the SQL-enablement preferably includes a high-performance, tight integration with conventional SQL relational engine software 950. An example of this is shown in FIG. 10(a). Relational engine software 950 can be conventional off-the-shelf software for accessing relational databases. To integrate query processing through the relational engine 950 with the coprocessor 450, some customizations can be added to relational engine software 950. A few exemplary methods that could yield this type of customization to achieve the desired integration are: C-based external procedures (custom libraries dynamically linked into the SQL engine), user-defined types and functions, stored procedures, and custom data providers.

For example, code can be added to the relational engine 950 that invokes a desired external procedure when certain statements are encountered in a SQL command. An example of this is shown in FIG. 10(c), wherein the relational engine 950 is configured to recognize the statement "text_contains" as invoking an external program (shown as coprocessor interface software 952 in FIG. 10(a)). When the relational engine 950 encounters such a statement, it makes a call on the coprocessor interface software 952 and passes the appropriate data to the API software 952 to thereby allow the coprocessor to function as desired, as explained below in connection with FIG. 10(b). It should be readily understood that a number of external procedures can be devised for relational engine 950 such that different statements encountered in a SQL command will invoke different external programs to thereby achieve different processing effects with the coprocessor 450. As stated, the "text_contains" statement can be tied to an external procedure that configures the coprocessor for an exact or approximate matching operation, while a "relevance ranking" statement can be tied to an external procedure that configures the coprocessor for scoring data objects along relevance dimensions.

If the appliance 200 is implemented with an open-source database 304, such as MySQL, then the integration can be achieved directly within the relational engine source code itself. With the greater flexibility that an open-source solution provides, a SQL parser/interpreter can be developed that serves as the API 902 and intermediates all SQL requests between the client application and the database 304. An exemplary implementation of a SQL parser/interpreter strategy for API 902 is documented in FIG. 16.

Figure 10B:
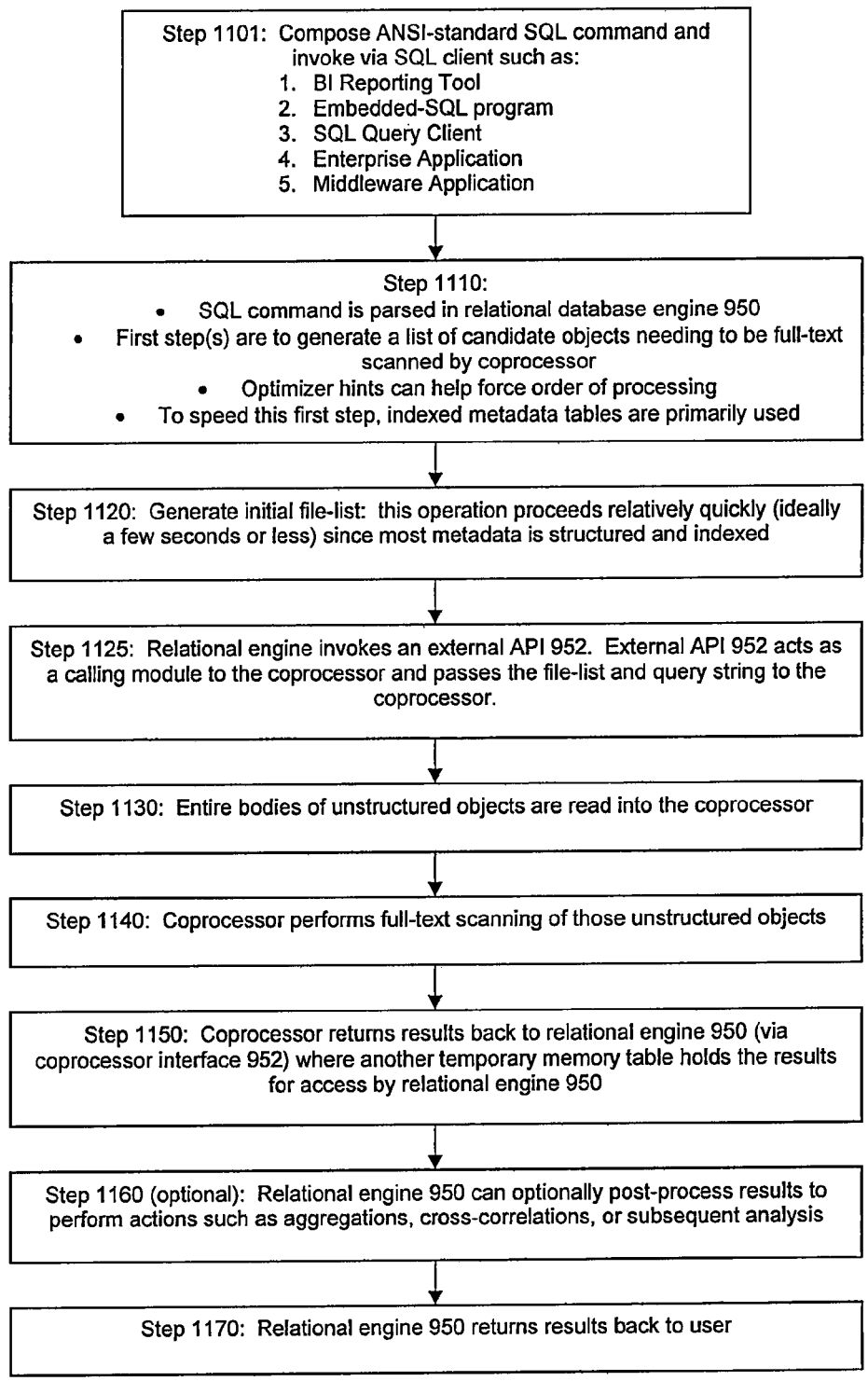
FIGS. 10(b) and (c) illustrate an exemplary flowchart and an exemplary logical view of a query processing operation in accordance with an embodiment of the present invention corresponding to FIG. 10(a)
Figure 10C:
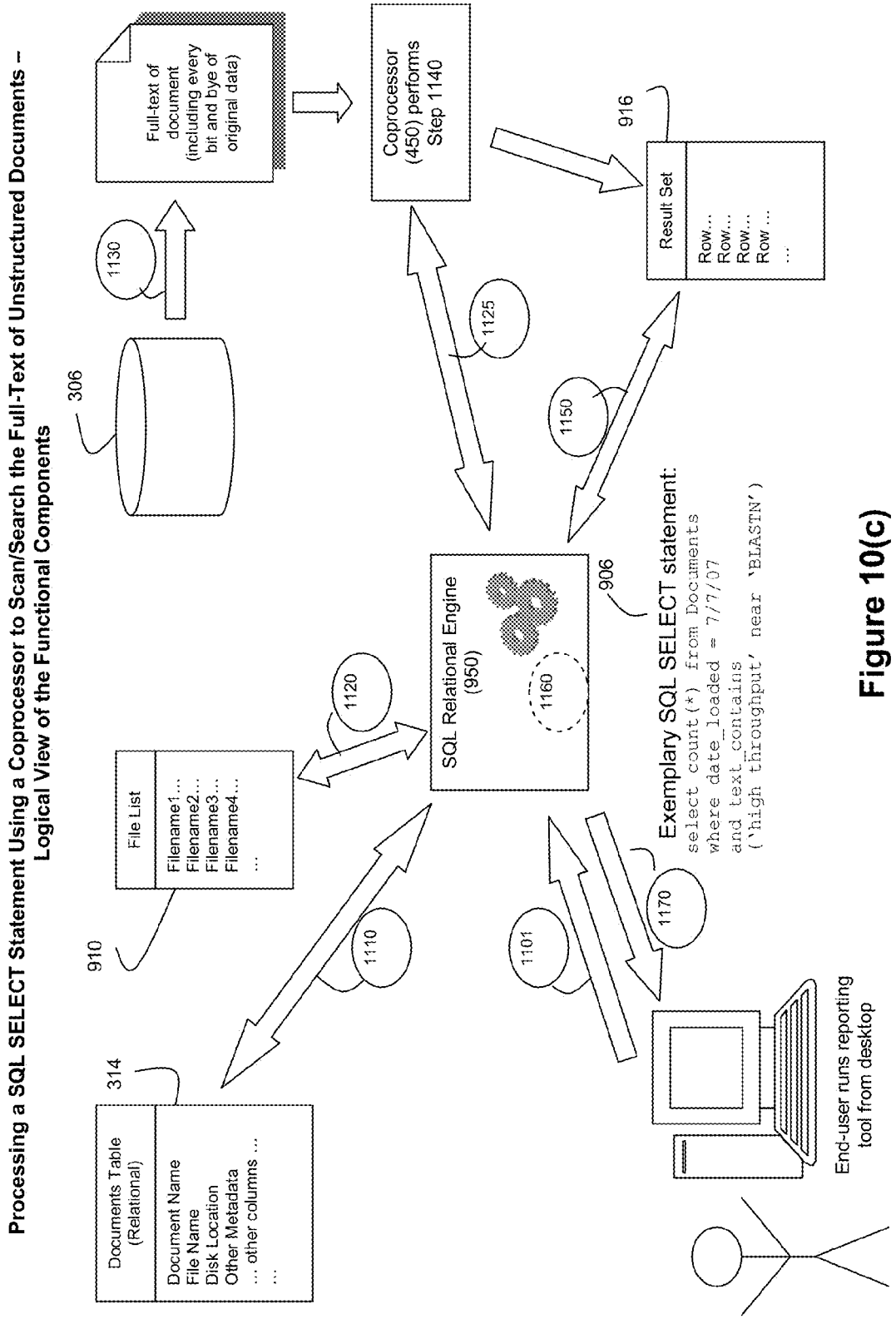

Returning to the embodiment of FIG. 10(a), FIG. 10(b) presents a series of steps that could be used to implement a query-processing solution that is based on such standard SQL extensions such as stored procedures, external procedures or user-defined functions. It is closely tied to FIG. 10(c), which uses the same series of steps (1101-1170). At step 1101, an ANSI-standard SQL command 906 is composed and invoked via a SQL-enabled client application. Next, at step 1110, the relational engine 950 executes on processor 412, and it parses the SQL command 906 to decide how the RDBMS 304 should be queried. Optimizer hints and various coding techniques allow the SQL developer to construct a command where the order of processing can be guaranteed. That is, the optimizer hints can define an appropriate order of processing as between various statements in a SQL command 906. With reference to FIG. 10(c), this would involve the relational engine satisfying the "date_loaded" statement prior to the working on the "text_contains" statement. The task at hand is to try to use indexed tables stored by the RDBMS 304 to limit the objects that will need to be full-text scanned by coprocessor 450. Essentially, the relational engine 950 will apply a portion of the query that is directed toward structured data to RDBMS 304 (this query portion is identified as SQL command 908 in the example of FIG. 9 and FIG. 11(b)). The relational engine and RDBMS 304 can thus operate on a SQL command 908 to identify documents listed in a document metadata index that it maintains to thereby identify which document match the query conditions. Thus, at step 1120, the RDBMS 304 will return a list 910 of documents after matching the criteria set forth in the "date_loaded" constraint portion of the SQL command 906 against the content of its document metadata index. The documents identified by document list 910 can preferably be identified by their locations in data store 306. At step 1125, the relational engine 950 next encounters the "text_contains" statement, which is recognized as invoking an external procedure. The relational engine 950 then invokes the coprocessor interface software 952 that is tied to the "text_contains" statement. The relational engine 950 passes the query string following the "text_contains" statement to the coprocessor interface software 952 and further informs the coprocessor interface software 952 of the file list 910 generated at step 1120. The coprocessor interface software 952 in turn directs the operation of the coprocessor, preferably by passing the query string to the coprocessor 450 together with a command that instructs the coprocessor to appropriately configure itself to perform the query-specified data processing operation. Then, at step 1130, the entire bodies of the unstructured documents identified by list 910 are read into the coprocessor 450. Preferably, coprocessor interface software 952 issues an instruction to the disk controller 416 to stream the unstructured documents on list 910 out of data store 306. The data store 306 then provides the requested documents to the coprocessor 450 as a data stream 914 that is processed therethrough. Coprocessor 450 then performs the specified data processing operation on data stream 914 at hardware speeds (step 1140), providing significant acceleration to the query handling operation relative to conventional approaches. Any "hits" that are found by the coprocessor 450 can then be returned by the coprocessor to a temporary database table in RAM 408 as a result set 916 (step 1150). The coprocessor interface software 952, in turn, can inform the relational engine 950 of this result set 916. Optionally, at step 1160, the relational engine 950 can post-process these results 916 to perform any desired aggregations, cross-correlations, or subsequent analysis on the results 916.

Next, at step 1170, the relational engine 950 preferably formats the search results 916 to a format expected by the reporting tool 900, and the reporting tool 900 operates using its existing technology to present those search results 916 to the user.

As there are a wide variety of BI reporting tools 900 used in industry, the API 902 is preferably configured with the capability to interface with at least most of the major BI reporting tools. For example, a configuration file maintained by the search appliance 200 can be set up during initialization of search appliance 200 within an enterprise to identify the particular BI reporting tool 900 with which the search appliance 200 will interact to enable data exchanges therebetween.

It should also be noted that a conventional BI reporting tool 900 need not be used as the interface between the search appliance 200 and the user. For example, search appliance 200 can be configured to provide its own GUIs for display to users, wherein these GUIs are configured to provide the same basic functionality as BI reporting tools. In this manner, the API 902 could then optionally be configured to directly translate the user-specified query 904 into the database query 908.

Further still, it should be noted that the standardized query 906 need not originate from a BI reporting tool 900 or user; instead it can originate from some other enterprise application that is making a call on the data stored by or known to the search appliance 200.

Also, it should be noted that the API 902 described herein as part of the search appliance 200 can optionally be located, in whole or in part, within the BI reporting tool 900 or other higher level application.

FIG. 10(c) illustrates a logic view of a simple query processing operation in accordance with a preferred embodiment of the invention. In this example, the user wants to search for documents within data store 306 that were loaded on Jul. 7, 2007 and that contain the following text constraint: the phrase "high throughput" near the word "blastn". After the user enters a query toward this goal in a BI reporting tool 900, the BI reporting tool operates to generate a SQL command 906 such as the one shown in FIG. 10(c). This SQL command includes a "select" statement that specifies the table within RDBMS 304 against which the query is to be processed. The next statement is a "where" statement that specifies the conditions of the search. One of the conditions is the date on which the document was loaded into the data store 306; this condition is set to Jul. 7, 2007. The next condition is the text condition discussed above. The relational engine receives this SQL command 906 and interprets it, as shown in FIG. 10(c) (see step 1101; see also FIG. 11(a)).

The relational engine 950 identifies the "date_loaded" constraint as a document metadata item and further identifies the text constraint as a matter to be resolved by the coprocessor 450, as discussed above. With respect to the embodiment of FIGS. 10(a) and (b), the relational engine 950 queries the RDBMS 304 using SQL command 908 which corresponds to the "date_loaded" portion of SQL command 906 (see step 1110; see also FIG. 11(b)). A documents table in the relational database inside the appliance serving as the metadata index 314 will have had metadata generated for it when documents were loaded into storage. Filenames for responsive documents can be retrieved for all rows matching the criteria in the SQL "where" clause.

The RDBMS then returns a list 910 of all documents identified by the metadata index 314 as matching the "date_loaded" constraint (i.e., RDBMS 304 would then apply this SQL command 908 against its document metadata index to return a list of all documents that were loaded into data store 306 on Jul. 7, 2007), wherein this list 910 can be stored in RAM 408 (for example, a temporary database table built in memory to store the list of filenames which matched the "where" clause criteria). (See step 1120; see also FIG. 11(c)). This list 910 preferably identifies the locations in the file system of data store 304 where each document loaded on Jul. 7, 2007 is located.

Figure 11A:
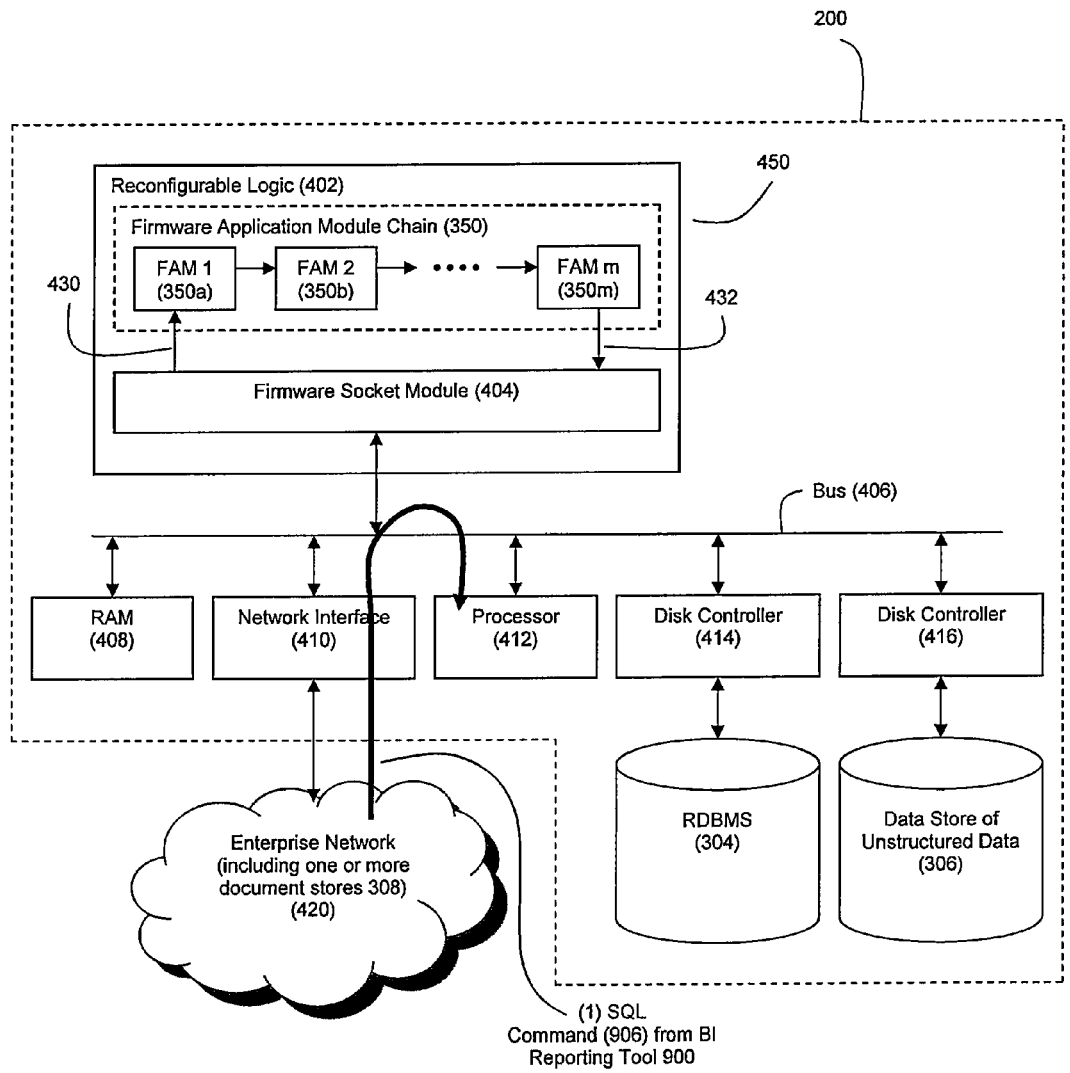
FIGS. 11(a)-(g) illustrate exemplary data flows within the search appliance of FIG. 4 for a query processing operation in accordance with an embodiment of the present invention.
Figure 11B:
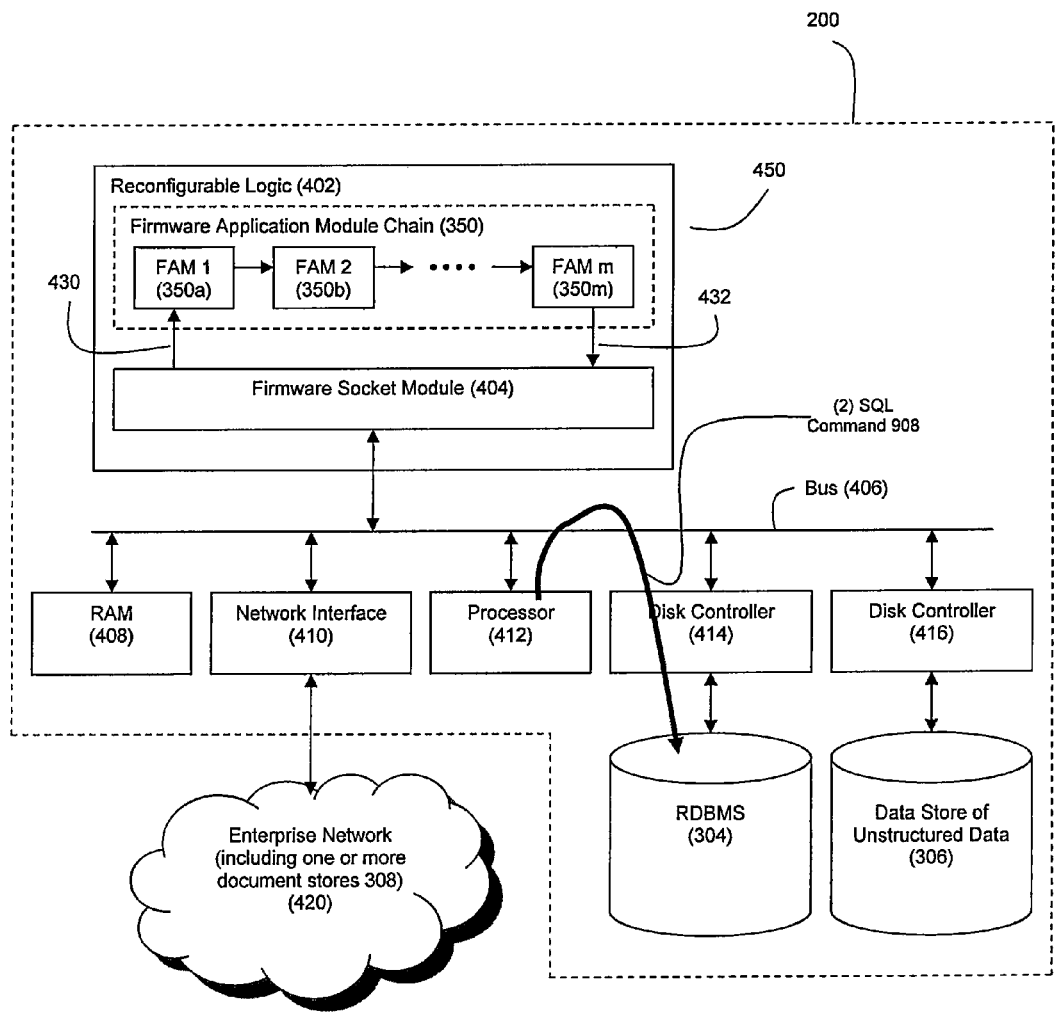
Figure 11C:
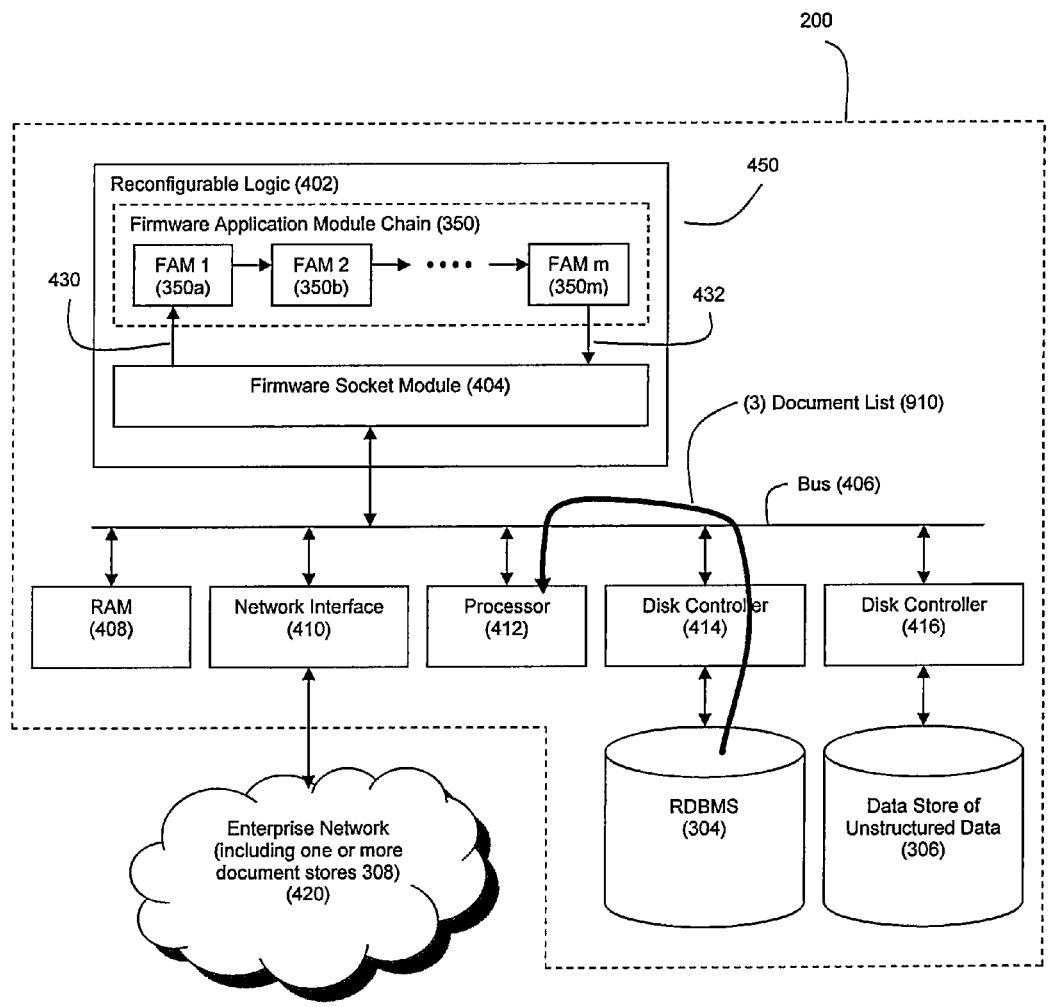
Figure 11D:
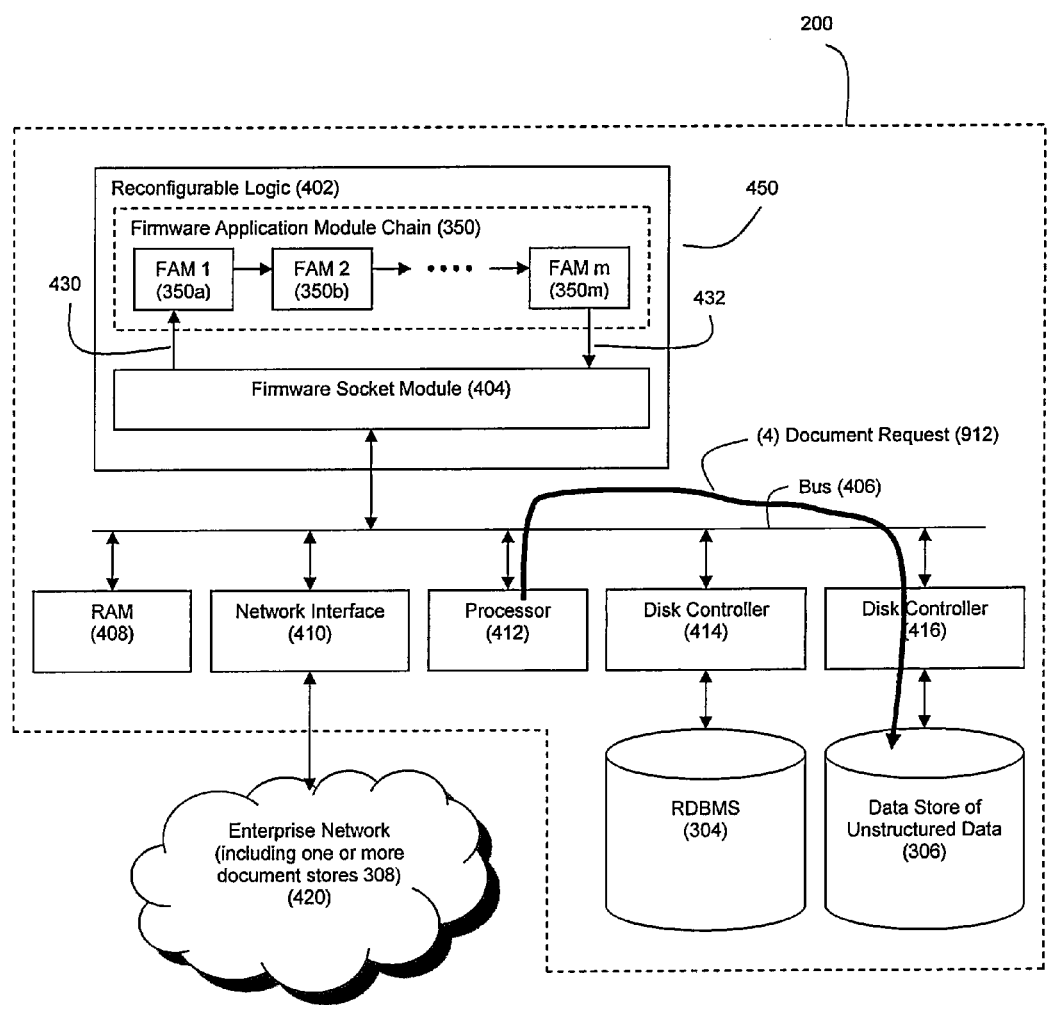

The API 902 (via API 952 for the embodiment of FIGS. 10(a) and (b)—see step 1125) also issues a request 912 to data store 306 for retrieval of all documents on list 910 (see FIG. 11(d)). The API 902 also operates (via API 952 for the embodiment of FIGS. 10(a) and (b)—see step 1125) to generate a control signal 1100 for delivery to the coprocessor's FAM pipeline 350 that arranges the FAM pipeline to perform a full-text search built around the conditions of "'high throughput' near 'blastn'" from the query string. This control signal 1100 is then preferably delivered to the coprocessor 450 (preferably delivered to a firmware socket module 404 resident on the coprocessor 450) prior to the documents' arrival to the coprocessor 450 (see FIG. 11(e)).

Figure 11E:
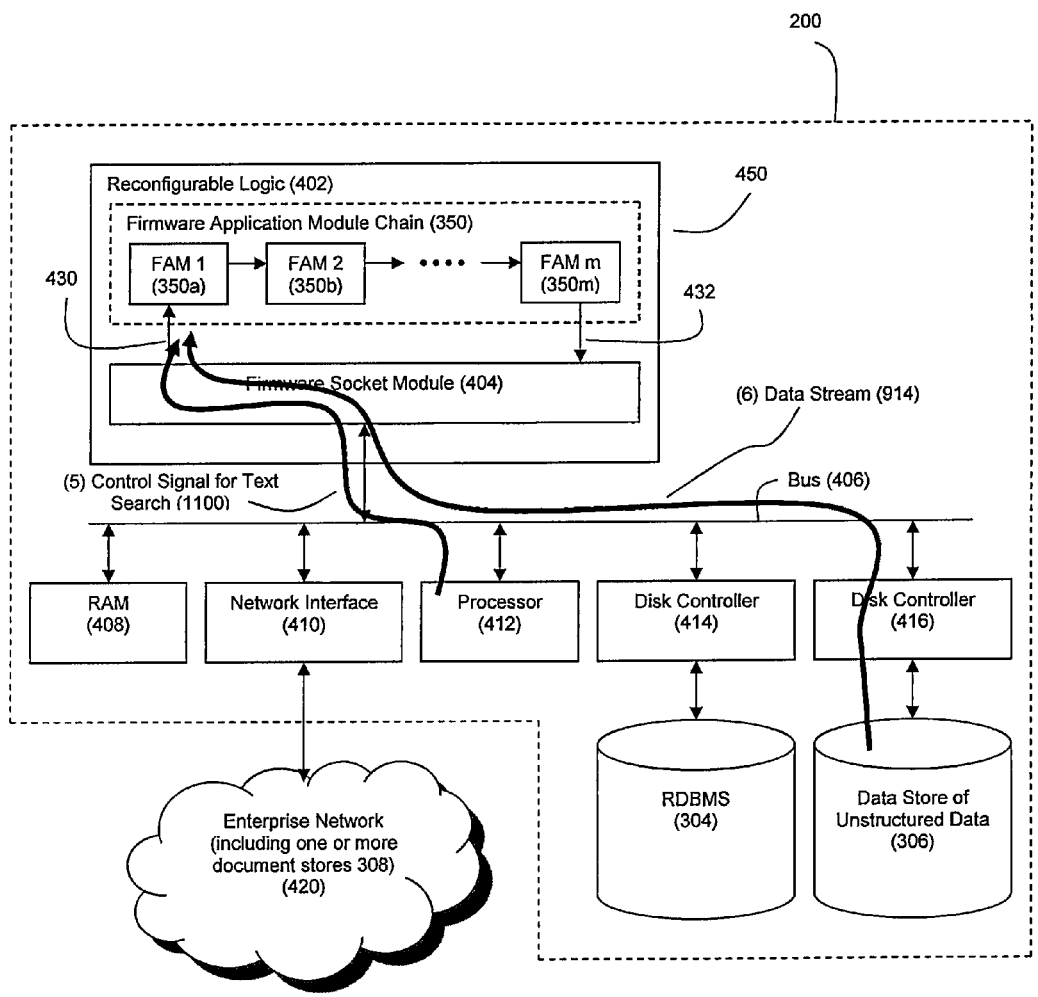
Figure 11F:
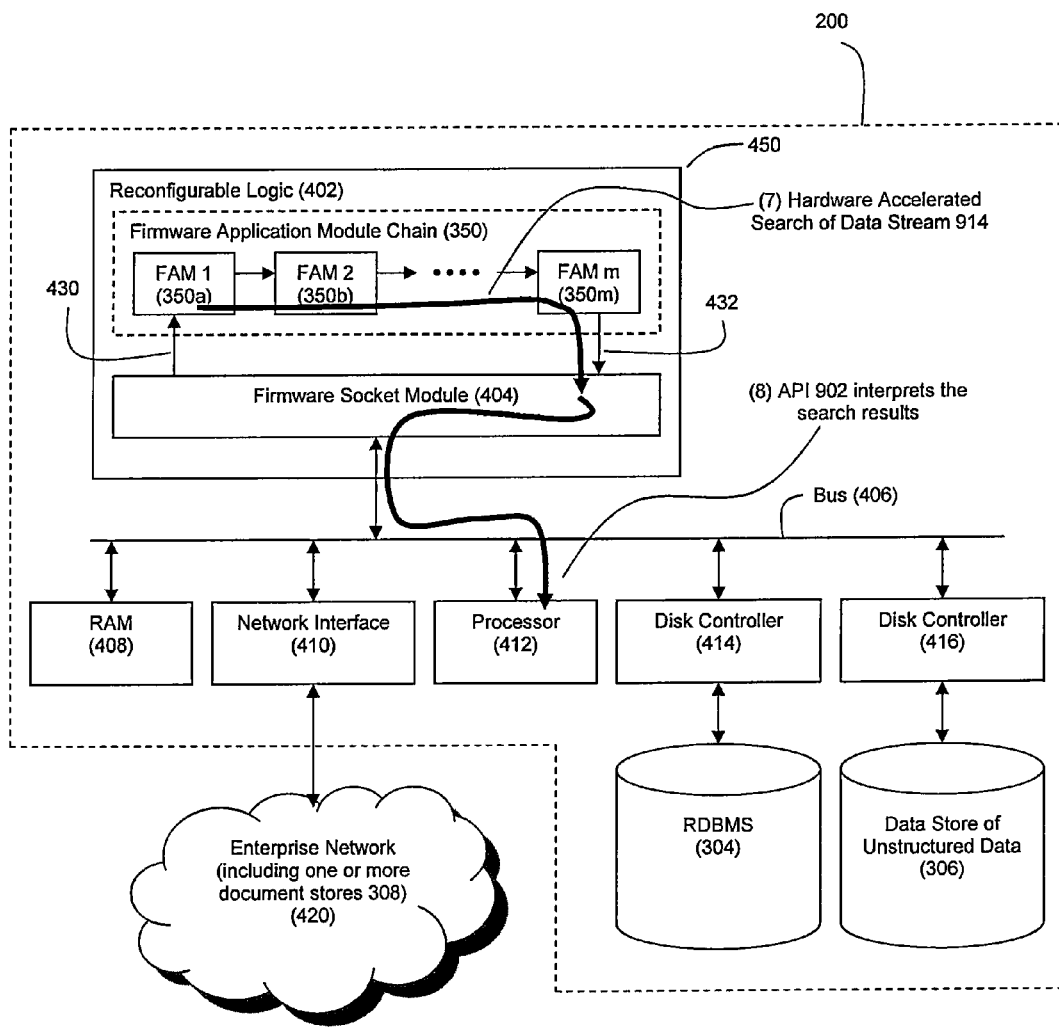
Figure 11G:
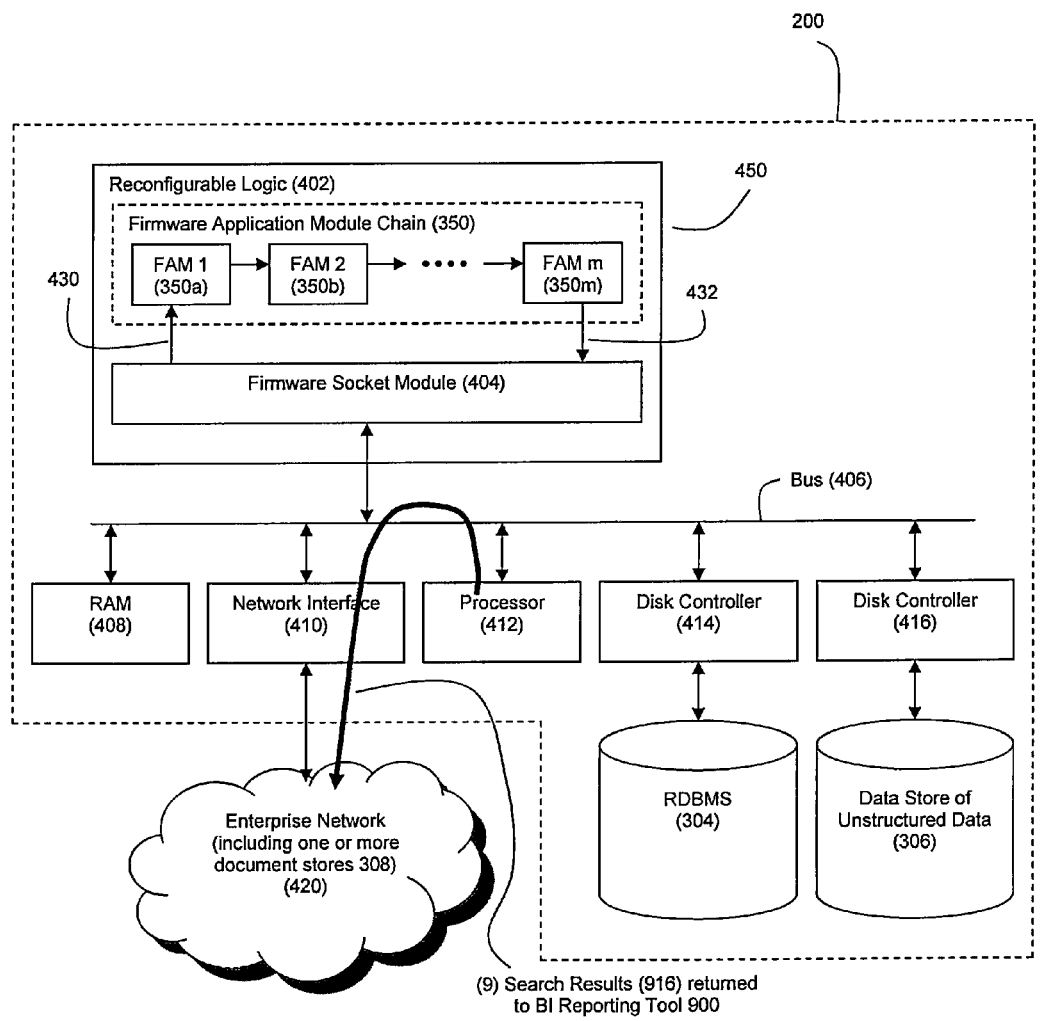

In response to the request 912, data store 306 outputs a data stream 914 for delivery to the coprocessor 450 (preferably to the firmware on reconfigurable logic device 402), as shown in FIG. 11(e) (see also step 1130). The coprocessor 450 (preferably via a FAM pipeline 350 on reconfigurable logic device 402) then performs a hardware-accelerated full-text search of the documents within stream 914 in accordance with the text constraints in the query (see step 1140; see FIG. 11(f)). The search results 916 can take the form of another temporary database table built in memory to store the matches returned from the coprocessor during the full-text search. The results of this high speed data processing operation are then returned to the API 902 by way of the firmware socket module 404 (see step 1150). The API 902 (preferably relational engine 950) then operates to format those search results 916 in a manner expected by the reporting tool 900 for return to the reporting tool 900 where they can be presented to the user in satisfaction of his/her query, as shown in FIG. 11(g) (see step 1170).

Figure 12:
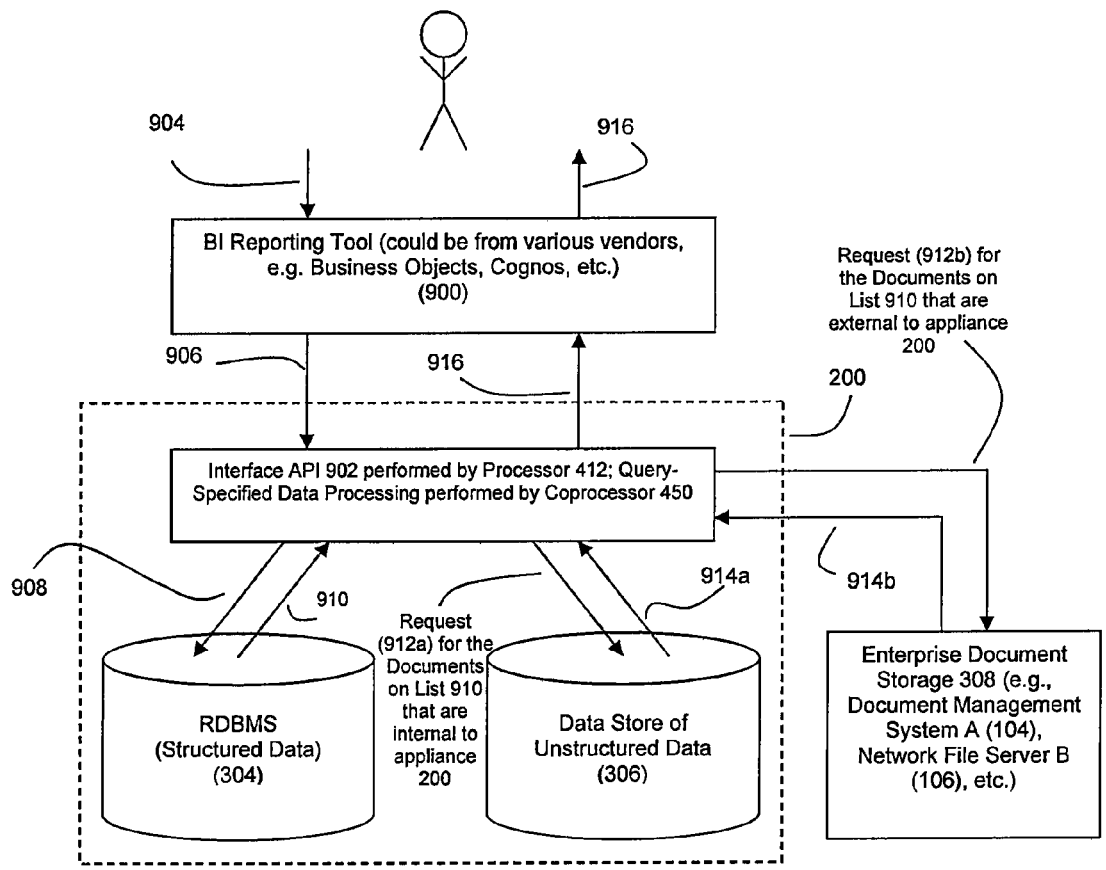
FIG. 12 illustrates an exemplary overview of a query processing operation in accordance with an embodiment of the present invention wherein the query is run at least partially against documents that are located outside the search appliance.

It should also be noted that the documents 312 for which document metadata 314 has been generated need not necessarily be stored within the appliance in data store 306. Those documents can be retained in their original locations outside the appliance 200 if desired. In such instances, when it is time for those documents to be full-text processed via coprocessor 450, those documents can streamed into appliance 200 and coprocessor 450 via network interface 410. FIG. 12 is a counterpart to FIG. 9 that depicts this aspect of document searching, wherein the documents on list 910 returned by RDBMS 306 include both documents inside data store 306 and documents external to appliance 200 that are located in some other data store 308 that is accessible through the enterprise network. In such cases, two requests 912a and 912b will be prepared by the API 902—one for delivery to data store 306 and the other for delivery outside the appliance 200. While this arrangement is less desired because network bandwidths may then constrain the latency with which searches are performed, the inventors nevertheless note that some acceleration is still provided even if the documents are not retained within the data store 306. In this vein, it is also worth noting that the act of ingesting a document 312 into data store 306 can be a copy operation rather than a move operation. Some enterprises may prefer that the master copy of the document 312 remain in its original location external to appliance 200. In such situations, only a copy of the document 312 is stored by the data store 306.

Figure 13:
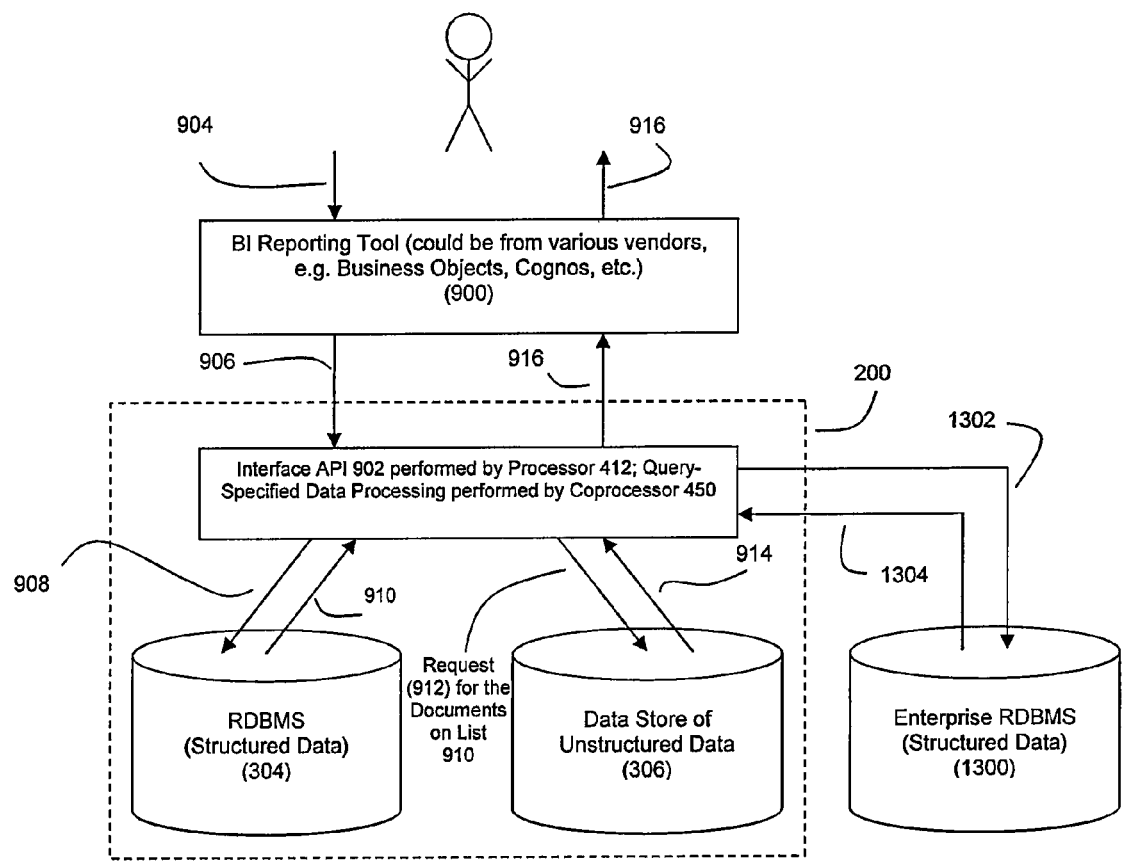
FIG. 13 illustrates an exemplary overview of a query processing operation in accordance with an embodiment of the present invention wherein an RDBMS external to the search appliance is accessed to retrieve structured data specified by a query.

Another powerful aspect of the preferred embodiment is the ability of the appliance 200 to access any enterprise RDBMSs 1300 that are external to the search appliance 200 when performing data processing operations. An overview of this aspect of the preferred embodiment is shown in FIG. 13. As part of this aspect of the preferred embodiment, SQL commands 1302 will be issued by the API 902 to the external RDBMS 1300, and a response 1304 to those commands will be received by the API 902. Accordingly, the appliance 200 will be able to efficiently leverage existing structured data maintained by an enterprise when performing searches for documents of interest.

Figure 14:
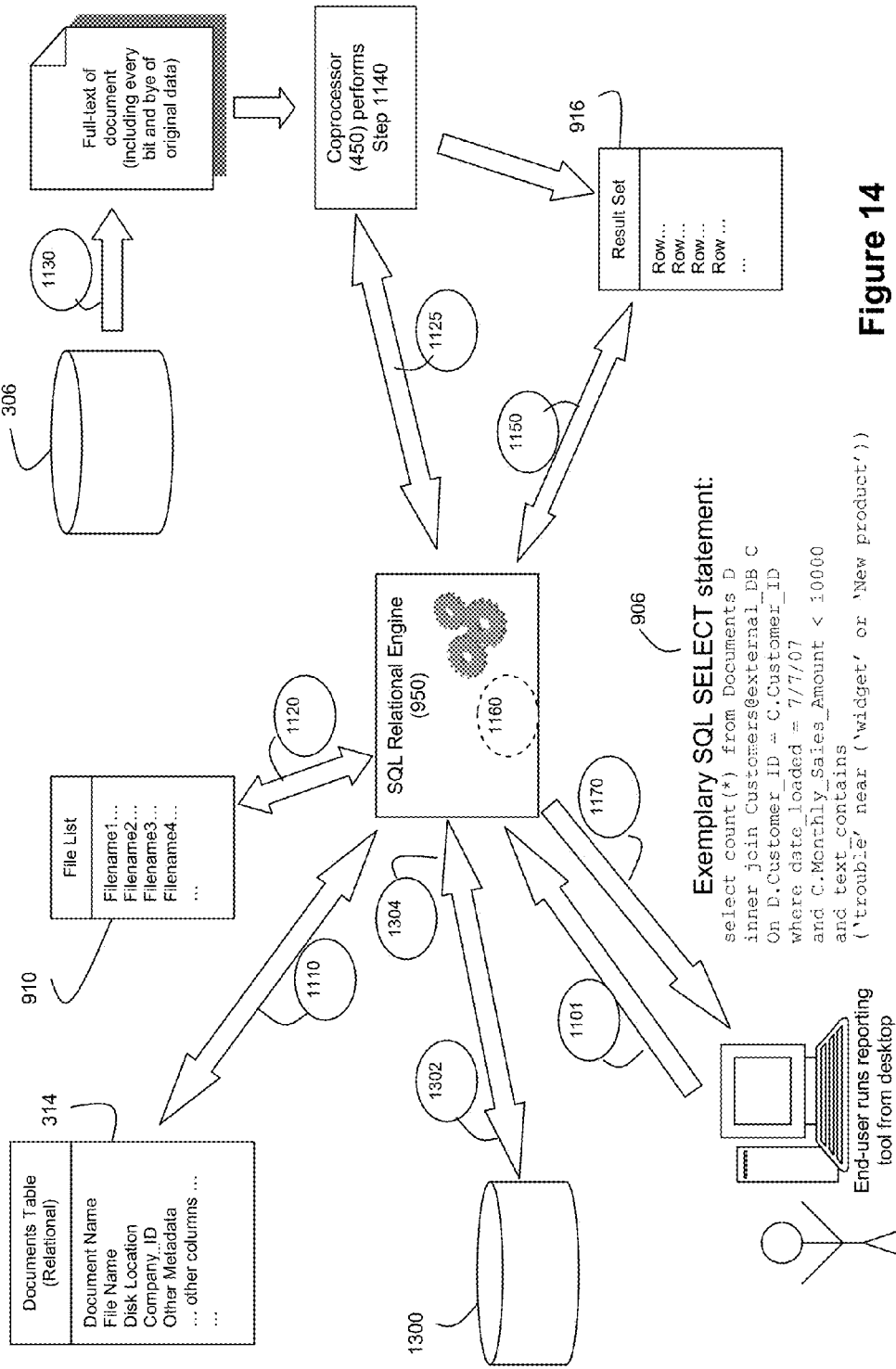
FIG. 14 illustrates an exemplary logical view of a query processing operation in accordance with an embodiment of the present invention wherein an external RDBMS is accessed to retrieve structured data specified by a query.

FIG. 14 depicts a logical view of this aspect of SQL command processing. In the example of FIG. 14, the user has been tasked with the assignment to research why sales have been slow as of late to certain customers of the enterprise. As part of this task, the user would like to review documents stored by the network that may provide useful insights into such sluggish sales. To achieve this, the user specifies a query targeted toward finding all documents for any customers whose monthly sales amount is less than 10,000 widgets, wherein those documents were loaded on Jul. 7, 2007, and wherein those documents contain the text "trouble" near either "widget" or "new product". The BI reporting tool 900 operates to transform these query constraints into a SQL command 906 as shown in FIG. 14.

Because the enterprise stores its customer sales data in an RDBMS 1300 that is external to the search appliance 200, SQL command 906 operates to join data tables in external RDBMS 1300 with document metadata tables in RDBMS 304. This action is reflected in the "inner join" statement that joins the customer data in the "Customers@external_DB C" relational table in an external RDBMS 1300 with the document metadata relational table in RDBMS 304, based on a merged key of "D.Customer_ID" (for the document metadata table) and "C.Customer_ID" (for the external relational table), a SQL operation that is well-known in the art. Based on this merge, the relational engine 950 can identify from the external relational table which customers have sales volumes below 10,000 and tie those customers to a field in the document metadata table. Then the documents for those customers can be further restricted based on the "date loaded" metadata field in the document metadata. Finally, the documents for customers meeting the sales volume and date loaded constraints can be processed within coprocessor 450 for high speed text mining based on the "'trouble' near 'widget' or 'new product'" constraint. Thereafter, processing can proceed as described in connection with FIG. 10(b).

Figure 15A:
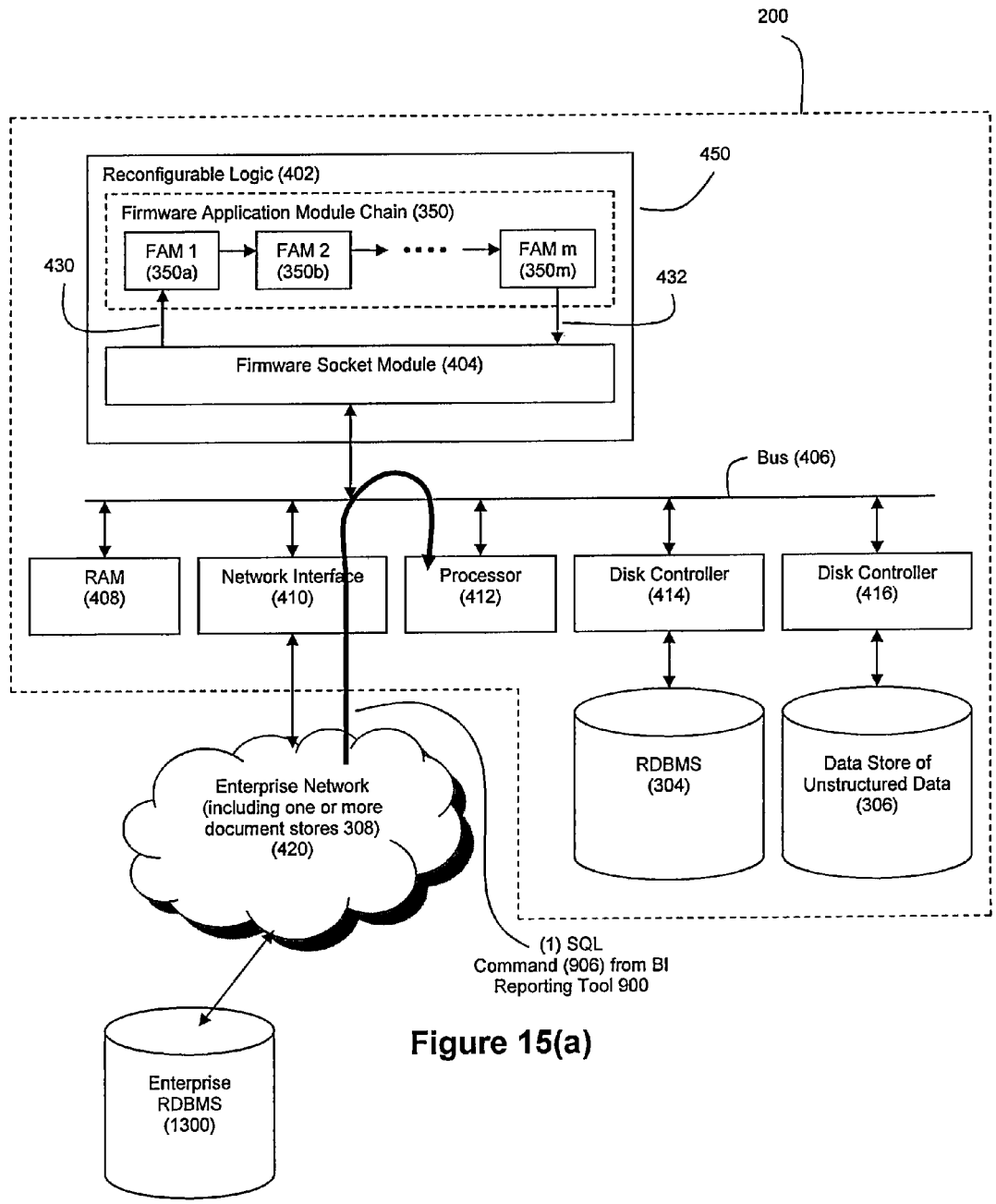
FIGS. 15(a)-(h) illustrate exemplary data flows within the search appliance of FIG. 4 for a query processing operation in accordance with an embodiment of the present invention wherein an external RDBMS is accessed to retrieve structured data specified by a query.

FIG. 15(a) depicts the receipt by the API 902 of the SQL command 906, which mirrors that of FIG. 11(a). The relational engine 950 identifies which constraint(s) in the SQL command 906 are targeted toward the external RDBMS 1300 and generates a new SQL command 1302 directed toward the external relational data constraint portions of SQL command 906 (in the examplary SQL command 906 of FIG. 14, this external constraint portion is the sales volume constraint). The relational engine 950 applies the new SQL command 1302 against the external RDBMS 1300 for processing thereby (see FIG. 15(b)). Thereafter, relational engine 950 receives the result set 1304 from the external RDBMS's processing of SQL command 1302 (see FIG. 15(c)).

The relational engine 950 then continues its handling of SQL command 906 and determines whether any additional constraints are remaining from command 906 that are directed toward RDBMS 304. If there are not, then a SQL command 908 is built for RDBMS 304 based on the customers in result set 1304. If there are, then a SQL command 908 is built for RDBMS 304 based on both the result set 1304 and any remaining internal RDBMS-directed constraints (e.g., the "date loaded" "constraint" in the example of FIG. 14). Thus, for the exemplary SQL command 906 of FIG. 14, the relational engine would apply a SQL command that seeks out all documents with document metadata restricted by the customers in result set 1304 for their customer field and restricted by the Jul. 7, 2007 date for their date loaded field. This new SQL command can be delivered to RDBMS 304 for processing thereby (see FIG. 15(c)). In the example of FIG. 14, the filenames retrieved from the metadata index 314 can be the filenames for all rows matching the criteria in the SQL "where" clause (including the companies for which sales are below 10,000 as determined from external RDBMS 1300).

Upon receiving the document list 910 in response to command 908, the remainder of the query processing proceeds as explained above in connection with FIGS. 11(c)-(g), as shown in FIGS. 15(d)-(h). In this example, the control signal 1100 for the FAM pipeline 350 will be configured to arrange the FAM pipeline 350 to perform a full-text search of the documents within data stream 914 to identify which ones contain the text "trouble" near either "widget" or "new product".

As previously noted, FIG. 16 discloses an alternate embodiment for API 902. With respect to the working example of FIGS. 11(a)-(g), steps 1600, 1602, 1604, 1606, 1616, and 1620 correspond to what is shown in FIG. 11(a). Steps 1624 and 1628 correspond to what is shown in FIG. 11(b). Step 1632 corresponds to what is shown in FIG. 11(c). Step 1640 corresponds to what is shown in FIG. 11(d). Steps 1610 and 1636 correspond to what is shown in FIG. 11(e). Step 1648 corresponds to what is shown in FIG. 11(f), and step 1650 corresponds to what is shown in FIG. 11(g).

Figure 15B:
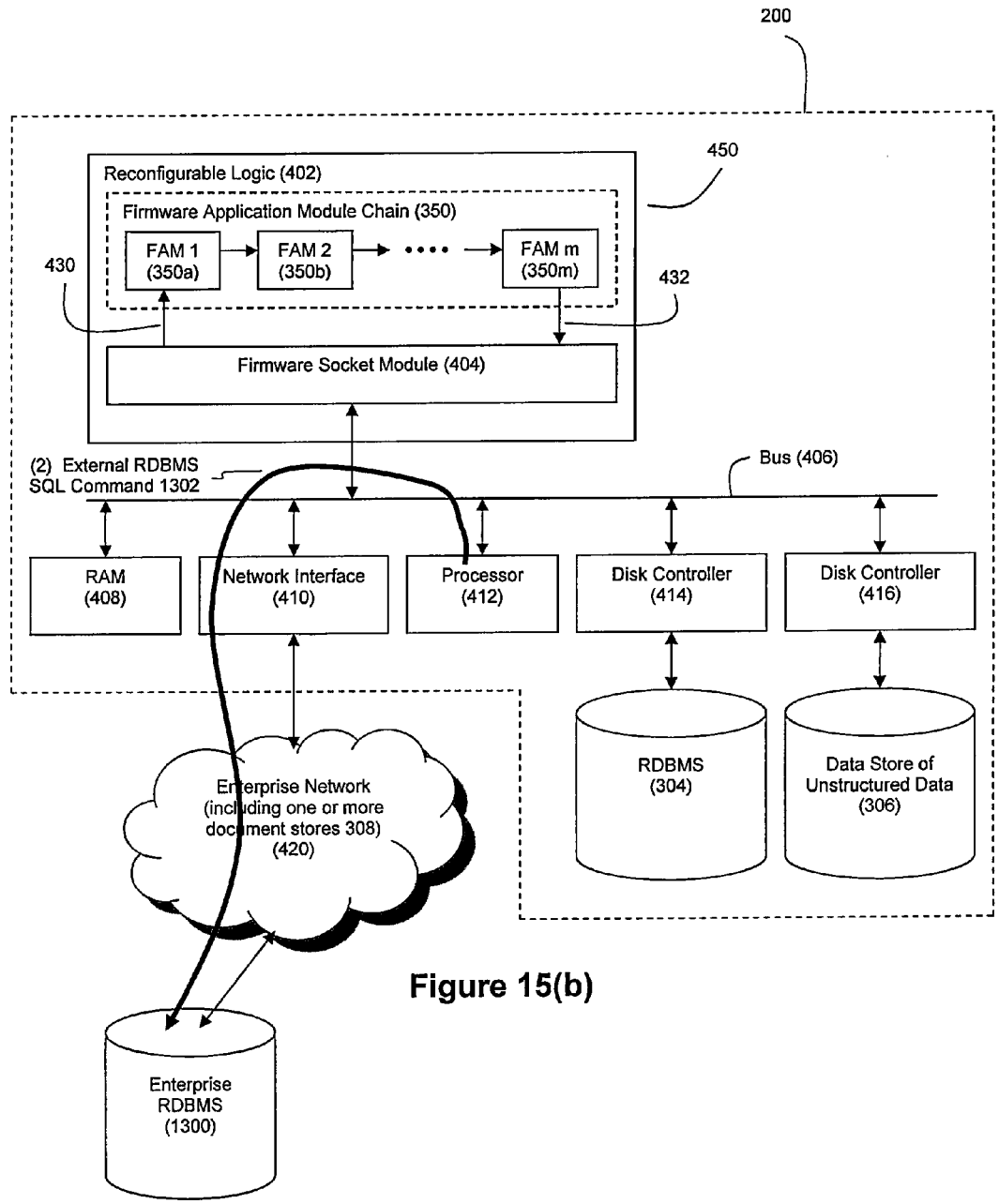
Figure 15C:
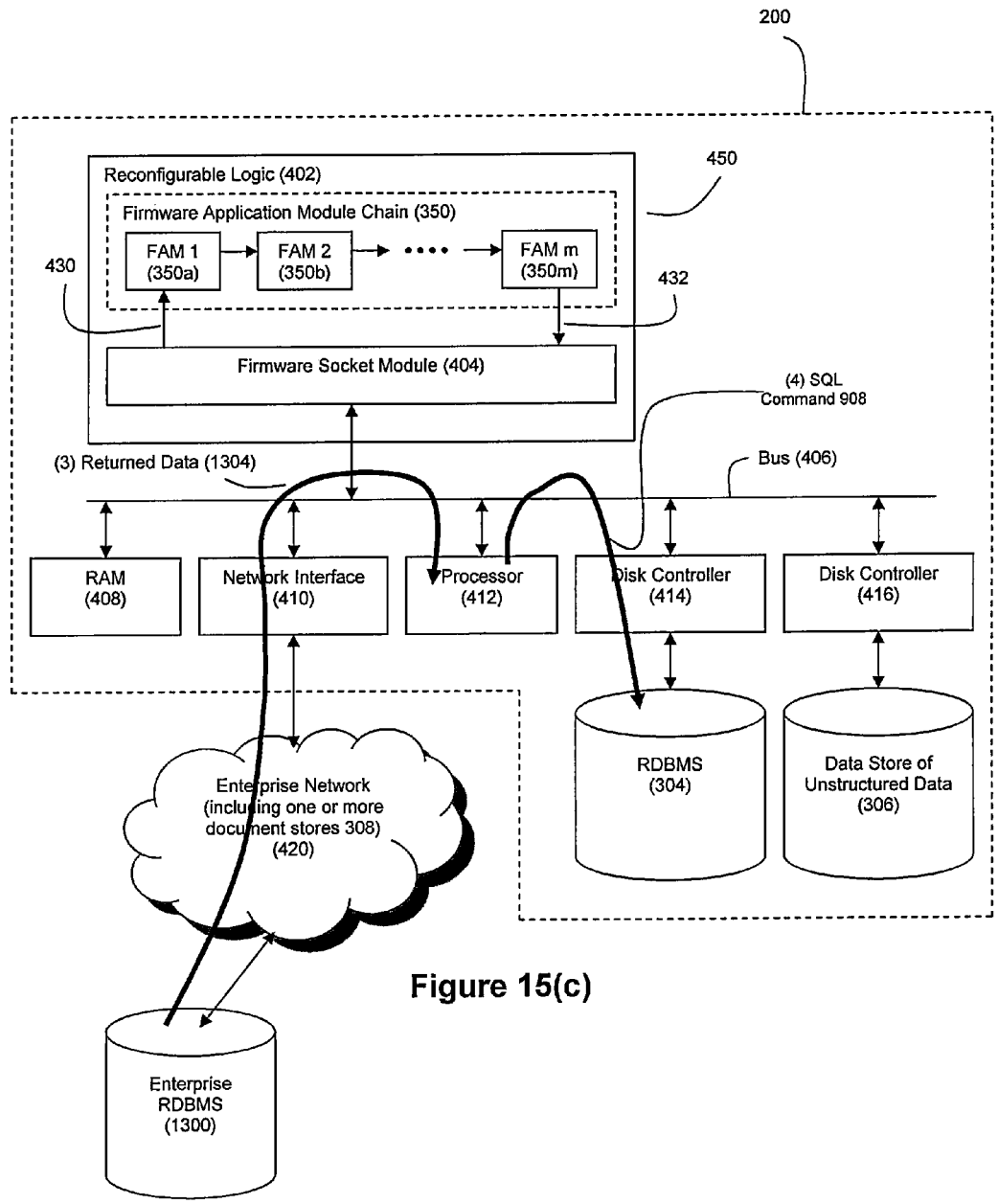
Figure 15D:
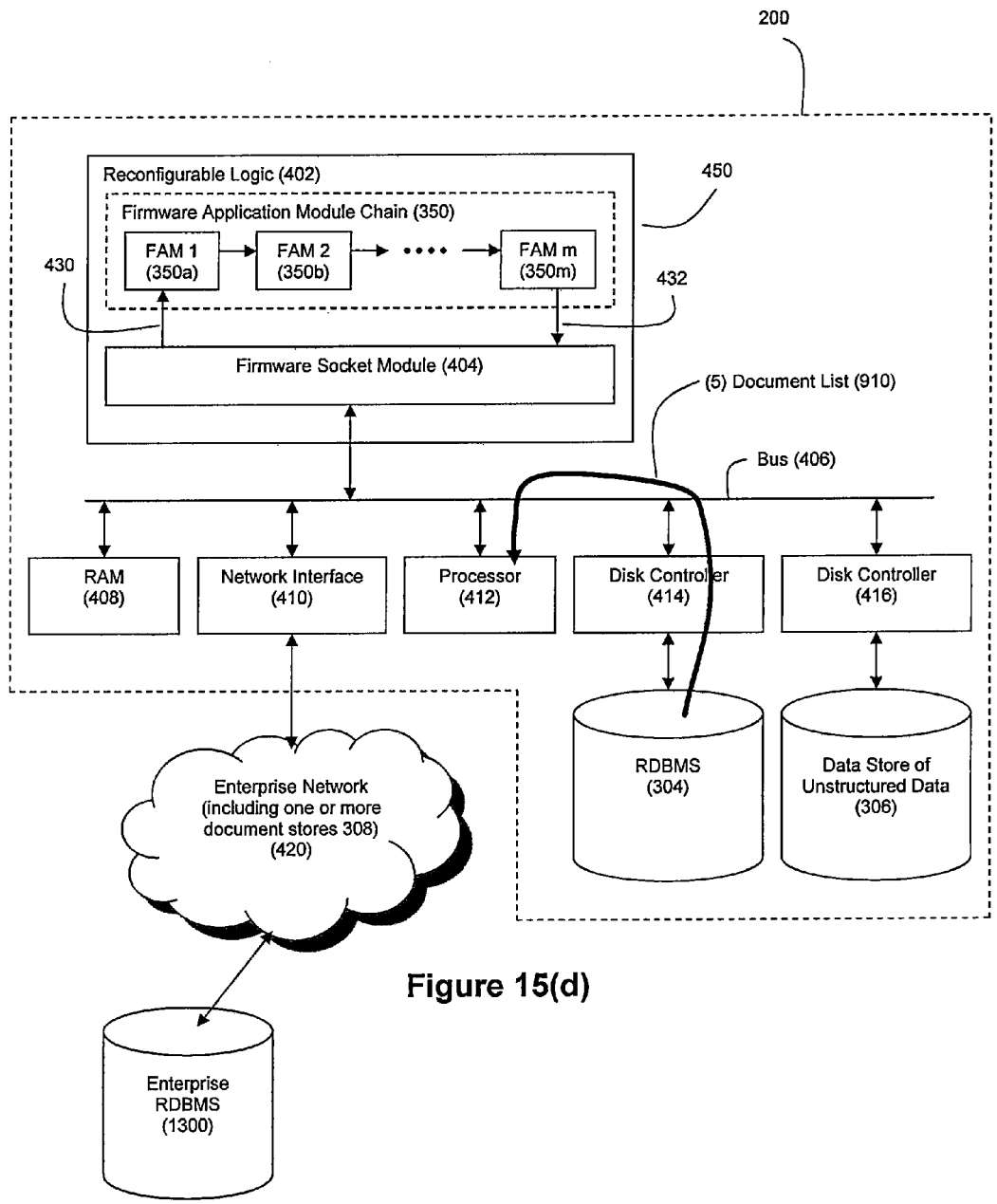
Figure 15E:
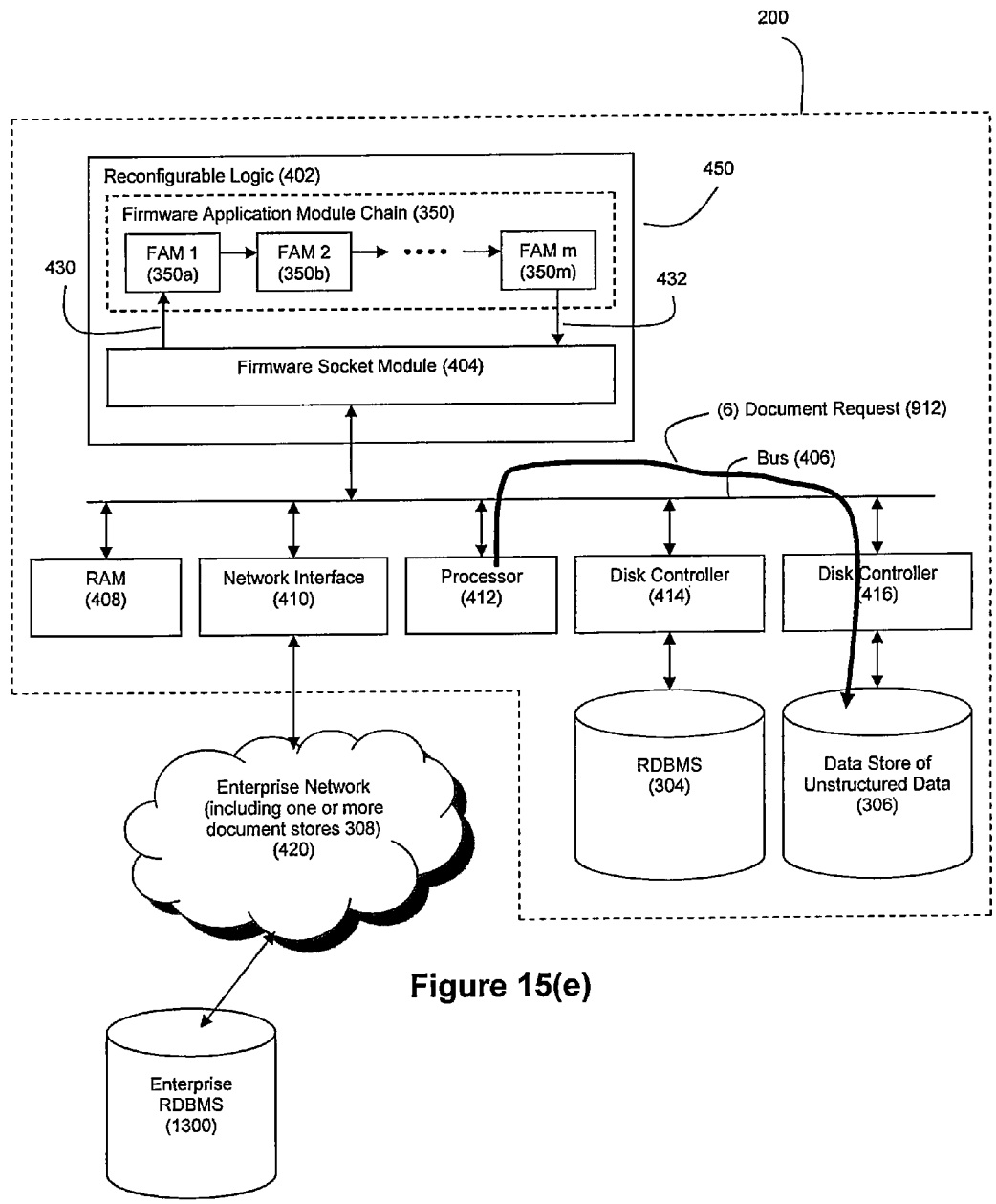
Figure 15F:
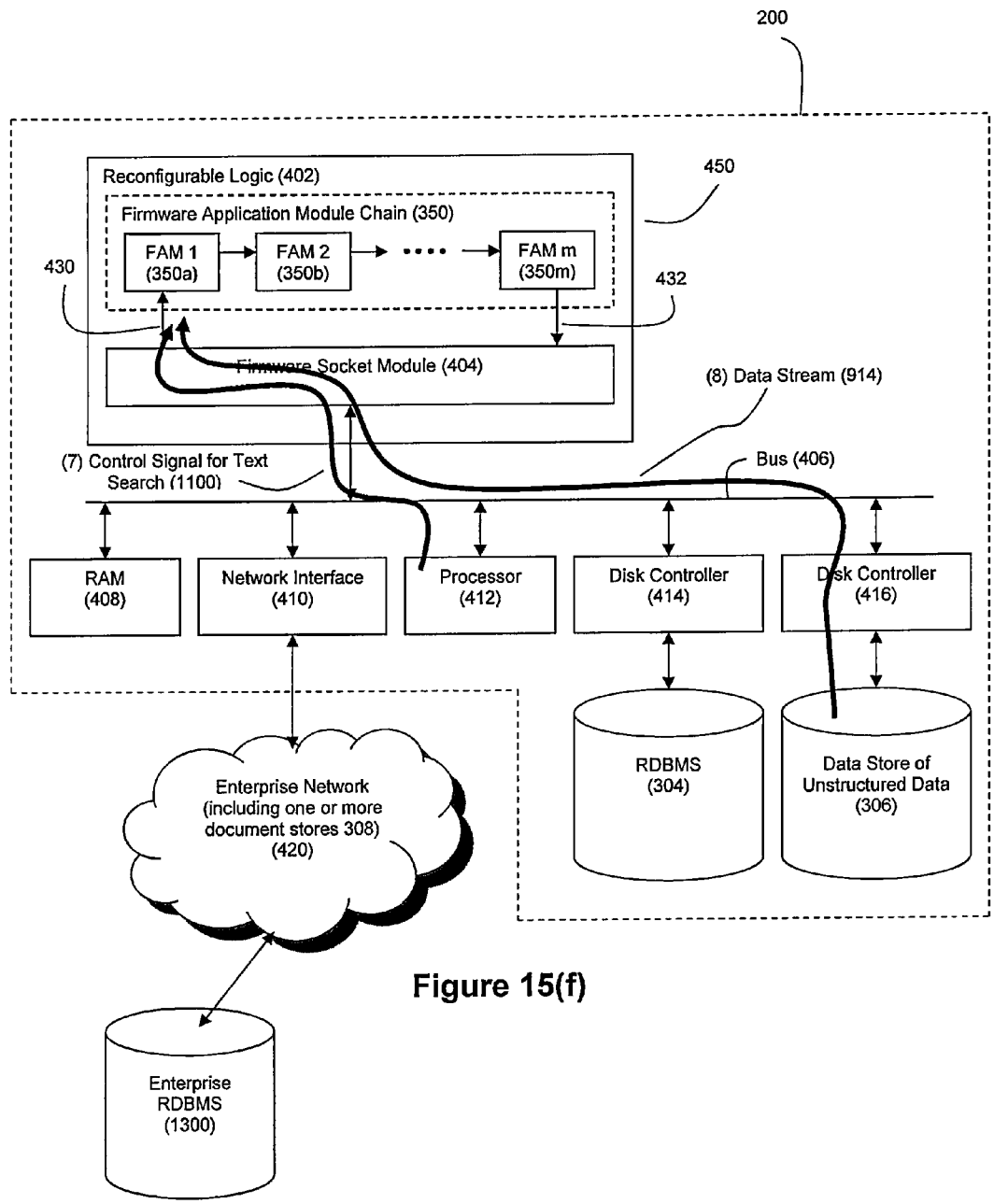
Figure 15G:
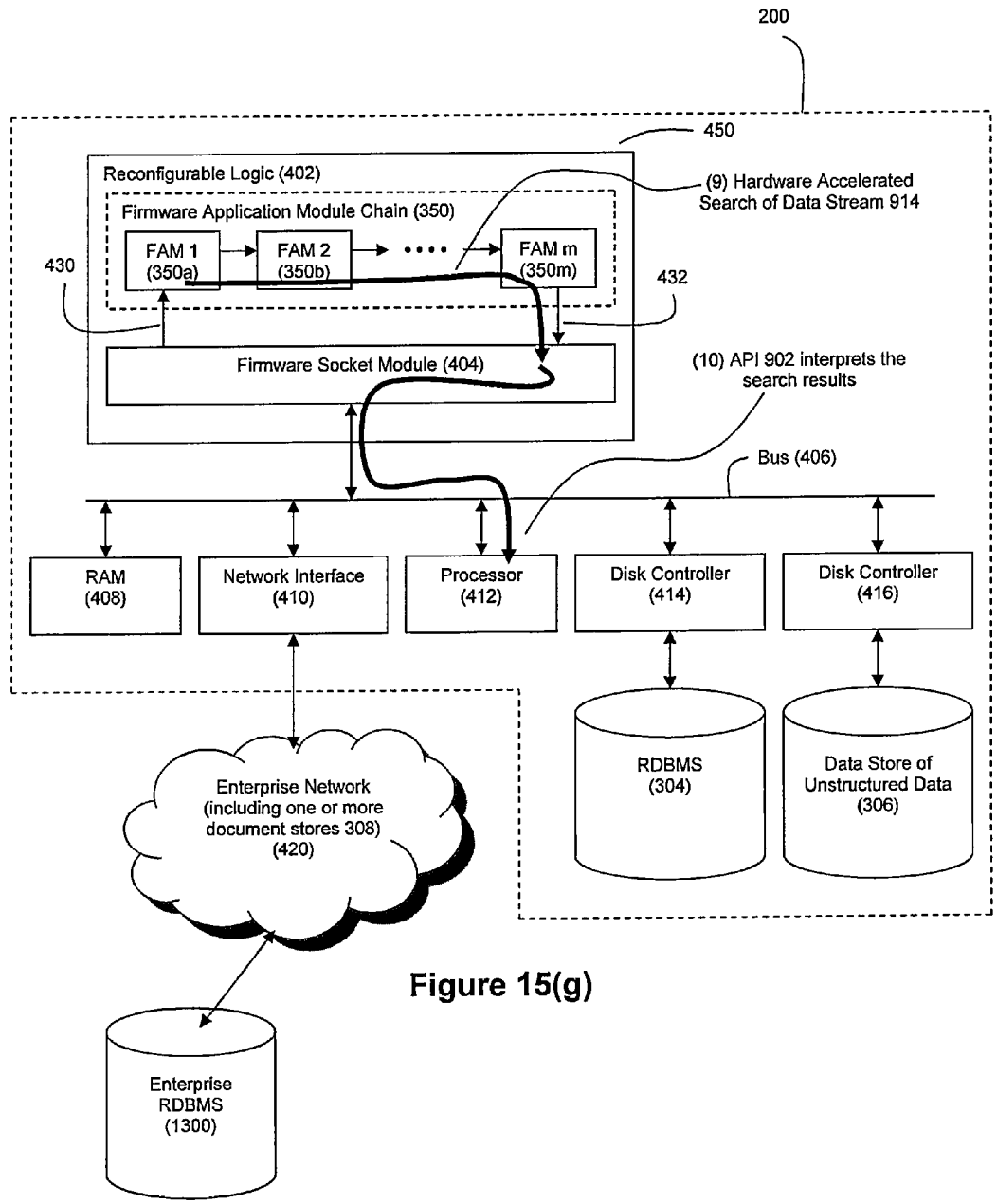
Figure 15H:
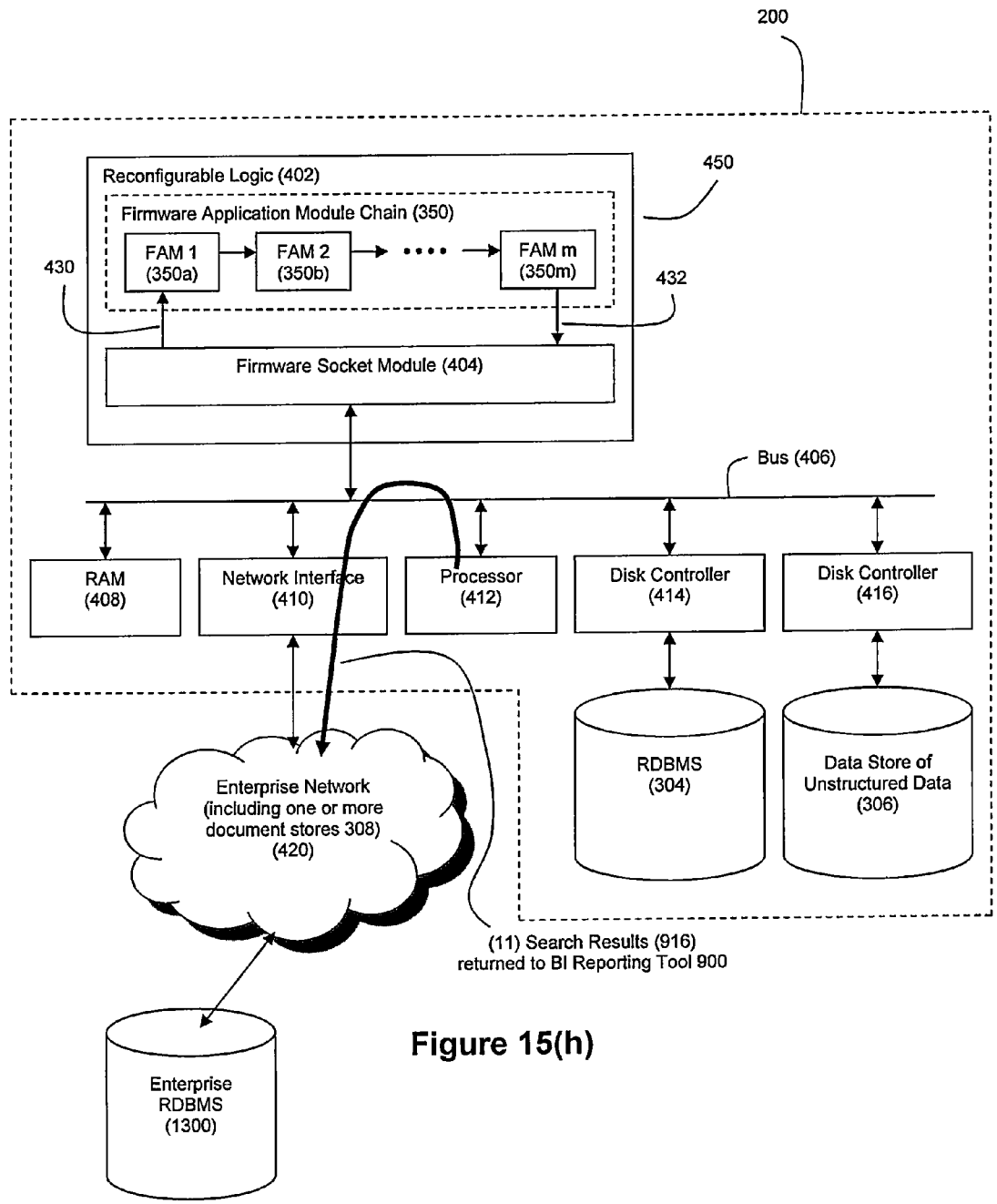

API 902 also discloses a series of processing steps for use when at least a portion of the structured data is stored in an RDBMS that is external to the appliance 200. With respect to the working example of FIGS. 15(a)-(h), steps 1600, 1602, 1604, 1606, 1616, 1620, and 1626 correspond to what is shown in FIG. 15(a). It should be noted that because the query in this instance is directed partially toward relational data stored in the external RDBMS 1300, the process flow will branch to step 1626 from step 1620. Thereafter, step 1630 corresponds to what is shown in FIG. 15(b). Steps 1634, 1638, 1642, 1644, and 1646 correspond to what is shown in FIG. 15(c). At that point, the FIG. 16 process flow branches to step 1632, and the remaining operations proceed such that FIGS. 15(*d*)-(*h*) operate as described in connection with FIGS. 11(*c*)-(*g*).

It is also worth noting, that the appliance 200 can also be configured to handle queries from a higher level application such as a BI reporting tool 900 that are directed toward neither documents within data store 304, documents about which RDBMS 304 maintains metadata, or data within RDBMS 304. In such instances, the API 902 essentially acts as a pass through (at least as a pass through to relational engine 950) as those queries are directed toward the appropriate external components (see steps 1604, 1608, 1614, and 1618).

It can also be noted that API 902 can be configured to handle queries that are directed solely toward metadata within RDBMS 304 (e.g., queries on the metadata but that do not include a document text searching constraint), as shown by steps 1606, 1612, 1614 and 1618 in FIG. 16.

Figure 17A:
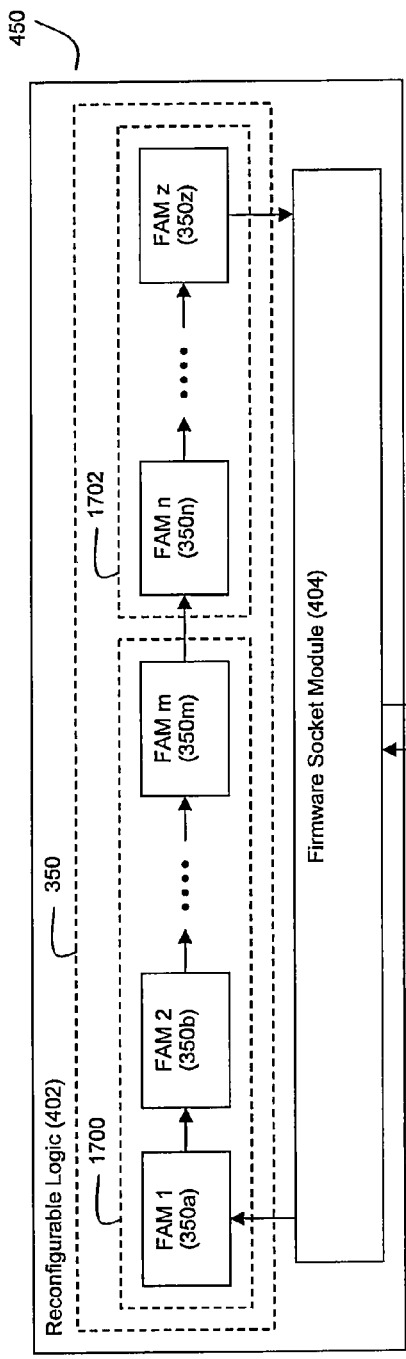
FIGS. 17(a) and (b) illustrate examples of how FAM pipelines can be deployed on a reconfigurable logic device to carry out a document ingest pre-processing operation and a query-specified data processing operation.
Figure 17B:
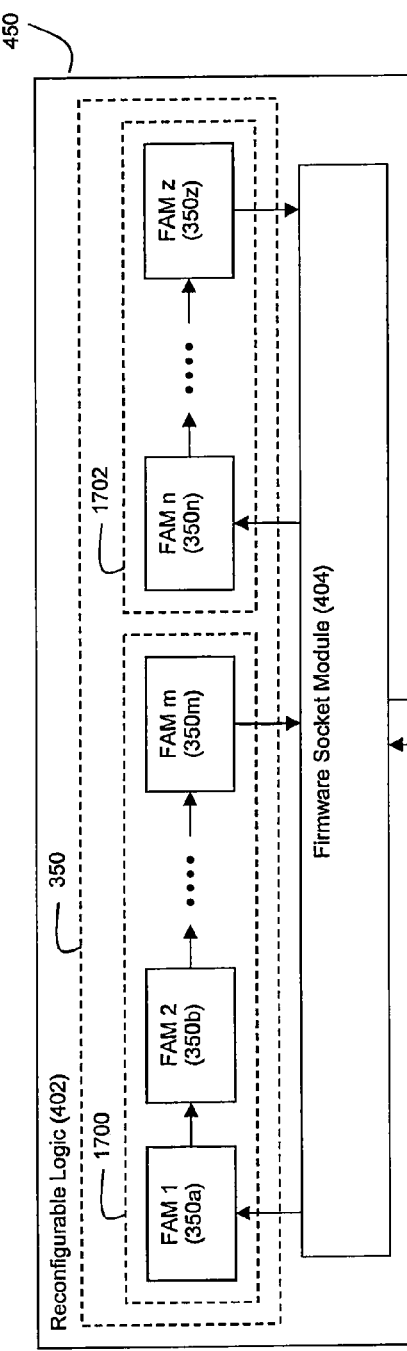

FIGS. 17(*a*) and (*b*) depict examples of how the FAM pipeline 350 of the reconfigurable logic device 402 can be set up to carry out the hardware-accelerated data processing tasks of the preferred embodiment. In the example of FIG. 17(*a*), a single FAM pipeline 350 is employed, wherein a first set of FAMs 1700 within the pipeline are configured to carry out the document metadata generation operation and a second set of FAMs 1702 within the pipeline are configured to carry out the query-specified data processing operation (or vice versa). With this arrangement, when the FAM pipeline 350 is being used for document ingest pre-processing, the FAMs directed toward the query-specified data processing can be set to a "pass through" mode such that they are effectively turned off. When the FAM pipeline 350 is otherwise used for a query-specified data processing operation, the FAMs directed toward the document metadata generation operation can then be set to a "pass through" mode such that they are effectively turned off.

As an alternative to this mode of operation, the FAM set 1700 and the FAM set 1702 can both be set up as their own separate individual pipelines, as shown in FIG. 17(*b*). In this example, intelligence built into the firmware socket module 404 can direct data (control data and target data) to the appropriate FAM set based on what type of processing is needed.

Any of a variety of algorithms can be used for the query-specified data processing operation performed by coprocessor 450 (preferably via firmware 350 deployed on a reconfigurable logic device 402). As mentioned above, full-text searching can be carried out by the coprocessor. Examples of various full-text searching operations that can be performed by the coprocessor include exact match operations, approximate match operations, regular expression matching operations, pattern matching operations, and others. With full-text searching, one or more keys corresponding to the data sought to be found in the unstructured data (as defined by the query) can be loaded into the coprocessor 450 and the streaming unstructured data can be compared against the one or more keys using various techniques to determine whether any of the streaming unstructured data satisfies the query. Exemplary embodiments for such full-text searching operations are disclosed in the above-referenced and incorporated U.S. Pat. Nos. 6,711,558 and 7,139,743 and U.S. Patent Application Publications 2006/0294059, 2007/0130140, and U.S. Patent Application Publication 2007/0260602 entitled "Method and Apparatus for Approximate Pattern Matching" (published from U.S. application Ser. No. 11/381,214, filed May 2, 2006).

Another example of a data processing operation that can be performed by the coprocessor 450 includes biosequence similarity searching, embodiments of which are disclosed in U.S. Patent Application Publication 2007/0067108 and U.S. Patent Application Publication 2008/0086274 entitled "Method and Apparatus for Protein Sequence Alignment Using FPGA Devices" (published from U.S. application Ser. No. 11/836,947, filed Aug. 10, 2007), both of which are referenced and incorporated above.

Further still, a pipeline within the coprocessor 450 can be arranged to perform a plurality of different data processing operations on unstructured data. For example, should unstructured data be stored in data store 306 in an encrypted format, then the coprocessor can be configured with a pipeline that performs a decryption operation on the encrypted unstructured data prior to performing a full-text searching operation. Similarly, should the unstructured data be stored in data store 306 in a compressed format, then the coprocessor can be configured with a pipeline that performs a decompression operation on the compressed unstructured data prior to performing a full-text searching operation. Further still, should the unstructured data be stored in data store 306 in an encrypted and compressed format, then the coprocessor can be configured with a pipeline that performs decryption and decompression prior to performing a full-text searching operation.

It should also be noted that a practitioner of the present invention may choose to employ security features within the appliance 200 that will limit the content that is available to various users. Preferably such security features are integrated with various enterprise security architectures such as LDAP, Active Directory, Single Sign-On. It should also be noted that security functionality can be hardware accelerated through the coprocessor 450 if desired. For example, the granularity of security control can be efficiently implemented at the data level rather than at the document level through the use of coprocessor 450. For example, in a preferred embodiment wherein the coprocessor comprises a reconfigurable logic device 402, firmware 350 can be arranged on the reconfigurable logic device to employ entitlement filtering that effectively masks the passage of restricted data to downstream FAMs in a firmware pipeline that are arranged for a specified data processing operation. For example, regular expression pattern matching FAMs can be employed to mask out certain pieces of data (e.g., names, telephone numbers, credit card numbers) from data as it streams through the firmware 350. Similarly, in an application of the invention to the medical records field, select data within a medical record that is to only be seen by doctors/nurses can be filtered using appropriately-configured firmware to prevent a user who is searching through the medical records but who is not authorized to review certain parts of medical records from gaining access to the restricted data. In this way, the data processing employed by the firmware 350 can not only employ query-specified data processing, but also additional ancillary data processing operations, such as entitlement filtering or other security controls, encryption/decryption (see for example, the encryption/decryption techniques described in the above-referenced and incorporated U.S. Patent Application Publication 2007/0237327), or other data processing operations that support the query-specified data processing operation.

Figure 18B:
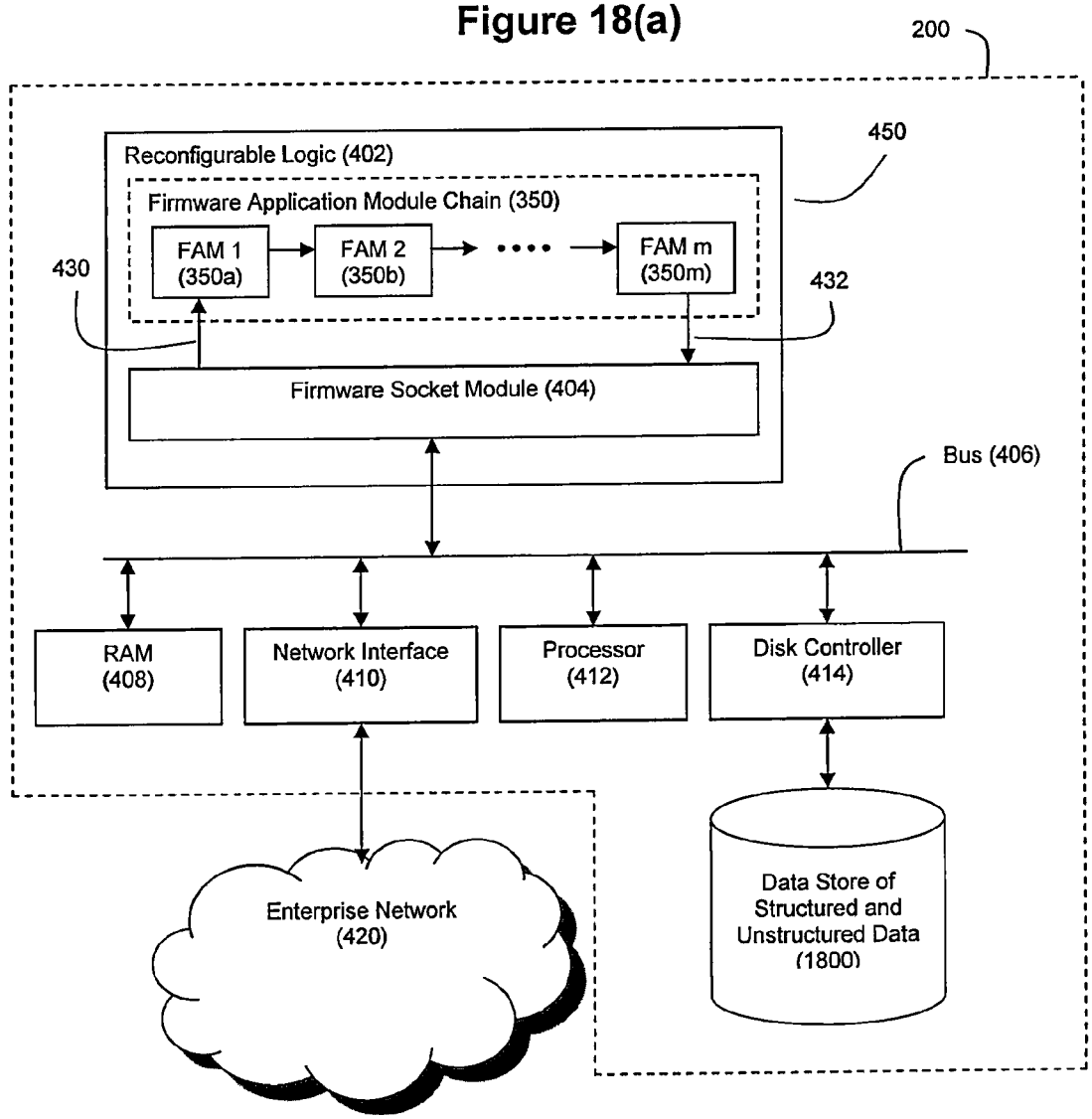

It should also be noted that the query-handling technique of using structured data to identify a subset of unstructured data that is to be analyzed using a coprocessor can also be applied in situations where the structured data and the unstructured data are located in the same data store. Exemplary embodiments for this are shown in FIGS. 18(*a*) and (*b*). It may be the case that a relational database table includes columns of unstructured data. An example of this might arise in a relational database which stores call center records. Structured fields of call center data may identify the date a call was received, the caller's name and telephone number, and the name of the call center agent who took the call. These records may also include an unstructured data field that contains free form text of the call center agent's notes about the caller's call. Using the techniques described herein, a query can directed to appliance 200 (see FIG. 18(*b*)) that seeks to find all call records between Jan. 1, 2008 and Jan. 31, 2008 wherein the call notes contain the word "refund". The structured data columns can be accessed by API 902 to identify the subset of call records where the call date was during January 2008. Thereafter, all of the call records in the identified subset (or at least all of the unstructured columns in the call records for the identified subset) can be streamed through coprocessor 450 to identify those January 2008 call records which contain the word "refund".

While in the preferred embodiment disclosed herein the coprocessor 450 comprises a reconfigurable logic device 402 such as an FPGA, it should be noted that the coprocessor 450 can be realized using other processing devices. For example, the coprocessor 450 may comprise graphics processor units (GPUs), general purpose graphics processors, chip multi-processors (CMPs), dedicated memory devices, complex programmable logic devices, application specific integrated circuits (ASICs), and other I/O processing components. Moreover, it should be noted that appliance 200 may employ a plurality of coprocessors 450 in either or both of a sequential and a parallel multi-coprocessor architecture.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A method for building a metadata index for unstructured data for a plurality of different data sources, the method comprising:
   receiving streaming unstructured data into a reconfigurable logic device, the streaming unstructured data comprising a plurality of data items for a plurality of different sources, wherein the reconfigurable logic device has a plurality of pipelined firmware application modules deployed thereon;
   the pipelined firmware application modules analyzing the streaming unstructured data to generate metadata about the streaming unstructured data at hardware processing speeds, the analyzing including detecting whether a term relating to a name is found in any of the data items, the generated metadata comprising data associated with the data item that is indicative of where a data item having the detected term can be located; and
   generating an index about the streaming unstructured data from the generated metadata, the index for subsequent querying to locate data items of interest based on associations between the metadata and the data items.

2. The method of claim 1 wherein the data items comprise at least two members of the group consisting of (1) a plurality of news reports, (2) a plurality of web pages, (3) a plurality of market analyses, (4) a plurality of emails, (5) a plurality of social network communications, and (6) a plurality of corporate documents.

3. The method of claim 2 wherein the reconfigurable logic device comprises a field programmable gate array (FPGA), the FPGA having the pipelined firmware application modules deployed thereon.

4. The method of claim 3 wherein the analyzing step comprises the pipelined firmware application modules performing a classification operation on the streaming unstructured data to determine classification information for the data items, the generated metadata including the determined classification information; and
   wherein the index generating step further comprises generating an index about the streaming unstructured data based on the determined classification information.

5. The method of claim 4 wherein the classification operation performing step includes the pipelined firmware application modules generating word counts for the data items, the determined classification information being based on the generated word counts.

6. The method of claim 2 further comprising storing the generated index in a database for subsequent querying.

7. The method of claim 2 further comprising:
   streaming a plurality of the data items into the reconfigurable logic device from a plurality of remote data sources via a network interface.

8. The method of claim 2 further comprising:
   performing a lookup using the generated index as part of a reputation analysis operation for an enterprise.

9. The method of claim 2 wherein the detecting comprises:
   the pipelined firmware application modules identifying a plurality of names that are found within the data items, the index indexing the data items by the found names;
   wherein the method further comprises:
      performing a plurality of lookups relating to a plurality of the names using the generated index; and
      determining a connectedness for a plurality of individuals based on the lookups.

10. The method of claim 9 wherein the at least two members comprise the emails and the social network communications.

11. The method of claim 9 the data items comprise at least three members of the group consisting of (1) a plurality of news reports, (2) a plurality of web pages, (3) a plurality of market analyses, (4) a plurality of emails, (5) a plurality of social network communications, and (6) a plurality of corporate documents.

12. The method of claim 2 wherein the detecting comprises:
   the pipelined firmware application modules identifying a plurality of names that are found within the data items, the index indexing the data items by the found names;
   wherein the method further comprises:
      performing a plurality of lookups relating to a plurality of the names using the generated index; and
      determining a connectedness for a plurality of organizations based on the lookups.

13. The method of claim 12 wherein the at least two members comprise the emails and the corporate documents.

14. The method of claim 12 the data items comprise at least three members of the group consisting of (1) a plurality of news reports, (2) a plurality of web pages, (3) a plurality of market analyses, (4) a plurality of emails, (5) a plurality of social network communications, and (6) a plurality of corporate documents.

15. The method of claim 2 wherein the detecting comprises:
the pipelined firmware application modules identifying a plurality of names that are found within the data items, the index indexing the data items by the found names;
wherein the method further comprises:
performing a plurality of lookups relating to a plurality of the names using the generated index; and
determining a connectedness for a plurality of individuals and organizations based on the lookups.

16. The method of claim 2 further comprising:
integrating the index with structured data relating to the name in a structured database.

17. An apparatus for building a metadata index for unstructured data for a plurality of different data sources, the apparatus comprising:
a reconfigurable logic device; and
a memory;
wherein the reconfigurable logic device is configured to receive streaming unstructured data, the streaming unstructured data comprising a plurality of data items for a plurality of different sources, wherein the reconfigurable logic device has a plurality of pipelined firmware application modules deployed thereon;
the pipelined firmware application modules configured to perform analysis of the streaming unstructured data to generate metadata about the streaming unstructured data at hardware processing speeds, the analysis including a detection by the pipelined firmware application modules whether a term relating to a name is found in any of the data items, the generated metadata comprising data associated with the data item that is indicative of where a data item having the detected term can be located; and
the memory configured to store an index about the streaming unstructured data from the generated metadata, the index for querying to locate data items of interest based on associations between the metadata and the data items.

18. A method for integrating unstructured data for a plurality of different data sources, the method comprising:
streaming unstructured data through a field programmable gate array (FPGA), the unstructured data comprising at least two members of the group consisting of (1) a plurality of emails, (2) a plurality of social network communications, (3) a plurality of corporate documents, and (4) a plurality of news reports;
the FPGA performing a metadata generation operation on the unstructured data streamed therethrough to thereby generate metadata about the unstructured data;
storing the unstructured data in a data store of unstructured data;
storing the metadata about the unstructured data in a database of structured data; and
determining a connectedness of a plurality of subjects based on an analysis of the stored unstructured data and the stored metadata.

19. The method of claim 18 wherein the metadata includes an identification of where the unstructured data is stored in the data store of unstructured data.

20. The method of claim 19 wherein the performing step further comprises:
the FPGA identifying a plurality of names that are found in the streaming unstructured data, and wherein the generated metadata identifies where the identified names are present in the unstructured data.

21. The method of claim 20 wherein the subjects comprise a plurality of individuals.

22. The method of claim 20 wherein the subjects comprise a plurality of organizations.

23. A method for building a metadata index for unstructured data for a plurality of different data sources, the method comprising:
receiving streaming unstructured data into a reconfigurable logic device, the streaming unstructured data comprising a plurality of data items for a plurality of different sources, wherein the reconfigurable logic device has a plurality of pipelined firmware application modules deployed thereon;
the pipelined firmware application modules analyzing the streaming unstructured data to generate metadata about the streaming unstructured data at hardware processing speeds, the analyzing including detecting whether a term relating to a security instrument is found in any of the data items, the generated metadata comprising data associated with the data item that is indicative of where a data item having the detected term can be located; and
generating an index about the streaming unstructured data from the generated metadata, the index for subsequent querying to locate data items of interest based on associations between the metadata and the data items.

24. The method of claim 23 wherein the data items comprise at least two members of the group consisting of (1) a plurality of news reports, (2) a plurality of corporate filings, (3) a plurality of corporate documents, (4) a plurality of trading records, and (5) a plurality of transactional records.

25. The method of claim 24 wherein the reconfigurable logic device comprises a field programmable gate array (FPGA), the FPGA having the pipelined firmware application modules deployed thereon.

26. The method of claim 25 wherein the analyzing step comprises the pipelined firmware application modules performing a classification operation on the streaming unstructured data to determine classification information relating to the security instrument for the data items, the generated metadata including the determined classification information; and
wherein the index generating step further comprises generating an index about the streaming unstructured data based on the determined classification information.

27. The method of claim 24 further comprising storing the generated index in a database for subsequent querying.

28. The method of claim 24 further comprising:
streaming a plurality of the data items into the reconfigurable logic device from a plurality of remote data sources via a network interface.

29. The method of claim 24 further comprising:
performing a lookup using the generated index as part of an insider trading detection operation relating to the security instrument.

30. The method of claim 24 further comprising:
performing a lookup using the generated index as part of an reporting irregularity detection operation.

31. The method of claim 24 further comprising:
performing a lookup using the generated index as part of an illegal transaction detection operation relating to the security instrument.

32. The method of claim 24 further comprising:
performing a lookup using the generated index as part of a pricing anomaly detection operation relating to the security instrument.

33. The method of claim 24 further comprising:
performing a lookup using the generated index as part of a money laundering detection operation relating to the security instrument.

34. The method of claim 24 wherein the at least two members comprise the corporate filings and the trading records.

35. The method of claim 24 wherein the at least two members comprise the news reports and the trading records.

36. The method of claim 24 the data items comprise at least three members of the group consisting of (1) a plurality of news reports, (2) a plurality of corporate filings, (3) a plurality of corporate documents, (4) a plurality of trading records, and (5) a plurality of transactional records.

37. The method of claim 24 wherein the data items comprise (1) a plurality of news reports, (2) a plurality of corporate filings, (3) a plurality of corporate documents, (4) a plurality of trading records, and (5) a plurality of transactional records.

38. The method of claim 24 further comprising:
integrating the index with structured data relating to the security instrument in a structured database.

39. An apparatus for building a metadata index for unstructured data for a plurality of different data sources, the apparatus comprising:

a reconfigurable logic device; and a memory;

wherein the reconfigurable logic device is configured to receive streaming unstructured data, the streaming unstructured data comprising a plurality of data items for a plurality of different sources, wherein the reconfigurable logic device has a plurality of pipelined firmware application modules deployed thereon;

the pipelined firmware application modules configured to perform analysis of the streaming unstructured data to generate metadata about the streaming unstructured data at hardware processing speeds, the analysis including a detection by the pipelined firmware application modules whether a term relating to a security instrument is found in any of the data items, the generated metadata comprising data associated with the data item that is indicative of where a data item having the detected term can be located; and the memory configured to store an index about the streaming unstructured data from the generated metadata, the index for querying to locate data items of interest based on associations between the metadata and the data items.

* * * * *